(12) United States Patent
Publicover et al.

(10) Patent No.: US 11,393,357 B2
(45) Date of Patent: Jul. 19, 2022

(54) SYSTEMS AND METHODS TO MEASURE AND ENHANCE HUMAN ENGAGEMENT AND COGNITION

(71) Applicant: KINOO, Inc., Mountain View, CA (US)

(72) Inventors: Nelson George Publicover, Bellingham, WA (US); Lewis James Marggraff, Lafayette, CA (US)

(73) Assignee: Kinoo INC., Mountain View, CA (US)

( * ) Notice: Subject to any disclaimer, the term of this patent is extended or adjusted under 35 U.S.C. 154(b) by 0 days.

(21) Appl. No.: 17/200,722

(22) Filed: Mar. 12, 2021

(65) Prior Publication Data

US 2021/0390876 A1 Dec. 16, 2021

Related U.S. Application Data

(63) Continuation-in-part of application No. 17/081,806, filed on Oct. 27, 2020, now Pat. No. 10,963,816, (Continued)

(51) Int. Cl.
*G06N 3/04* (2006.01)
*G09B 19/00* (2006.01)
(Continued)

(52) U.S. Cl.
CPC .............. *G09B 19/00* (2013.01); *G06N 3/04* (2013.01); *G06N 3/08* (2013.01); *G09B 7/00* (2013.01)

(58) Field of Classification Search
CPC . G09B 19/00; G09B 7/00; G06N 3/04; G06N 3/08
(Continued)

(56) References Cited

U.S. PATENT DOCUMENTS

| 2012/0052476 A1* | 3/2012 | Graesser | ................ | G09B 7/04 434/362 |
| 2016/0042648 A1* | 2/2016 | Kothuri | .................. | A63F 13/92 434/236 |

OTHER PUBLICATIONS

Petrovica et al ("Emotion Recognition in Affective Tutoring Systems: Collection of Ground-Truth Data" 2016) (Year: 2016).*

* cited by examiner

*Primary Examiner* — Lut Wong
(74) *Attorney, Agent, or Firm* — William A. English; Vista IP Law Group LLP

(57) ABSTRACT

Systems and methods are described to enact machine-based, simultaneous classification of emotional and cognitive states of an individual in substantially real time. A bootstrap approach is used to identify indicators of emotional state, including boredom, engagement and feeling overwhelmed, by finding additional interactions temporally adjacent to known indicators. A similar bootstrap approach is used to identify new indicators of knowledge acquisition (or confusion), by locating frequent temporally adjacent interactions. Systems and methods may enhance teaching by identifying knowledge presentations that result in successful knowledge acquisition, and learning by allowing instructors associated with an individual to track materials that have been understood (or misunderstood). Machine-based tracking of learning may circumvent boredom by avoiding needless repetition, and facilitate teaching of synergistic topics related to materials recently understood. Systems and methods may provide for an enhanced, individualized environment for both emotional and cognitive development.

26 Claims, 19 Drawing Sheets

Related U.S. Application Data which is a continuation-in-part of application No. 16/902,168, filed on Jun. 15, 2020, now Pat. No. 10,915,814.

(60) Provisional application No. 63/106,296, filed on Oct. 27, 2020, provisional application No. 63/043,060, filed on Jun. 23, 2020.

(51) Int. Cl.
 *G09B 7/00* (2006.01)
 *G06N 3/08* (2006.01)
(58) Field of Classification Search
 USPC .......................................................... 706/12
 See application file for complete search history.

SYSTEMS AND METHODS TO MEASURE AND ENHANCE HUMAN ENGAGEMENT AND COGNITION

RELATED APPLICATION DATA

The present application claims benefit of provisional application Ser. No. 63/106,296, filed Oct. 27, 2020, and is a continuation-in-part of co-pending application Ser. No. 17/081,806, filed Oct. 27, 2020, which claims benefit of provisional application Ser. No. 63/043,060, filed Jun. 23, 2020, and is a continuation-in-part of application Ser. No. 16/902,168, filed Jun. 15, 2020, now U.S. Pat. No. 10,915,814, the entire disclosures of which are expressly incorporated by reference.

FIELD OF THE INVENTION

The present invention relates generally to systems and methods for using one or more electronic devices or human interaction entities (HIEs) to provide supportive emotional engagement and cognitive learning environments. Optionally, HIEs may be instantiated with one or more artificial intelligences (AIs) to discern, in real-time, human intent and/or context during human-machine interactions. An HIE may also express an AI personality (AIP) that is familiar to a user during such interactions. The systems and methods herein utilize techniques within the fields of computer programming, machine learning [including artificial neural networks (ANNs), convolution neural networks (CNNs), word-embeddings, and deep learning], human-machine interfaces (HMIs), telecommunications, and cognitive sciences including psychology, linguistics and learning. The systems and methods herein may also provide one or more users with intuitive machine interfaces and/or companions to 1) monitor and modulate emotional engagement, and 2) exhibit expert knowledge to encourage and measure the acquisition of new knowledge.

BACKGROUND

Within the overall field of cognitive science, it is widely accepted that emotions, including feelings, play a significant role in learning, memory, reasoning and problem solving. Some researchers even so far as suggesting that there can be no learning without emotional "tags". Recent progress in the field of neuroscience has increased our understand of the role of emotions in learning, even down to a level of identifying specific neurotransmitters such as dopamine (i.e., 3,4-dihydroxyphenethylamine) and serotonin (i.e., 5-hydroxytryptamine) as the brain's emotional reward system during learning, cognition and the formation of memories.

On the other hand, excess and/or prolonged stimulation of particularly the sympathetic components of the autonomic nervous system involving release of various catecholamines that are a part of the so-called "fight-or-flight" response, leads to a significantly reduced ability to learn and/or form long-term memories. A so-called "inverted-U" relation for overall mental performance (including learning) versus emotional "pressure" (a term used historically) perceived by an individual has been accepted in the field of psychology for more than a century. Robert Yerkes and John Dodson were the first to describe this inverted-U relation in 1908. [Yerkes R M, Dodson J D (1908) The relation of strength of stimulus to rapidity of habit-formation. J Comp Neurol Psychol 18:459-482] As a result, emotional engagement of an individual is generally viewed as an important element of a productive learning environment.

Active learning is a complex, life-long process that involves the acquisition of new knowledge, behaviours, skills, values, attitudes and/or preferences. Understanding is an element of knowledge acquisition related to both abstract and physical concepts, allowing one to "think about" or consider those concepts. Understanding is frequently closely aligned with the ability to make inferences (i.e., steps in reasoning about such concepts that lead to logical consequences). It is commonly accepted that there are at least six interactive components of the learning process: attention, memory, language, processing/organizing, graphomotor (i.e., writing), and higher order thinking. These processes interact not only with each other, but also with physical learning environments, behaviors, social skills and individuals involved in the learning process (e.g., parents, friends, instructors).

Traditionally, although sometimes viewed as too general and imprecise, learning has been classified as resulting from three interaction categories. Learners may learn by interacting with: 1) instructors (e.g., teachers, parents or other family members, professional leaders enacting continuing education), 2) other learners (i.e., communication and/or teaching between or among peers that may or may not involve formal instructors), and 3) content (presented today using a wide range of software applications and hardware tools including books, audio broadcasts as well as screen-based and voice-first devices). However, emerging technologies and distance education approaches significantly blur such distinctions.

As an additional framework when considering learning processes, individual learning styles are generally viewed within at least five overlapping categories: 1) visual, 2) auditory, 3) reading/writing, 4) olfactory and 5) kinesthetic (i.e., movement of body parts). These differing styles of learning emphasize the need for individualized modes of presenting new knowledge and to follow-on with individualized techniques to assess whether knowledge has been fully acquired.

Different forms of instructional interaction may aid different styles of learning. Indeed, resources that introduce common instructional topics are often available in formats that cater to such preferences and/or styles. For example, topic descriptions may be available as written text within a book (or any of the many devices capable of displaying text on a screen), a pencast, a series of images, an audiovisual clip demonstrating knowledge elements, an animation showing underlying concepts, a podcast and/or audio book snippet.

The formation of long-term memories is an element of learning as well as an indicator of a healthy emotional environment. Based on magnetic resonance imaging and other brain monitoring techniques, it is generally regarded that the organization and formation of long-term memories occurs via interconnections between frontal lobes (working memory) along with the occipital lobe (visual perception), temporal lobes (verbal and conceptual knowledge), somatosensory cortex (touch and body sensations), and other areas of the cortex (auditory processing). Frontal lobes also play a key role during the required focus and attention involved in memory formation and retrieval.

Other regions of the body, such as adrenal glands located above each kidney, contribute to key elements of the emotional state of an individual via the release of neurohormones such as epinephrine (i.e., adrenaline) and norepinephrine (i.e., noradrenaline). Each of these anatomical regions serves multiple functional roles beyond their involvement in modulating emotional state. Recognizing simultaneous involvement of these anatomical structures within their various functional roles and specific interconnection pathways that result in identifiable limitations in communications between the different regions, may help formulate (including imposing limitations on) emotional and cognitive strategies to help promote overall emotional and intellectual development.

A key element in the educational process is assessing whether presented knowledge has been understood by a learner. Traditionally, this has been performed by "testing", frequently in the form of oral questioning and/or written examinations related to newly presented materials. At least in part as a result of increased class sizes and pressures to reduce time, and thus costs, associated with formal education, as well as to facilitate the testing and grading process in increasingly automated and/or online environments, there has been an escalation in reliance on so-called multiple-choice tests (i.e., selecting a correct or best answer from a list of choices) to assess knowledge understanding. The accuracy of such multiple-choice tests to assess learning and/or true understanding is the subject of much debate where, for example, there are numerous published strategies for taking such tests, even absent significant knowledge of the subject matter. Additionally, memorization of answers to such forms of testing does not necessarily imply a deep understanding of subject material.

The need for accurate assessment methods for knowledge acquisition applies not only for the benefit of a learner, but also for the benefit of the many people (e.g., parents, peers, professors) that contribute to formal and informal education. Reintroduction or review of materials and/or presentation of synergistic topics, particularly if restated using different styles and/or strategies may greatly aid in the overall learning process. The identification and dissemination (while taking into consideration, appropriate concerns over privacy) of knowledge acquisition by an individual may help to define and/or regulate an acceptable pace (i.e., rate and/or complexity of new topics), scope and sequence for teaching. In addition, supporters involved in the education of an individual may be synchronised with presentations of follow-on topics, avoid redundancies, and track levels of academic and intellectual advancement in different topic areas. Such feedback may also inform those providing new knowledge of the effectiveness of their teaching strategies to help to improve methods for knowledge presentation.

A highly touted attribute of distance education and so-called virtual classrooms is the ability to perform "self-paced" or "self-organized" learning. The ability to select when and where to interact with such resources is of great value to many. Further, some virtual or electronic classrooms allow the presentation of portions of topics to be bypassed based on results of online testing (typically multiple-choice). However, although this process may save time and reduce the potential for boredom due to repetition, there is no assurance of deep understanding of topics or groups of subjects, and skipping topics may even be the result of "guessing" (i.e., lacking true understanding) during testing. A number of enhanced learning and time-saving steps on a topic-by-topic basis might be effectively implemented if true knowledge understanding could be assessed in real time, as knowledge is presented.

New paradigms are required to monitor and enhance emotional environments, and improve the efficiency and effectiveness of learning, particularly when components of those environments (e.g., instructors, peers, classrooms, learning activities) may be separated by distance and/or time. Artificial human companions will likely never fully replace family members, friends, teachers, peers, and others involved with the human support and learning processes. However, machine-based approaches may have the potential to help present effective educational experiences and subsequently track knowledge understanding while simultaneously supporting the cognitive and emotional behaviors of an individual. Further, an ability to precisely monitor both successful and unsuccessful learning strategies, particularly as a function of topic, age, and/or academic development, may provide a framework for enhanced learning, aiding individual learners, as well as improving overall teaching strategies for both childhood and adult education.

SUMMARY

In view of the foregoing, systems and methods are provided herein for utilizing one or more human interaction entities (HIEs) to monitor and modulate an individual's emotional state, as well as to encourage and/or enhance both structured (e.g., formal, institutional, certification-based) and non-structured (e.g., play, chat, entertainment) learning. HIEs may include one or more portable, human interaction accessories (HIAs) to facilitate mobile interactions. HIEs may optionally be instantiated with one or more artificial intelligences (AIs) to discern context and/or intent during human-machine interactions in real-time. AI components may additionally express one or more AI "personalities" (AIPs), "characters," or "companions" to implement familiar, socially acceptable and more effective communication experiences. The HIE may manage, identify and/or perform communication experiences that maintain emotional engagement, assess knowledge understanding by a learner, and enhance methods for teaching.

Embodiments may provide one or more users with intuitive machine interfaces and/or companions to simultaneously 1) monitor and/or modulate an individual's emotional state to promote engagement, and 2) exhibit an expert knowledge base to structure, encourage and measure the acquisition of new knowledge. In many cases, strategies described herein to monitor and enhance emotional elements overlap with similar approaches to simultaneously monitor and enhance cognitive (i.e., learning) elements. In order to avoid repetition, some strategies and figures may be described in greater detail within either emotional or cognitive descriptions; however, similar strategies may be applied within both settings.

In exemplary embodiments, considering first methods to monitor emotional condition, an individual often produces (usually without significant thought) multiple indications of emotional state. Further, one or more observers of an individual, may also readily (e.g., absent significant thought) produce multiple indications of an individual's perceived emotional state. These aspects allow largely automated approaches to accumulating databases of: 1) interaction indicators of the emotional state of an individual (ranging from boredom, through engaged, to overwhelmed), and 2) interaction indicators by an observer of an individual's perceived emotional state. By starting with a small number of deliberate (i.e., easily detected by a machine) indicators of emotional state (e.g., expressing one or more keywords, pressing a button by either a learner or an observer, predetermined signalling gestures), interactions that generate a particular emotional state may be scanned for additional indications of the emotional state. Applied repeatedly to grow and strengthen the diversity of indications of emotional state databases, these overall programming and data accumulation strategies may be referred to as "bootstrapping" approaches.

The cycle of using known indicators of emotional state to find further indicators of emotional state may be repeated indefinitely. In addition, as databases are expanded to include greater numbers of interactions and analyses are iterated, steps may be taken to remove (i.e., "prune") less reliable and/or less correlated interactions associated with particular emotional states. Indicators of emotional state that are determined to occur infrequently, be determined to not be unique to a particular emotional state, and/or subsequently found to be not valid (e.g., corrected by one or more observers or by the individual being monitored), may be removed from indicators of emotional state databases.

Along similar lines, an individual learner often produces, usually without significant thought, multiple indications of knowledge acquisition or cognitive state. Further, one or more observers of a learner may also readily produce multiple indications of perceptions of knowledge acquisition by a learner. These aspects allow a largely automated approach to accumulating databases of: 1) indicators of knowledge acquisition (ranging from complete understanding to confusion) by a learner, 2) indicators of perceived knowledge acquisition produced by an observer of a learner, and 3) successful (versus unsuccessful) knowledge presentations (i.e., teachings).

By starting with a small number of deliberate (i.e., easily detected by a machine) indicators of knowledge acquisition, interactions that generate knowledge understanding may be scanned for additional indications of understanding. The cycle of using known indicators of understanding to find further indicators of understanding (i.e., bootstrapping) may be repeated indefinitely. Previously identified indicators and/or combinations of indicators of knowledge acquisition that are determined to occur either infrequently and/or interactions that resulted from knowledge subsequently found to be not well understood (e.g., as a result of traditional testing and/or oral examination), may be removed from indicators of knowledge acquisition databases.

A similar bootstrapping process may be used to construct one or more databases of indicators of lacking knowledge understanding or confusion. For the purposes of this application, "confusion" or a degree of lacking knowledge understanding may be expressed in a wide variety of detectable ways including, for example, simply stating a lack of understanding, requesting clarifications, questioning, frustration and/or even conveying a level of anger. Alternatively, or in addition, responses by a learner or one or more observers that indicate confusion by a learner may be accumulated by considering knowledge understanding as a continuum between deep understanding at one end of a spectrum to a complete lack of understanding, misunderstanding and/or confusion at the other end of the same spectrum.

A key aspect of both teaching and learning is an ability to recognize when, and to what degree, knowledge acquisition has occurred. In the majority of formal educational settings, such real-time assessments are frequently not possible due to excessive times required in multi-learner settings to perform frequent testing, the availability of teaching and/or assessment resources, excessive costs, and so on. Formal testing (e.g., examinations) and classroom feedback via instructional questioning are usually confined to queries regarding chunked (i.e., multi-topic) knowledge at times well past initial knowledge presentation, and generally after presentations of follow-on materials (i.e., that are potentially dependent upon prior understanding) and/or unrelated topics. Machine-based approaches to assess the occurrence and timing of knowledge understanding in real time may greatly aid processes involved in teaching and knowledge acquisition within both individual and group learning settings.

In further exemplary embodiments, using neural network-based and/or non-neural network classification strategies, a key element to develop machine-based approaches to identify indications of knowledge acquisition is the formation of one or more labelled databases of learning interaction components (e.g., video, audio) in which knowledge acquisition by a learner is known to have occurred. Such databases may be queried, using neural net and other classifier approaches (e.g., support vector machine [SVM], hyperplane analyses), to identify specific interaction characteristics or components, and/or to develop interaction "templates" of indicators by a learner that signify successful understanding, versus lack of understanding or confusion.

Different learners, particularly those at different ages and/or when presented different topics, may express indications of knowledge acquisition and understanding in different ways. Thus, databases used for developing and/or training machine-based approaches to identify understanding may lead to improved classification accuracy by incorporating large numbers of knowledge acquisition interactions from large numbers of diverse learners within a large number of learning environments. If known, factors such as age, learning environment, native language, cultural environment and instructional topic area may be used as inputs to large-scale, globally applied classification schemes.

Alternatively or in addition, databases may be segmented into separate classifiers when such factors are anticipated to be known at times of implementation (i.e., when classifier schemes are deployed). Separate classification schemes applied to specific subsets of populations and/or learning topics may be simpler to implement and computationally less intensive. On the other hand, more global classification schemes used when such segmenting factors are not anticipated to be known at the time of implementation, may require more computational resources and potentially be less accurate.

In further exemplary embodiments, while one or more databases of interaction components that produce knowledge acquisition may be valuable at the level of a learner, additional databases of knowledge presentations that successfully (and/or unsuccessfully) produced acquisition of new knowledge may be valuable to teachers and others responsible for organizing knowledge in understandable forms (e.g., authors, textbook editors, journalists, sales persons, media specialists). Thus, machine-based approaches to identifying the earliest time of knowledge acquisition and, as a consequence, one or more knowledge presentations that led to knowledge understanding, may be used to develop databases of successful teachings by identifying presentation materials and interaction components that produced understanding. Machine-based approaches to identify successful teaching strategies may be used to enhance both individualized and group learning environments. In short, databases of proven successful teachings by instructors and identifiers of knowledge acquisition by learners may provide tools for "learning about learning."

In additional exemplary embodiments, the detection of successful knowledge acquisition by a learner may be used to inform, via one or more monitoring processors (e.g., mobile devices, laptops, digital assistants) and, if needed, using telecommunications, others (i.e., other instructors, guardians, supporters and/or monitors) involved in the education and development of an individual learner. This facilitates a number of enhanced teaching strategies including avoiding repetition of particular topics by multiple instructors and/or synergistically presenting additional materials related to topics just learned. Machine-based systems may also be deployed to automatically (or selectively if desired, for example, based on topic area and/or privacy concerns) inform all monitors (e.g., responsible for formal advancement), supporters (e.g., parents or guardians) or any subset of individuals involved in the education and development of a learner when knowledge acquisition has occurred, as well as the knowledge presentation that lead to successful learning.

In accordance with an exemplary embodiment, a method is provided using an artificial intelligence to monitor human learning that includes: providing, in proximity to a first human, an electronic device that includes an interaction processor instantiated with the artificial intelligence, one or more interaction output devices operatively coupled to the interaction processor, and one or more sensors operatively coupled to the interaction processor; expressing to the first human, by one or both of the electronic device and a second human, knowledge that may be unknown to the first human; acquiring, from an interaction between the electronic device and the first human, interaction data from the one or more sensors; classifying within the interaction data, by one or more of the interaction processor and one or more remote processors, one or more indications of a degree of emotional engagement by the first human; and classifying within the interaction data, by one or more of the interaction processor and the one or more remote processors, one or more indications of a degree of knowledge acquisition by the first human.

In accordance with another exemplary embodiment, a system is provided to monitor human emotional state during learning that includes: an electronic device configured to be located in proximity to a first human that includes an interaction processor, one or more interaction output devices operatively coupled to the interaction processor, and one or more sensors operatively coupled to the interaction processor; the system configured such that: one or both of the electronic device and a second human, using the one or more interaction output devices, express to the first human, knowledge that may be unknown to the first human; the one or more sensors acquire interaction data; one or more of the interaction processor and one or more remote processors classify, within the interaction data, one or more indications of degree of emotional engagement by the first human; and one or more of the interaction processor and one or more remote processors classify, within the interaction data, one or more indications of degree of knowledge acquisition by the first human.

In accordance with yet another exemplary embodiment, a method is provided to monitor human emotional state during learning that includes: providing, in proximity to a first human, an electronic device that includes an interaction processor, one or more interaction output devices operatively coupled to the interaction processor, and one or more sensors operatively coupled to the interaction processor; expressing to the first human, by one or both of the one or more interaction output devices and a second human, knowledge that may be unknown to the first human; acquiring interaction data from the one or more sensors; classifying within the interaction data, by one or more of the interaction processor and one or more remote processors, one or more indications of a degree of emotional engagement by the first human; and classifying within the interaction data, by one or more of the interaction processor and the one or more remote processors, one or more indications of a degree of knowledge acquisition by the first human.

In accordance with an additional exemplary embodiment, a method is provided to monitor an observer of human learning that includes: providing, in proximity to a first human, a first electronic device that includes a first processor, and one or more first output devices operatively coupled to the first processor; providing, in proximity to a second human, a second electronic device that includes a second processor, and one or more sensors operatively coupled to the second processor; expressing to the first human, by one or both of the first electronic device and the second human, knowledge that may be unknown to the first human; acquiring, from an interaction between the second electronic device and the second human, interaction data from the one or more sensors; classifying within the interaction data, by one or more of the second processor and one or more remote processors, one or more indications of a degree of emotional engagement by the first human; and classifying within the interaction data, by one or more of the second processor and the one or more remote processors, one or more indications of a degree of knowledge acquisition by the first human.

In accordance with another additional exemplary embodiment, a system is provided to monitor an observer of human learning that includes: a first electronic device configured to be located in proximity to a first human that includes a first processor, and one or more first output devices operatively coupled to the first processor; a second electronic device located to be in proximity to a second human, that includes a second processor, and one or more sensors operatively coupled to the second processor; the system configured wherein one or both of the second human and the first output devices, express to the first human, knowledge that may be unknown to the first human; wherein the one or more sensors acquire interaction data; wherein one or more of the second processor and one or more remote processors, classify, within the interaction data, one or more indications of a degree of emotional engagement by the first human; and wherein one or more of the second processor and one or more remote processors, classify, within the interaction data, one or more indications a degree of knowledge acquisition by the first human.

In accordance with yet another additional exemplary embodiment, a method is provided to monitor an observer of human emotional state during learning, comprising: providing, in proximity to a first human, a first electronic device that includes a first processor, and one or more first output devices operatively coupled to the first processor; providing, in proximity to a second human, a second electronic device that includes a second processor, and one or more sensors operatively coupled to the second processor; expressing to the first human, by one or both of the first electronic device and the second human, knowledge that may be unknown to the first human; acquiring, from an interaction between the second human and the second electronic device, interaction data from the one or more sensors; and classifying within the interaction data, by one or more of the second processor and one or more remote processors, one or more indications of a degree of emotional engagement by the first human.

In accordance with another exemplary embodiment, a method is provided to accumulate labelled human emotion interactions, that includes: providing, in proximity to a first human, an electronic device that includes an interaction processor, one or more interaction output devices operatively coupled to the interaction processor, and one or more sensors operatively coupled to the interaction processor;

acquiring by the first processor, a selected degree of emotional engagement from one of the electronic device, a predetermined list of degrees of emotional engagement, the first human, and a second human; instructing the first human, by one or both of the electronic device and the second human, to consider an activity associated with the selected degree of emotional engagement; acquiring, from an interaction between the electronic device and the first human, interaction data from the one or more sensors; and labelling, by one or more of the interaction processor and one or more remote processors, one or more interactions within the interaction data with the selected degree of emotional engagement.

In accordance with another exemplary embodiment, a method is provided to accumulate labelled observer of human emotion interactions, that includes: providing, in proximity to a first human, a first electronic device comprising an electronic device that includes a first processor, one or more first output devices operatively coupled to the first processor, and one or more first sensors operatively coupled to the first processor; providing, in proximity to a second human, a second electronic device comprising an electronic device that includes a second processor, one or more second output devices operatively coupled to the second processor, and one or more second sensors operatively coupled to the second processor; acquiring, by one or more of the first processor, the second processor, and one or more remote processors, a selected degree of emotional engagement from one of a predetermined list of degrees of emotional engagement, the first human, and the second human; instructing the first human, by one or both of the first electronic device and the second human, to consider an activity associated with the selected degree of emotional engagement; acquiring, from an interaction between the electronic device and the first human, interaction data from the one or more first sensors; and labelling, by one or more of the first processor and the one or more remote processors, one or more labelled interactions within the interaction data with the selected degree of emotional engagement.

In accordance with yet another exemplary embodiment, a system is provided to accumulate labelled human emotion interactions, that includes: an electronic device configured to be located in proximity to a first human comprising an electronic device that includes an interaction processor, one or more interaction output devices operatively coupled to the interaction processor, and one or more sensors operatively coupled to the interaction processor, the system configured such that: the electronic device acquires from one of the interaction processor, a predetermined list of degrees of emotional engagement, the first human, and a second human, a selected degree of emotional engagement; one or both of the electronic device and the second human instruct the first human to enact an activity associated with the selected degree of emotional engagement; the interaction processor acquires, from an interaction between the electronic device and the first human, interaction data from the one or more sensors; and one or more of the interaction processor and one or more remote processors label one or more interactions within the interaction data with the selected degree of emotional engagement.

Other aspects and features including the need for and use of the present invention will become apparent from consideration of the following description taken in conjunction with the accompanying drawings.

BRIEF DESCRIPTION OF THE DRAWINGS

A more complete understanding of the present invention may be derived by referring to the Detailed Description of the Exemplary Embodiments when considered in connection with the following illustrative figures. In the figures, like-reference numbers refer to like-elements or acts throughout the figures. Presented exemplary embodiments are illustrated in the accompanying drawings, in which.

DETAILED DESCRIPTION OF THE EXEMPLARY EMBODIMENTS

Before the exemplary embodiments are described, it is to be understood that the invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Unless defined otherwise, all technical and scientific terms used herein have the same meaning as commonly understood by one of ordinary skill in the art to which this invention belongs. It must be noted that as used herein and in the appended claims, the singular forms "a," "an," and "the" include plural referents unless the context clearly dictates otherwise. Thus, for example, reference to "a compound" includes a plurality of such compounds and reference to "the polymer" includes reference to one or more polymers and equivalents thereof known to those skilled in the art, and so forth.

In exemplary embodiments, one or more electronic devices (i.e., human interaction entities, HIES) may: 1) monitor and modulate the emotional environment of an individual, striving to maintain the individual within an engaged or attentive state, and 2) simultaneously monitor and enhance the cognitive learning environment of the individual, striving to optimize rate and/or complexity of new knowledge acquisition. The emotional environment of the individual may be modulated directly by the HIE, influenced by one or more humans, and/or result from machine-based prompting (i.e., by the HIE) of the one or more humans. During such monitoring and/or modulating engagements, learning environments may be structured (e.g., formal, institution-based, certification-based) or non-structured (e.g., play, chat, entertainment).

The tight bonds between emotion and learning call for synergistic approaches to simultaneously address both emotional and cognitive (in addition to physical) states of an individual to promote optimum intellectual development. When aided by machine-based tools that may sense (in real time) both the emotional and cognitive states of a learner in order to augment emotional and cognitive conditions, an enhanced emotional and intellectual development environment may be achieved.

Coupled Emotional and Cognitive States of an Individual

Figure 1:
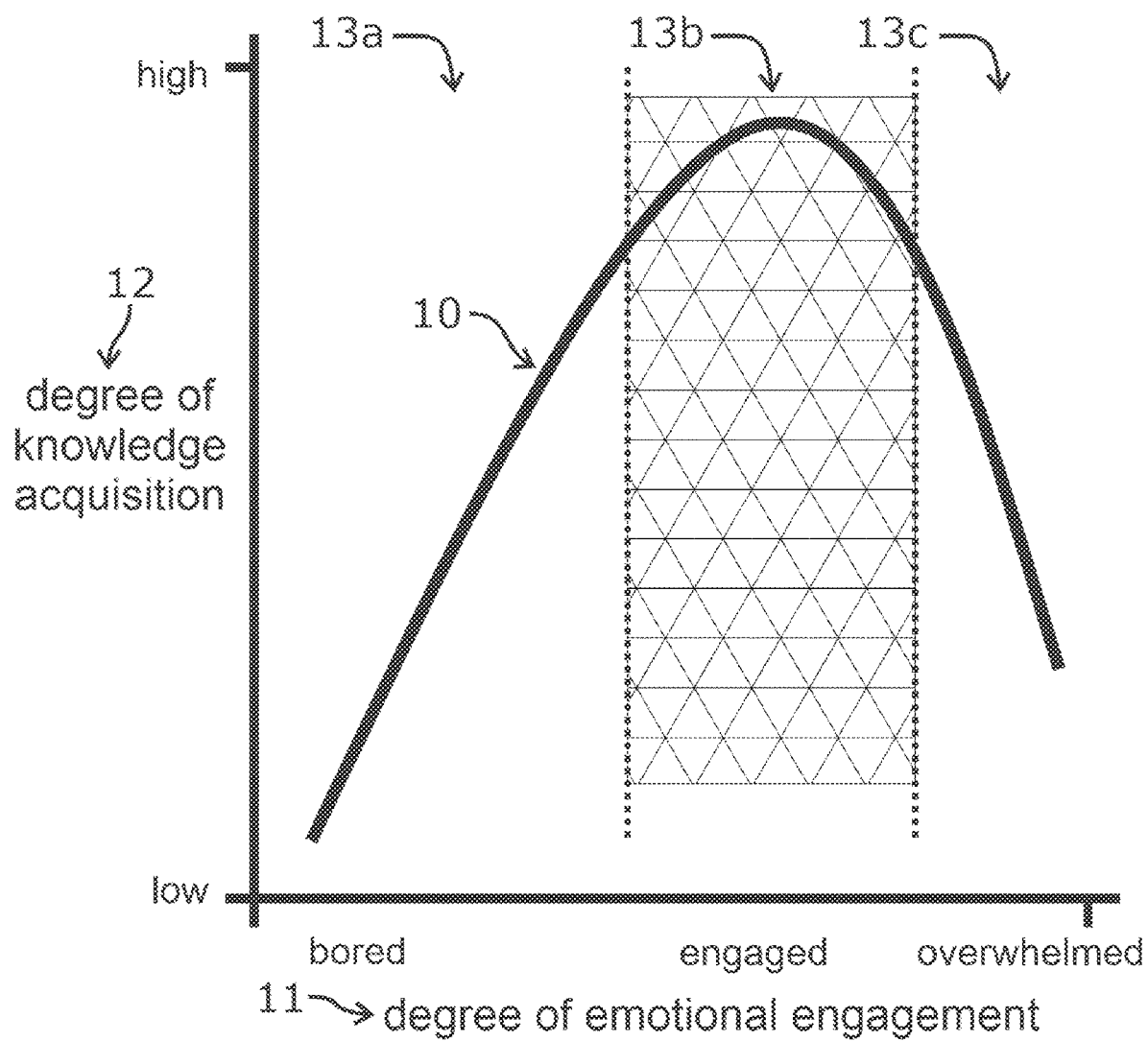
FIG. 1 shows an "inverted-U" relation between degree of emotional engagement by an individual versus their anticipated potential for degree (including rate and complexity) of knowledge acquisition.

It is generally accepted that the emotional states of a learner and abilities to acquire new knowledge are coupled to each other. FIG. 1 includes aspects of the inverted-U correlation 10 originally developed by Yerkes and Dodson, adapted to help elucidate the systems and methods described herein. When degree of knowledge acquisition 12 is plotted as a function of degree of emotional engagement 11, the dependence is roughly an inverted-U relation 10.

Three regions may be defined within ranges of emotional engagement: 1) a region in which an individual may be only partially engaged, not engaged or even bored 13a where overall mental performance including degree of knowledge acquisition is reduced, 2) a region (between dashed lines and denoted by a triangular fill pattern) that includes optimal engagement for overall cognitive performance including elevated levels of learning 13b, and 3) a region in which there may be excess excitement and/or following protracted periods of elevated emotional stimulation 13c. In the latter case, performance and learning may decrease dramatically as a result of feeling overwhelmed (e.g., resulting from excessive and/or prolonged stress). An optimal learning and performance environment may be attained by modulating the emotional environment within the "engaged" range 13b in FIG. 1 (i.e., avoiding either under-stimulating or over-stimulating within the emotional environment).

Although the term "degree of emotional engagement" 11 is used in FIG. 1, the term is meant to denote at least a rough equivalency to a large number of alternative terms used in various fields to describe a spectrum of emotional states that have an effect on learning, as well as overall performance and emotional well-being of an individual. Early work in the field used terms such as "pressure", "motivation", "alertness", "arousal" and "level of stress". Other terms used to indicate similar notions include "emotional state", "tension", and "degree of nervousness".

The three regions on the horizontal axis within the graph 13a, 13b, 13c in FIG. 1 may also be described using a wide variety of roughly analogous terminology. For example, the region labeled "bored" 13a may also be described in terms of "not engaged", "partially engaged", "not excited", "daydreaming", "distracted", "disinterested" and so on. In some cases, such emotional states may depend on physical states including, for example, being tired, within a physical environment full of distractions, sick and/or depressed. The region labeled "engaged" 13b may be described as "fully engaged", "excited", "motivated", "attentive", "occupied", "inspired", and so on. The region labeled "overwhelmed"

13c may be described in terms of different levels of "anxiety", "strain", "elevated tension", "nervousness", "stress", and so on.

The terms "degree of emotional engagement" and "degree of knowledge acquisition" are used in descriptions herein; however, these terms are meant to be analogous to the many terms used to describe similar relations, such as those discussed above. The vertical axis label 12 in FIG. 1 may refer to a number of different metrics including "depth of knowledge understanding", "performance", "number of formed memories", "rate of memory formation" (i.e., measure over time), "rate of knowledge acquisition", "complexity of newly acquired knowledge", "(perceived) difficulty of new materials", and so on.

Within descriptions herein, although there is substantial overlap in the processes of acquiring and understanding new knowledge, the terms "acquiring" or "acquisition" have been used preferentially during processes to initially obtain new knowledge, and the terms "understand" or "understanding" are used preferentially as that knowledge is internalized, eventually becomes a part of long term memories. A number of analogous terms (e.g., "comprehension", "cognition", "grasp", "cognizance") may also be used to describe such "acquisition" and "understanding" processes.

As one consequence of the coupled nature of emotional and cognitive states, recognizing rates of knowledge acquisition may even be used as one indicator to help measure (and find other indicators) degree of emotional engagement. One aim of exemplary systems and methods described herein may be to modulate an emotional environment of a learner with a goal of keeping emotional state in a range that maximizes a depth and/or rate of acquisition of new knowledge. This emotional range also tends to maximize feelings of emotional achievement, wellbeing and/or happiness within most individuals.

Furthering these generalizations, as described more fully above in the Background section, there may be many different styles of knowledge including, for example, reading or writing about abstract concepts, recognizing a smell, or learning an ability to perform a dance. Acquisition of new knowledge and/or abilities to perform activities may include such styles. Emphasizing the wide range of styles or types of knowledge, "understanding" may include not just the ability to "think about" concepts, but also to use any of the human senses for recognition, to train muscles to perform actions, and so on.

Coupled Emotional and Cognitive Feedback Loops

Figure 2:
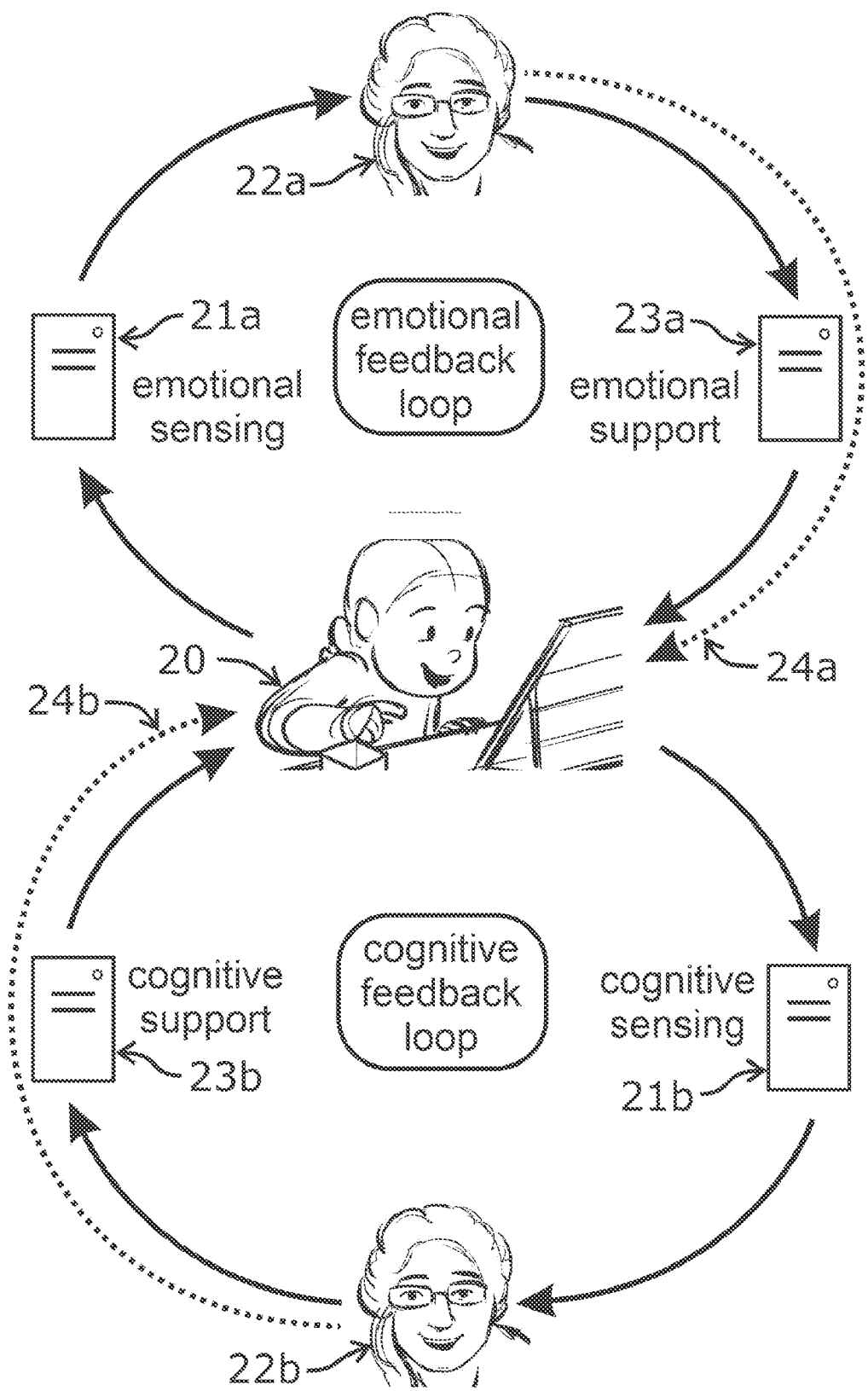
FIG. 2 illustrates feedback loops, containing both human and machine-based elements, in which the emotional and cognitive states of an individual are simultaneously monitored and influenced.

FIG. 2 illustrates elements of two feedback loops, used as a framework to simultaneously monitor and support emotional and cognitive components of an individual's 20 environment. The upper feedback loop 20, 21a, 22a, 23a is composed of human 22a and machine-based 21a, 23a components to sense 21a and control 23a the emotional support environment of an individual 20. Similarly, the lower feedback loop 20, 21b, 22b, 23b is composed of machine-based 21b, 23b and human 22b components to sense 21b and control 23b the cognitive support environment of a learner 20. The emotional state of the individual may be assessed via direct interaction with the individual 20 and/or via interaction with one or more observers of the individual (not shown). The one or more observers may be involved in providing emotional support 22a or not otherwise involved (i.e., strictly providing an observer role).

Information regarding the emotional state of the individual may be conveyed to one or more human supporters 22a involved with emotional well-being of the individual 20. An emotional supporter 22a might, for example, be a parent, guardian, sibling, grandparent, social worker, and so on. Emotional state might include, for example, indications that the individual might be bored, the individual may be frustrated regarding a particular interaction topic, or a predetermined time has elapsed since the last break from a period of intense activity. The one or more human supporters 22a may enact actions by interacting directly with the learner 20 (indicated by a dashed line 24a between the human supporter 22a and the individual 20), instructing machine-based interactions 23a, or a combination of human-22a and machine-based 23a interactions to support the emotional environment of the individual 20.

In a parallel manner, in the cognitive support feedback loop 20, 21b, 22b, 23b in the lower portion of FIG. 2, machine based sensing 21b of the cognitive state of the individual (i.e., learner) 20, including degree and/or rate of knowledge acquisition, may be performed in real-time on a topic-by-topic basis. The cognitive state of the learner 20 may be assessed via direct interaction with the learner 20 and/or via interaction with one or more observers of the learner (not shown). The one or more observers may be involved in providing cognitive support 22b or not otherwise involved (i.e., strictly providing an observer role).

Information regarding the cognitive understanding of the learner 20 may be conveyed to one or more human instructors 22b involved with teaching. Instructors 22b may, for example, include parents, guardians, grandparents, siblings, teachers, professors, work colleagues, online assistants, tutors, and so on.

Indicators of cognitive understanding may include, for example, new inferences based on knowledge presentation or indicators of confusion upon furnishing new ideas. Machine-enhanced cognitive support may also include interjecting optimum times to re-introduce previously covered topics and/or synergistic materials to reinforce the formation of long term memories. Supporting the cognitive environment of the learner 20 may entail the one or more instructors 22b enacting actions or activities by interacting directly with the learner 20 (indicated by a dashed line 24b between the instructor 22b and the learner 20), generating machine-initiated interactions 23b, machine-based "nudges" or suggestions directed at any number of humans (including instructors 22b) that may interact with the learner 20, or combinations of human- 22b and machine-based 23b interactions.

Figure 3:
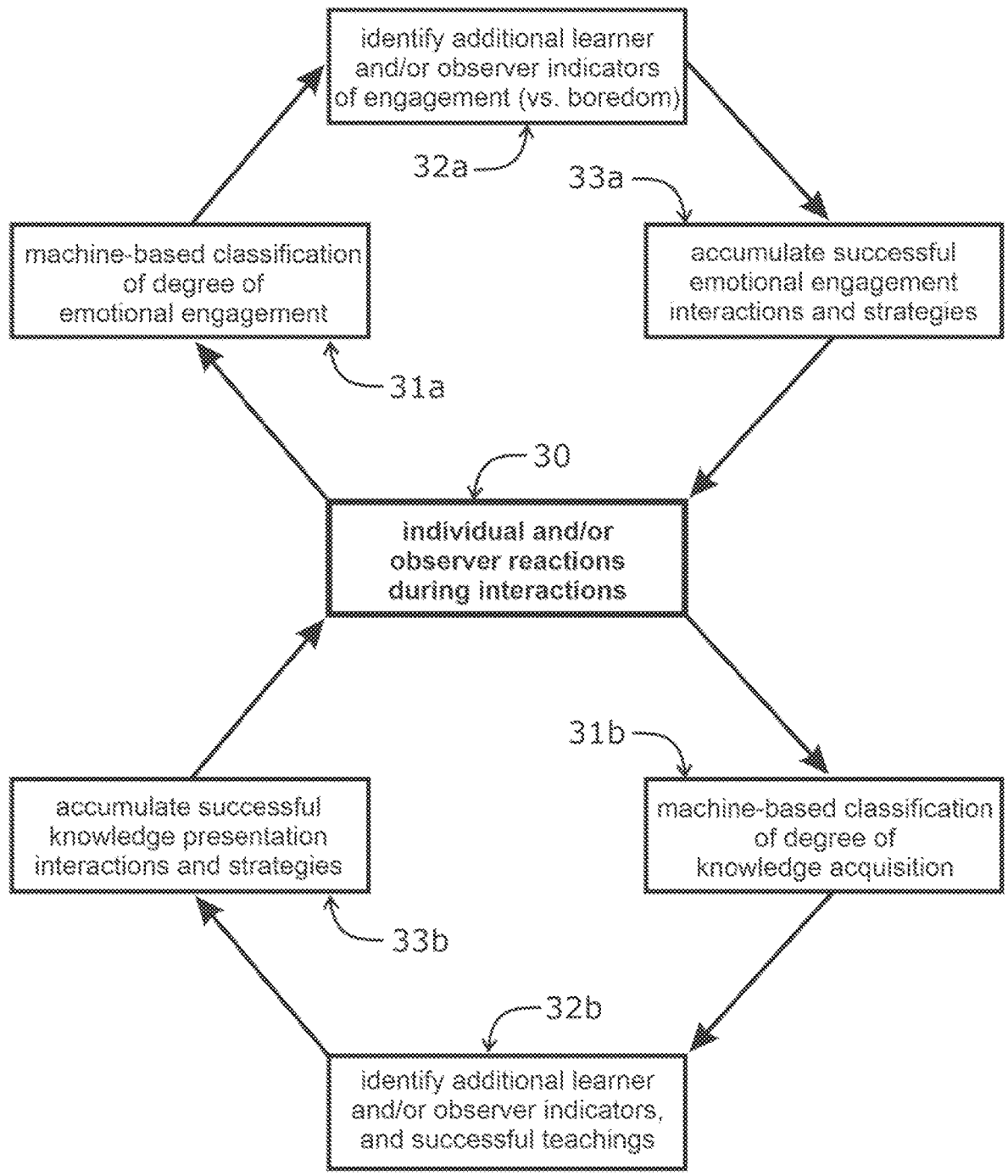
FIG. 3 outlines functional elements within emotional and cognitive feedback loops to accumulate labeled databases of interaction elements that may be used to classify emotional and cognitive states of an individual, and to identify topics that generate known emotional engagement as well as successful (and unsuccessful) teaching strategies.

Following a structure similar to FIG. 2, FIG. 3 illustrates key steps in accumulating databases that may be used to train machine-based approaches to classify emotional (upper feedback loop 30, 31a, 32a, 33a) and cognitive (lower feedback loop 30, 31b, 32b, 33b) levels of an individual. By monitoring one or both of the individual/learner and one or more observers of the individual 30, interaction elements may be identified 31a that contain one or more indicators of a degree of emotional engagement (e.g., ranging from boredom through engaged to overwhelmed). Such interactions may be accumulated within one or more databases 32a that may subsequently be analyzed to identify (e.g., based on the frequency of occurrence of interaction elements) additional interaction elements that are temporally coincident with identified indicators. Alternatively or in addition, interaction components (e.g., video, audio) may be inspected by one or more human analysts and subsequently identified and/or labelled for emotional content. As described in more detail below, such labeling may include identifying specific emotional states (e.g., frustrated, upset, bored, distracted, daydreaming, fully engaged) and/or be graded using one or more spectrums or scales (e.g., from bored through fully engaged to being overwhelmed or stressed).

Within the emotional support feedback loop 30, 31a, 32a, 33a, machines used to implement emotional support interactions and strategies (e.g., HIEs and/or HIAs) 33a may include the same processor and/or inform additional processors involved in classifying cognitive responses 31a, allowing interaction topics and strategies to be labelled according to a specific state (e.g., bored, distracted) and/or degree (e.g., identified on a scale) of emotional response elicited. For example, topics (e.g., art, science, sports) and/or methods of delivery (e.g., podcast, audiovisual, text, drawing) may each be labeled and accumulated 33a according to identified emotional response(s) 33a. Subsequent analyses may then identify (e.g., based on their frequencies of occurrence) topics and/or delivery strategies that evoke positive emotional responses. Conversely, topics and/or delivery strategies that evoke less desired emotional responses may also be tracked and avoided within subsequent interactions. Resultant classification processes may be used at the level of an individual, groups of individuals (e.g., covering particular topics of interest, subsets of ethnic behaviors) and/or be applied to large populations of users.

In a parallel manner, the cognitive support feedback loop 30, 31b, 32b, 33b in the lower portion of FIG. 3 illustrates machine based sensing and classification 31b of the cognitive state of the individual 30, including degree of knowledge acquisition, performed in real-time and on a topic-by-topic basis. The cognitive state of the learner 30 may be assessed via direct interaction with the individual and/or via interaction with one or more observers of the learner 30. The one or more observers may be involved in providing cognitive and/or emotional support, or not otherwise involved (i.e., strictly providing an observer role).

Such interactions may be accumulated within one or more databases 32b that may subsequently be analyzed to identify (e.g., based on factors including the frequency of occurrence) additional interaction elements that are temporally coincident with identified indicators. Alternatively or in addition, interactions (e.g., video and audio elements) may be inspected by one or more human analysts and subsequently identified and/or labelled for indicators of knowledge acquisition. Such labeling may include identifying specific levels of knowledge acquisition (e.g., full understanding, partial understanding, incorrect understanding) and/or be graded using continuous scales (e.g., from full understanding to confusion).

Within the cognitive support feedback loop 30, 31b, 32b, 33b, machines used to classify indicators may be made aware of the teachings and strategies (e.g., including those produced by HIEs and/or HIAs) 33b used to produce the identified cognitive response(s) 31a. This allows teachings and presentation strategies to be labelled according to a discrete state (e.g., understood, generating confusion) and/or degree (e.g., identified on a scale) of understanding elicited. Teaching databases may, for example, include topics (e.g., art, science, sports) and/or methods of delivery (e.g., podcast, audiovisual, text, drawing) accumulated according to labelled cognitive response(s) 33b. Subsequent analyses may identify (e.g., based on their frequency of occurrence) topics and/or delivery strategies that evoke understanding. Conversely, topics and/or delivery strategies that evoke lack of understanding and/or misunderstanding may also be tracked and avoided within subsequent teachings.

Figure 4:
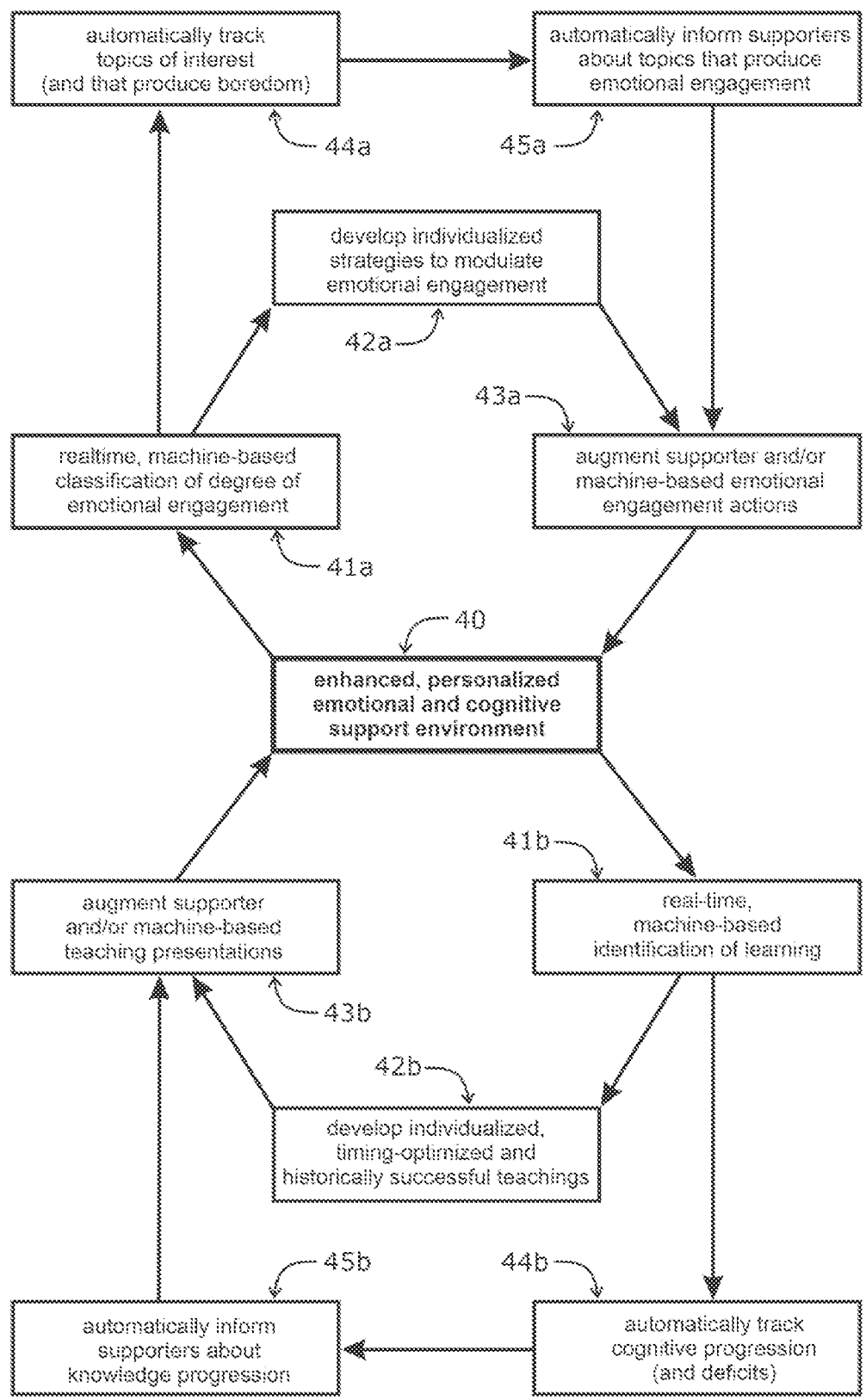
FIG. 4 outlines functional elements during deployment of feedback loops to simultaneously monitor and enhance an individual's emotional and cognitive environments, as well as to inform monitors or supporters about the emotional and intellectual development of an individual.

Within additional embodiments and further developing concepts within parallel emotional and cognitive feedback loops illustrated in FIGS. 2 and 3, FIG. 4 shows key steps to implement the monitoring and controlling functions of the emotional and cognitive states of a learner 40 as well as tracking and informing any appropriate (e.g., legally allowed) parties or "monitors" of a learner's current emotional state, emotional history, knowledge progression and/or overall intellectual development. The upper feedback loops 40, 41a, 42a, 43a, 44a, 45a outline key implementation steps to monitor, track and enhance the emotional environment of an individual/learner 40. Within the inner feedback loop 40, 41a, 42a, 43a, processing includes classifying (e.g., utilizing training data sets accumulated as described in FIG. 3) in real-time, degrees of emotional engagement 41a by the individual 40. These classifications may be performed based on direct interactions with the individual 40 and/or interactions with one or more observers (not illustrated) of the individual.

Classifications may be conveyed to human and/or machine-based entities to, for example, develop individualized, real-time strategies to modulate the emotional environment of the learner 42a. In this case, the term "modulate" is being used to signify maintaining an emotional environment within a peak range for cognitive stimulation (see FIG. 1). Insufficient or excessive emotional stimulation reduces abilities to learn, as well as to form long-term memories and/or to maintain optimal cognitive function. Analogous terminology that may be used to describe such modulating processes include "regulating", "augmenting", "influencing" and "managing".

Activities designed to modulate emotion (machine-based and/or developed by one or more humans) may be passed onto one or more humans and/or machine-based interaction entities 43a (i.e., HIEs and/or HIAs) that support the emotional environment of a learner 40. The one or more human supporters 43a may be the same or distinct from any involved in developing specific emotional 42a or cognitive 42b support strategies. Strategies may, for example, include nudging (i.e., suggesting to) a human supporter and/or animating a cartoon-like character with activities to elevate or lower the level (e.g., rate, intensity) of emotional interaction. Strategies may, at least in part, be based on responses produced by previous emotional classifications made during HIE-based interactions (i.e., incorporating "memory").

The outer feedback loop 40, 41a, 44a, 45a, 43a within the upper portion of FIG. 4 outlines key steps in maintaining databases to track emotional states 44a including, for example, topics that generate heightened interest or disinterest by the individual 40. Classifications of degrees of emotional engagement 41a and actions that elicited such emotions 43a may be automatically labelled and archived 44a.

In addition, cognitive topics 43b associated with the classified emotions 41a may be sorted, for example, into those that generate learner interest, boredom, confusion, frustration, sense of being overwhelmed, stress, and so on 44a. Machine-base maintenance of such topics and their emotional reactions may be used to inform supporters of the individual 45a who, in turn, may direct (or be a direct part of) intervening interactions 43a with the individual. The informing of emotional reactions and related topics may be performed on a topic-by-topic basis, periodically (e.g., following a schedule), or on an as-needed basis (e.g., immediately, if emotional distress is detected).

In a parallel manner, the lower feedback loops 40, 41b, 42b, 43b, 44b, 45b outline key implementation steps to monitor, track and enhance the cognitive environment of an individual/learner 40. Within the inner feedback loop 40, 41b, 42b, 43b processing includes classifying (e.g., utilizing indicators within training data sets accumulated as outlined in descriptions associated with FIG. 3) in real-time, degrees of cognitive acquisition 41b by the learner 40. These classifications may be performed based on interactions with the learner 40, and/or interactions with one or more observers of the learner. Classifications may be passed on to human and/or machine-based entities to develop individualized, real-time teaching strategies 42b.

Cognitive support strategies (machine-based and/or developed by one or more humans) may be passed onto one or more human supporters and/or machine-based (e.g., HIEs and/or HIAs) interaction entities 43b to enhance the cognitive environment of the learner 40. The one or more interactive human supporters 43b may be the same or distinct from any involved in developing teachings 42b, or that provide emotional support, described above.

Informing Monitors of Emotional and Cognitive Progression

The outer feedback loop 40, 41b, 44b, 45b, 43b within the lower portion of FIG. 4 outlines steps to accumulate and maintain databases to track cognitive progression 44b including topics that are well-understood, partially understood or not understood. Classifications of degrees of cognitive acquisition 41b and teachings that elicited such understanding 43b may be automatically labeled and archived 44b. In essence, real-time "report cards" that may cover all learning (i.e., on a topic-by-topic basis) may be maintained. Machine-generated report cards may be used to inform learners' supporters 45b. Such supporters and/or "monitors" may include those directly involved in the formal and extracurricular education of an individual (e.g., in-person or online teachers, coaches, professors, tutors) as well as to those who might be responsible or supportive of an individual's overall wellbeing (e.g., parents, other family members, guardians, counselors). The informing of cognitive progress and/or topics that may require teaching reinforcement may be performed on a topic-by-topic basis, periodically (e.g., following a schedule), or on an as-needed basis (e.g., if a learning opportunity, such as a field-trip or exemplary repair of a device, arises).

In addition to machine-based processes to help keep monitors up-to-date, machine-based tracking of progress (or areas of concern) may save substantial time and effort on the part of a monitored individual and/or lessen emotional challenges related to formal reporting (e.g., sometimes associated with traditional report cards). Distribution of such information may be limited by legal restrictions associated with personal privacy and/or by personal preferences. Additionally, the tracking and dissemination of such information to monitors and educators may facilitate a number of enhanced teaching strategies including avoiding repetition of particular topics by one or more instructors, synergistically presenting additional materials related to topics just learned, intervening when the rate of acquiring new knowledge appears to slow down or be less than expected, and/or providing congratulatory and other positive emotional support as learning and/or emotional development progresses.

As an example of the need to separately monitor emotional and cognitive development, the teenage years are a particularly challenging time to balance emotional and cognitive support. This arises, at least in part, due to the fact that the emotional parts of the brain (various limbic structures including the amygdala) develop over about ten to twelve (10-12) years, whereas the reasoning parts of the brain (including the frontal lobe, described above) takes up to twenty two to twenty four (22-24) years to fully mature. Thus, the relative proportions that emotional versus cognitive components may play in strategies to optimally support the intellectual development of an individual may vary greatly as a function of age.

The machine-based generation, maintenance and distribution of emotional and cognitive progression may have a number of additional advantages and applications. Despite best efforts to maintain frequent communication with teachers, coaches, counselors, educational administrators, and others, it is often difficult for parents or guardians of students to keep abreast of progress across all of the different subject matters typically covered in both formal and extracurricular education. Even a learner may not fully keep track of progress, or areas of concern, in knowledge understanding within different topics.

This situation is exacerbated as the world moves toward an increasing reliance on remote and/or hybrid learning, utilizing distance communication (i.e., interpersonal communication in which the physical gap between participants is beyond the physiological limits of unaided human perception). Distance education has a number of potentially significant benefits including removing geographic barriers, access to presentations by world leaders in a wide range of disciplines, providing an opportunity to serve those who are physically isolated, and self-paced learning; to name a few. However, although online questioning and formal testing may provide some degree of feedback, distance instruction often lacks close monitoring of knowledge acquisition and emotional environments, as well as other learning contributors such as attention, motivation and self-regulation.

Within further embodiments, machine-based methods to determine and track knowledge acquisition may be set up to automatically (or selectively, for example, based on topic area) inform all or any subset of monitors. Dissemination may also be set up to occur automatically (i.e., without significant involvement of the learner), based on learning progress, or periodically under the control of one or more instructors, supportive persons or the learner him or herself.

Distributed information may include any or all aspects (known to the HIE) of the methods and materials for knowledge presentation, the time when knowledge was understood (or not acquired), a confidence score (if determined) that knowledge was understood, and/or links to lead-up and/or follow-on materials related to the new knowledge. Accumulated databases to track the progression of an individual may also include feedback from the one or more monitors and/or any other individuals involved in a learner's development (e.g., coaches, counselors, employers). Such a centralized, machine-driven repository of cognitive progression provides resources for all involved parties to be kept up-to-date.

Alternatively or in addition, monitors of an individual may be informed of classified degrees of emotional engagement and/or other emotional states. Such updates may be particularly valuable for a monitor (e.g., parent, friend) to determine and track topics of interest (or, conversely, disinterest). At a practical level, such information may help to identify objects (e.g., gifts), contacts (e.g., particularly significant friends) and/or other resources (e.g., tutors) that might improve the emotional and/or cognitive environment(s) of the individual. If deep understanding of a substantial topic is achieved, then recognizing such an achievement might trigger celebration. If signs of boredom, feeling overwhelmed and/or stress are determined, such real-time tracking may help facilitate when intervention may be appropriate.

Real-Time Monitoring of Emotional and Cognitive Environments

Figure 5:
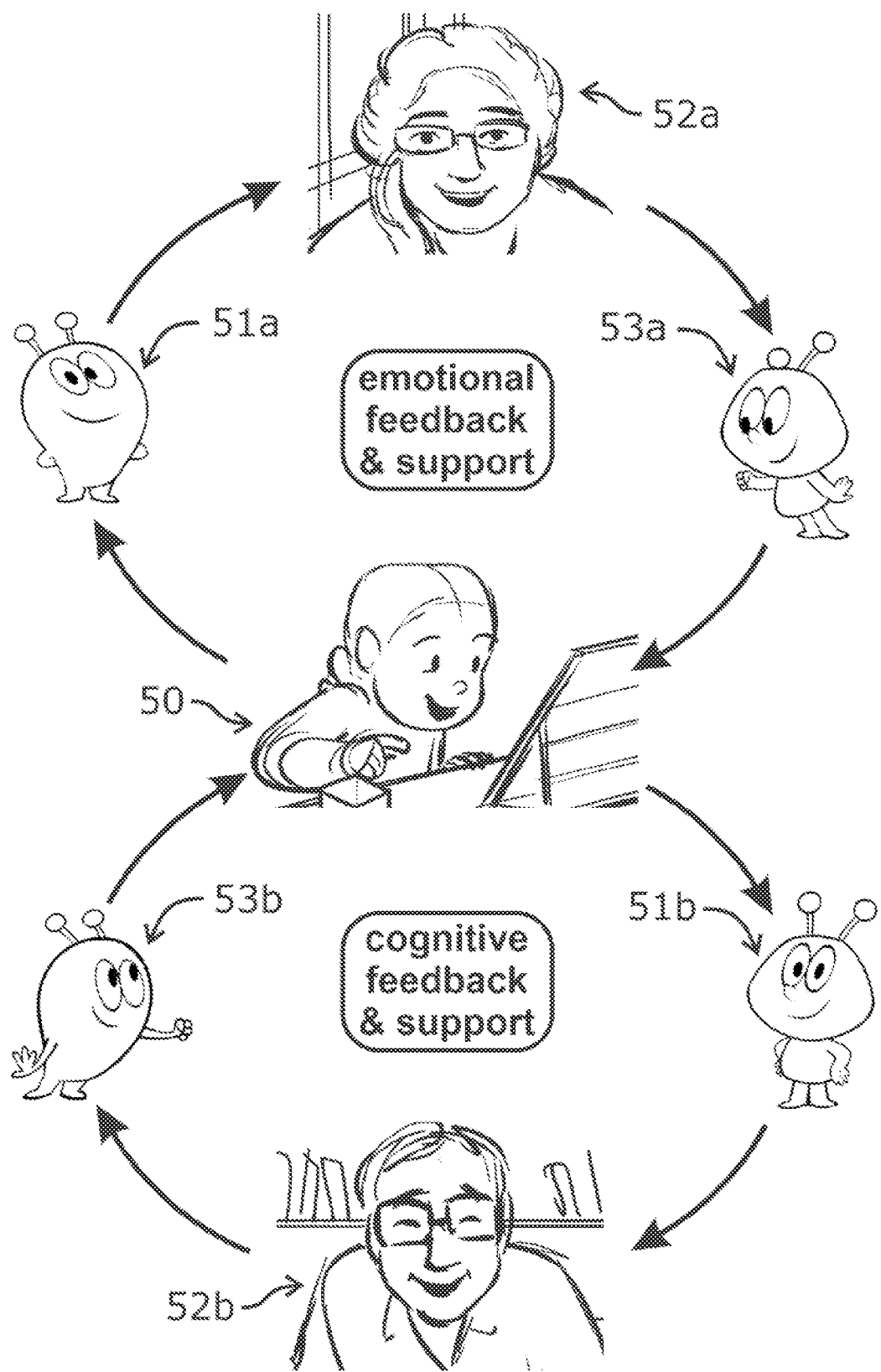
FIG. 5 summarizes, within simultaneous feedback loops, abilities to monitor and enhance the emotional and cognitive support environments of an individual using machine-based interactive elements (represented by cartoon-like characters).

Using the same general layout as in FIGS. 2, 3 and 4, FIG. 5 summarizes the machine learning and human based components of system and methods to simultaneously monitor and modulate the emotional and cognitive environments of an individual. In FIG. 5, cartoon-like characters 51a, 51b, 53a, 53b represent machine-based processes for interaction with an individual 50. Indeed, machine-based interactions implemented by HIEs and one or more HIAs may include individual exchanges with such cartoon-like characters 51a, 51b, 53a, 53b and/or avatars that exhibit a "personality" that is familiar to the individual 50. Within the emotional support feedback loop 50, 51a, 52a, 53a, machine-based sensing 51a of the emotional state of the individual 50, including degree of emotional engagement, may be performed in real time. The emotional state of the individual 50 may be assessed via direct interaction with the individual 50 and/or via interactions with one or more observers (not shown) of the individual 50. The one or more observers may be involved in providing emotional support 52a or not otherwise involved (i.e., strictly providing an observer role).

In the exemplary arrangement shown in in FIG. 5, two distinct humans 52a, 52b are shown interacting with a child 50, where one 52a is shown primarily supporting the emotional environment of the child 50 and the other 52b is primarily providing cognitive support. As an example of this situation, a parent may provide much of the emotional environment for a learner, whereas a professional instructor or tutor might primarily provide a cognitive environment. More generally, one or more humans involved in the support environment of a learner may individually interact with specific topics and/or components of the support systems (e.g., instructional, emotional, performance monitoring), be involved with both emotional and cognitive components, interact with different support aspects at different times, or a single human may provide all aspects of emotional and cognitive support.

Figure 6A:
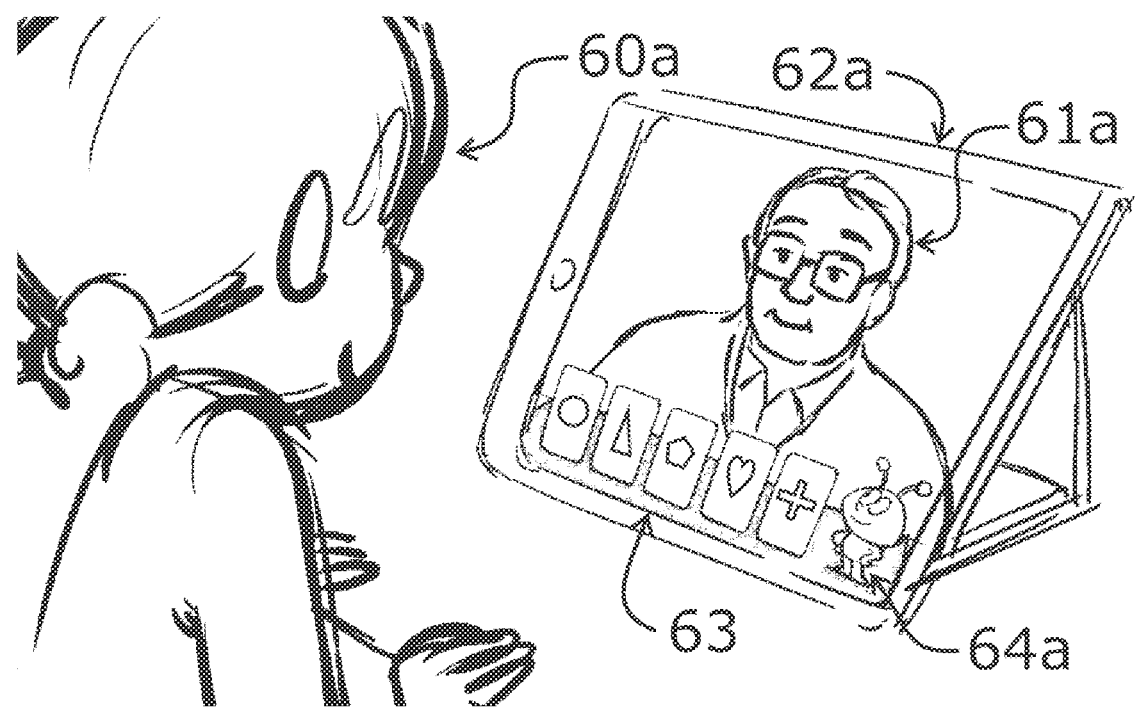
FIG. 6A shows a scene from a scenario in which a grandfather, using distance communications, instructs a young child about different shapes (i.e., geometries) using virtual flashcards.
Figure 6B:
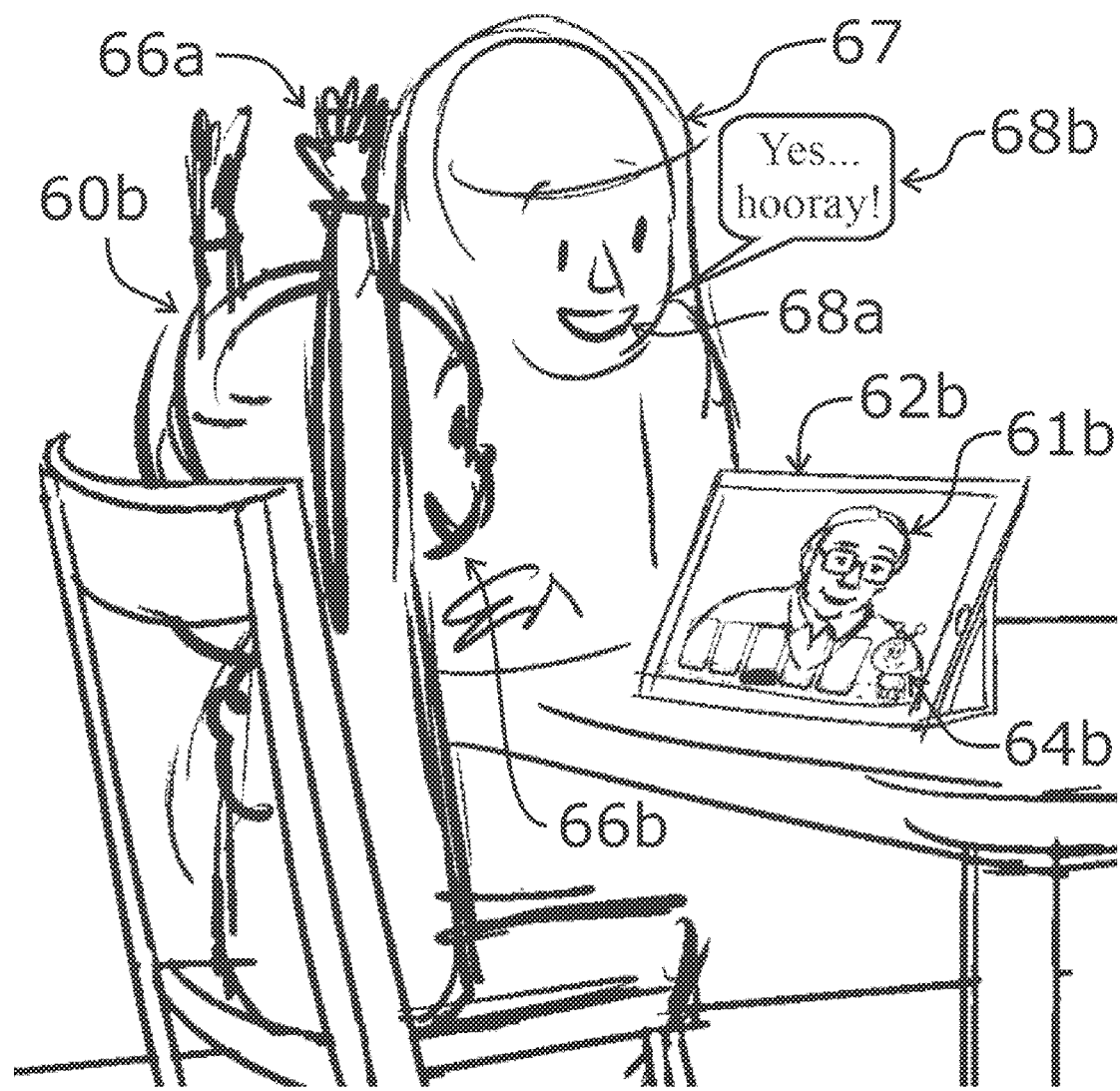
FIG. 6B follows on with the scene depicted in FIG. 6A, where concurrent indications of substantial knowledge understanding by the child include the child's facial expressions and raising of hands, smiles, and encouraging words by a nearby parent (i.e., an "observer"), and facial expressions by the distant grandparent.

FIGS. 6A and 6B shows a scene from a scenario illustrating various aspects of emotional support and knowledge acquisition by a human that may be identified and subsequently utilized by machine-based techniques to modulate emotional engagement, and encourage and enhance learning. In this scenario, the upper portion of FIG. 6A illustrates aspects of distance education of a young girl 60a with new knowledge being shown on a display device 62a acting as a HIE (for the young girl 60a and, in this case, additionally servicing her parent 67, as illustrated in FIG. 6B). The knowledge involves identifying and naming geometric shapes (i.e., circle, triangle, pentagon, heart, and plus sign shown from left-to-right) appearing within a series of virtual flashcards 63 on the display 62a. The new knowledge is orchestrated by a distant grandparent 61a interacting with the young girl 60a via a network link and audiovisual display device (e.g., HIE, tablet, laptop computer).

Within the scenario, new knowledge may originate from the grandparent 61a; one or more additional humans (not shown); pre-arranged lesson plans (e.g., developed by professional educators or motivators); information streamed using traditional coding techniques (e.g., audio recording, audiovisual displays); an AI instantiated within the HIE 62a; one or more AIs instantiated within remote computational resources (not shown); and/or combinations of such content originators. The new knowledge may be presented to the young girl 60a via audiovisual exchanges with the grandparent 61a, a cartoon-like character 64a on a display 62a, or a combination of such human and machine-based interaction modes.

A short time later, as illustrated in FIG. 6B, the young girl 60b exhibits happiness upon feeling that she has understood one or more aspects of the new knowledge just presented. Machine-based identification of knowledge acquisition by the young girl 60b may be determined (essentially simultaneously) as a result of multiple detected behaviors: 1) the young girl is observed raising her hands 66a in delight, detected by one or more cameras (not shown) within the HIE 62b, 2) the young girl 60b displays a broad smile and wide-open eyes 66b that may also be detected by a camera within the HIE 62b, 3) the girl's nearby mother 67, acting as an observer, produces a broad smile 68a detected via one or more cameras within one or more HIEs (and/or HIAs) 62b directed at the environment of the young girl and/or mother, 4) the mother 67 expresses the words "Yes . . . hooray!" 68b detected via a microphone (not shown) within one or more HIEs 62b, 5) as a distant observer, the grandparent 61b exhibits a smile acknowledging understanding by the young girl 60b, detected by a camera within a distant HIE (not shown), and 6) the grandparent may also indicate via his HIE that he believes knowledge has been understood (e.g., via touching a touch screen, keyboard or mouse) and/or 7) by simply moving onto the next instructional topic.

Upon determining that the young girl 60b has grasped the new information, the HIE displays a cartoon-like character 64b on the screen 62b, which reacts with a smile directed at the young girl 60b and/or an animation to acknowledge and reward successful knowledge acquisition. In multiple fashions, human and machine-based engagements may synergistically interact to provide supportive emotional environments, and monitor, encourage, assess and enhance learning.

Human Interaction Entity (HIE)

A HIE may comprise an interactive electronic device, such as a desktop computer, portable computer, tablet, cellphone, and the like, encompassing one or more processors, memory, user interfaces (e.g., including one or more sensors or input devices, and/or one or more actuators or output devices), communication interfaces, and/or other hardware, firmware and software components, as more fully set forth in descriptions associated with FIG. 7 below.

Some HIE (i.e., electronic device) functions may be performed by additional operatively coupled systems (e.g., an associated HIA and/or remote servers including one or more processors, memory, and/or other hardware components and/or software modules). Optionally, a HIE may be instantiated with one or more artificial intelligence "personalities" (AIPs), "characters" or "companions" to implement familiar, socially acceptable and effective communication experiences. The HIE may manage and perform communication experiences to enhance social connectedness and encourage learning.

Machine (i.e., electronic device) based interactions with one or more humans enacted by HIEs may be 1) physical, 2) virtual, or 3) a combination of physical and virtual, particularly at different times or within different interaction environments (e.g., a physical device when a user is seated and a related virtual avatar displayed on a mobile device when moving about). Physical HIEs (and/or a collection of interacting and/or coupled human interaction accessories, HIAs) may include hand-held interaction devices, robots (moveable or substantially stationary), robotic pets, robotic toys (e.g., dolls, teddy bears, baby-like figures, mechanical constructions), and human-like objects (e.g., face, head, hand, full body).

Virtual HIE functions may have features found in avatars, digital assistants, cartoon characters, or synthesized persons or pets that may be displayed on computer monitors, screens, laptops, mobile devices (phones, tablets, smart watches, etc.) or other display devices including augmented reality, mixed reality and virtual reality headwear. Virtual HIEs may also be displayed as holograms, holographic-like projections, light-field projections, and other techniques that make video objects appear 3-dimensional.

In exemplary embodiments, HIEs (i.e., electronic devices) may include environmental sensors (i.e., sensors measuring one or more elements within the environment of the HIE), and human interaction sensors (i.e., measuring interactions between the HIE/HIA and a user). Environmental sensors may include one or more cameras (i.e., directed toward the environment of a user), light sensors, thermal sensors, motion sensors, accelerometers, global positioning system (GPS) transceivers, microphones, infrared (IR) sensors, galvanometric sensors, pressure sensors, switch sensors, magnetic sensors, proximity sensors, date and time clocks, Bluetooth transceivers, and Wi-Fi transceivers. Environmental sensors may also include devices worn by a user but directed at the environment such as smart glasses (e.g., Google Glass), augmented reality headwear, earbuds (e.g., with a microphone), smart watches, and so on.

Human interaction sensors may include one or more cameras (i.e., directed toward a user), thermal sensors, motion sensors, accelerometers, microphones, infrared (IR) sensors, galvanometric sensors, heart rate sensors, electrocardiogram sensors, electrooculogram sensors, electroencephalogram sensors, pulse oximeters, assistive devices, pressure sensors, magnetic sensors, activity monitoring devices, computer mice, joysticks, keyboards, touch screens, and proximity sensors. Both environmental and human interaction cameras may include an ability to pan and zoom.

Resultant interaction data that may be used to classify degree of emotional engagement and/or degree of knowledge acquisition may include one or more of one or more audio recordings, video recordings, button pushes, heart rate recordings, respiration recordings, biometric recordings, sip-and-puff recordings, accelerometer movements, keyboard presses, computer mouse movements, joystick movements, trackball movements, touchpad touches, screen touches, pointing stick movements, eye tracking recordings, range finder recordings, musical instrument recordings, and digital pen recordings.

In cases when a HIE functions include a physical object, or a collection of interacting and/or coupled HIAs, the acceptability of human interactions may be enhanced by movements, gestures, information displays, pointing, sounds, and other forms of HIE/HIA outputs or interaction. Actuators or other output components may include one or more video display devices, hologram display devices, holographic-like projectors, speakers, buzzers, propulsion systems, servos, motors, magnetic field controllers, orientation controllers, haptic controllers, laser light and other forms of pointing devices, switch controllers, actuators for appendage control, and controllable tactile surfaces.

In additional exemplary embodiments, HIE output modes may change, depending on time and circumstances. For example, a full range of HIE outputs may be utilized in a stationary environment while video-only exchanges are performed in a mobile setting and/or audio-only outputs may be produced while driving. Generally, more freedom of movement is available using untethered HIEs and/or HIAs (i.e., not connected to any fixed wired power or telecommunications source). Tethered HIEs may allow for continuous interaction (with fewer concerns regarding power consumption, battery life, etc.) and/or more sophisticated interaction devices (e.g., holographic displays, projected images, etc.). In further exemplary embodiments, a combination approach may be employed, where wireless telecommunications are used during most interchanges during the daytime and the recharging of batteries and/or database updating are additionally performed when tethered at night (e.g., while a user is asleep).

HIE memories and experiences may include those acquired as a result of interactions with users via human interaction sensors. Such interactions are often multi-modal in nature, involving inputs from a number of sensors (audio, visual, tactile, biometric, etc.), sensing over a wide range of scales (e.g., camera sensors that detect small movements of the eyes, larger movement of the head, gross gestures observed when viewing the entire body, recognized objects within landscapes), and over a wide range of time scales (from milliseconds to months). HIEs may be updated, partially or fully, based upon the availability of new information and/or computational resources; and/or other forms of direction provided by other parties such as technicians, psychologists, counselors, teachers, advisors, supervisors, other humans, and/or other HIEs.

HIE (i.e., electronic device) software and/or firmware may be implemented by combinations of traditional programming, and various forms of machine learning including convolution neural networks and/or deep learning techniques. Neural networks may encompass large components of HIE operations such as expression of a wide range of behaviors and control of actuators of a HIE and/or HIA. Alternatively, combinations of neural networks and/or non-neural network based programming may be segmented into sub-components where each subsystem performs specific tasks, such as identifying degrees of knowledge acquisition, emotion recognition, searching strategies to acquire new information, speech recognition, cursive script recognition, word translation, speech formation, facial feature recognition, gesture recognition, natural language processing, animation display, control of articulated movements, holographic display and so on.

Figure 7:
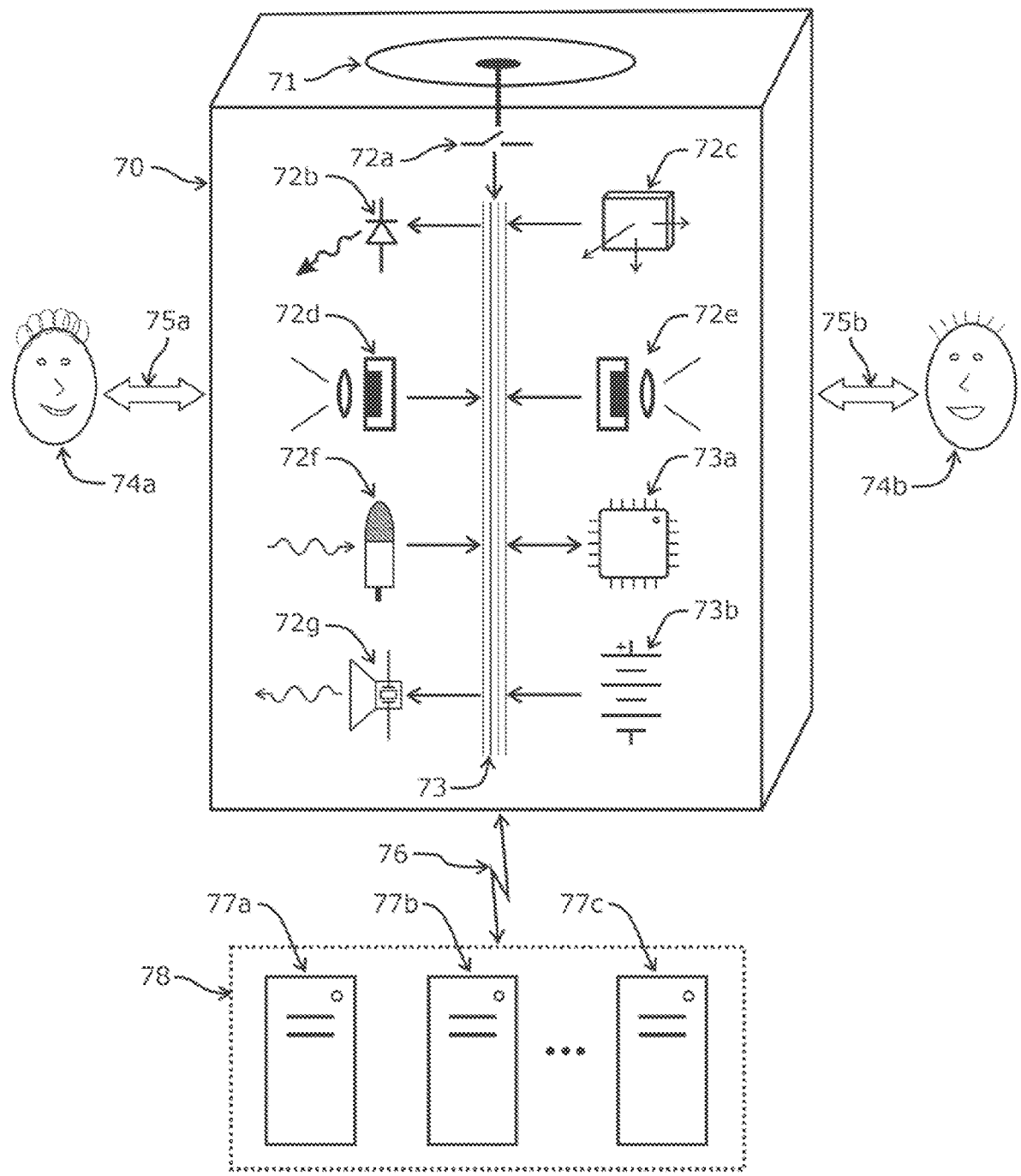
FIG. 7 shows sensor and actuator components that may be included in one or more human interaction entities (HIEs) and/or associated human interaction accessories (HIAs) that, along with optional access to remote computational resources, may help monitor and influence emotional and cognitive states, deliver new knowledge and detect knowledge acquisition.

FIG. 7 illustrates exemplary sensor and actuator components that may be included in one or more human interaction entities (HIEs) and/or one or more human interaction accessories (HIAs) that communicate with a HIE. One or more HIAs associated with a HIE may be considered as providing one or more subcomponents of HIEs and are often untethered, allowing for increased mobility and portability (e.g., physically small, lightweight, inexpensive, low power consumption) during user interactions. In mobile situations, HIEs and/or HIAs may include one or more single-use or rechargeable batteries $73b$ and one or more processing elements $73a$ with varying degrees of computational power from field-programmable gate arrays (FPGAs) and application specific integrated circuits (ASICs) to multi-processors and hardware acceleration (e.g., for neural network processing). HIE components $72a$, $72b$, $72c$, $72d$, $72e$, $72f$, $72g$, $73a$, $73b$ may be interconnected via printed circuitry that generally contain multiple pathways and/or bus structures 73 for rapid, inter-component communication.

A HIE (and optionally, one or more associated HIAs) 70 may include a range of components designed to direct information to a user including one or more light sources $72b$, ranging from individual light-emitting diodes (LEDs) to multi-spectral display panels; one or more sound generating devices $72g$, ranging from piezo-driven buzzers to high-performance earphones or speakers; and other output (i.e., from the perspective of the HIE) devices (e.g., haptic systems, projection systems, augmented reality displays).

A HIE (and one or more associated HIAs) 70 may also include a range of components designed to sense user responses, ranging from simple push buttons 72a affixed, for example, to the surface 71 of the HIE or HIA; one or more cameras 72d, 72e that may be pointed at an individual user 74a, another human observer 74b and/or the HIE environment; one or more microphones 72f to sense sounds in the environment of the HIE or HIA; single dimensional or multidimensional motion detectors (e.g., accelerometers) 72c that may sense movements such as shaking the HIE or HIA and/or tilting relative to the gravitational pull of the earth; and other input (i.e., from the perspective of the HIE) devices (e.g., touch screen, computer mouse, track ball, keyboard, joystick, smart pen).

A HIE (and associated HIAs) 70 may interact 75a exclusively with a single human user 74a. In this situation, other users, if participating, may possess their individual HIEs or other processor-based interaction devices (e.g., tablet, laptop). Alternatively, a HIE may interact 75a, 75b, at any given time or at different times, with multiple users (e.g., 74a, 74b). For example, a HIE may be used to present new knowledge to a learner (e.g., 74a). The HIE may detect responses of the learner using a push button, 72a, motion detector 72s, camera 72d and/or microphone 72f The same HIE may additionally monitor the responses of an observer of the learner using the same 72d or different 72e cameras and microphone(s) 72f In other words, a single HIE may perform the combined functions of two or more HIEs.

In further exemplary embodiments, substantial processing may be required to enact HIE-human interactions including monitoring emotional engagement, delivering new knowledge and subsequently monitoring for knowledge understanding. Different HIEs (and associated HIAs) may possess different levels of computing resources. In cases where insufficient computing resources are available within a HIE to deliver timely interactions, sequencing and computations may optionally (indicated by a dashed-line enclosure 78 in FIG. 7) be offloaded to one or more remote processors 77a, 77b, 77c. This may be enacted using telecommunications protocols (e.g., Wi-Fi, TCP/IP) 76 known in the art, as well as so-called cloud computing that may include large-scale processor arrays and/or hardware acceleration (e.g., particularly for neural net training and/or processing).

Optionally, a HIE/HIA may be instantiated (i.e., embedded within software, firmware and/or hardware) with an AI "personality". For the purposes of the present application, an AIP (i.e., artificial intelligence personality) is an understanding construct that may generate machine-based interactions with one or more humans in a human, cartoon, or pet-like manner in substantially real-time. An AI or AIP may include a background or database of: 1) information, 2) memories and/or 3) experiences. Including memories and knowledge in the form of a familiar character and/or interaction methodology that is specific to an individual may help improve emotional and learning environments by avoiding potentially distracting novelty within interaction processes, producing more accepting and relaxed environments.

The "personality" component of an AI may be always present, present at selected times, or not available at all. Examples where effectiveness may be enhanced by having a "personality" present, or at least available, include expressions by a cartoon-like character on a screen or inclusion of a HIE within a favorite toy, always available to respond to prompts by a child. Examples of situations where it may be preferable to perform assessment and tracking of knowledge understanding absent a "personality" include during more formal examinations (e.g., for licensing, certification, or advancement) and/or during circumstances where memories and/or experiences of a personality have not been developed (e.g., questionnaires within offices of a doctor, legal advisor or insurance provider).

In exemplary embodiments, expressions of HIE-based knowledge or information may be: 1) embedded within machinery (e.g., software, firmware and/or neural networks), and/or 2) incorporated via the capability of being able to search for information when needed using telecommunications such as searching the internet and/or so-called "cloud." Some information may be specifically taught to a HIE, such as the birth dates and anniversaries of all users within a human network as well as, for example, their relatives and acquaintances. Other information may be known and available more globally, accessed via internet search strategies that are known in the art. Searching and selecting information along with the ability to synthesize new information from such multiple sources greatly expands the "intelligence" component of a HIE. Further aspects of the systems and methods to establish, time-share and/or time-shift a cumulatively acquired AIP are described in U.S. Pat. No. 10,762,414, filed Apr. 19, 2019, U.S. Pat. No. 10,915,814, filed Jun. 15, 2020, and U.S. Patent Application Ser. No. 63/043,060, filed Oct. 23, 2020, the entire disclosures of which are expressly incorporated by reference herein.

Monitoring Degree of Emotional Engagement

In exemplary embodiments, a wide range of modalities (e.g., audio, video, touch screen) of interaction components may be monitored to determine a degree of emotional engagement by an individual. An interaction to monitor degree of emotional engagement may be in response to an action or activity sourced by a HIE and/or one or more humans, or may not be the result of any particular identifiable activity. (i.e., when indications of degree of emotional engagement occur spontaneously).

As described above, any number of degrees of emotional engagement may be determined; however, three degrees (i.e., bored, engaged, overwhelmed) may be of particular value when monitoring and subsequently supporting and/or modulating the emotional environment of an individual (see FIG. 11). Beginning with "engaged", common indications (and examples within parentheses) by many humans include:

words (e.g., "interesting", "exciting")
phrases (e.g., "I like it", "That's it!")
interjections (e.g., "OK", "wow")
utterances (e.g., "yeah", "hooray")
gestures (e.g., particularly movements of larger body parts designed to attract attention)
smiles
hand movements (e.g., waving, particularly toward oneself and/or to attract attention)
configurations of hand digits (e.g., thumbs up, pointing)
written symbols (e.g., bold strokes, profuse writings)
head movements (e.g., particularly vertical nods)
facial muscle movements (e.g., particularly those associated with focus)
eye movements (e.g., real-time following aspects of an activity within individual's environment)
HIE/HIA button pushes and screen touches (e.g., rapid, forceful)
reactions related to engagement (e.g., signalling desire for further engagement)

questions related to interactions (e.g., particularly questions regarding implications of any newly presented materials)

one or more changes in voice tone (where specifics generally depend on language)

voice volume (e.g., easily heard by others), and responding immediately to interactions initiated by a HIE or human.

When "bored" (or similar term) emotional levels are detected, a HIE may respond by directly acting or prompting other humans to initiate activities that attempt to raise interest levels of an individual to re-engage with either or both of HIE and other humans. Common indications (and examples within parentheses) of boredom include:

words (e.g., "Boring!", "exhausting")
phrases (e.g., "I heard that before.", "Are we there yet?")
interjections (e.g., "What?", "annoying")
utterances (e.g., "blah", "ho-hum")
gestures (e.g., waving off)
nods (e.g., particularly in the horizontal direction to indicate lack of interest)
hand movements (e.g., waving "goodbye")
leg movements (e.g., shaking)
configurations of hand digits (e.g., thumbs down)
written symbols (e.g., symbols drawn lightly, doodling)
head movements (e.g., tilting to one side, stationary)
facial muscles (e.g., relaxed, not animated)
eye movements (e.g., gaze not directed toward any individual attempting to engage)
eyelid positions (e.g., partially or fully closed)
HIE/HIA button pushes and screen touches (e.g., slow or unresponsive)
movement of one or more objects sensed by the HIE/HIA (e.g., fiddling or playing with objects not related to engagement)
lack of questioning
not attempting to make inferences related to interactions
voice volume (e.g., barely audible or inaudible), and
prolonged time to respond to interactions initiated by a human or HIE.

When an "overwhelmed" or "stressed" (or similar term) emotional level is detected, a HIE may act directly or prompt other humans to initiate activities to reduce the stress levels of an individual. This might, for example, involve slowing rates of interaction, suggesting physical activities, and/or switching interaction topics (by the HIE or other interacting humans). Common indications (and examples) of being in an overwhelmed state by many humans include:

words (e.g., "Stop!", "What!")
phrases (e.g., "I'm stressed out.", "I quit")
interjections (e.g., "whoa", "no")
utterances (e.g., "uh-huh", "ouch")
gestures (e.g., particularly revealing a palm, indicating "stop")
tightening or sad appearance of muscles around the mouth
hand movements (e.g., waving off attempted engagement by others)
configurations of hand digits (e.g., offensive gestures)
written symbols (e.g., written forcefully)
head movements (e.g., particularly in the horizontal direction)
arm, leg and other muscle movements (e.g. trembling)
facial muscles (e.g., tightened throughout)
forehead muscles (e.g., frowning)
eye movements (e.g., intense, reactive)
changes in pupil size (e.g., stress-related pupil dilation)
eyelid blinks (prominent in some individuals)
HIE/HIA button pushes and screen touches (e.g., rapid and/or repetitive)
shaking a HIE/HIA (e.g., with exaggerated intensity)
movement of one or more objects sensed by the HIE/HIA (e.g., thrown or discarded objects)
reactions related to attempted engagement (e.g., withdrawn)
reactions to attempted questioning (e.g., responses unrelated to questioning)
reactions to attempted engagement (e.g., reactions unrelated to engagement topic)
one or more changes in voice tone (e.g., elevated pitch)
one or more changes in voice volume (e.g., loud, outbursts), and
brief times between attempted engagement and (perhaps unrelated) reactions.

Mechanical activities (e.g., pointing, shaking, button pressed) sensed by a HIE/HIA may be particularly useful (combined with audio and video data) during assessments of degrees of emotional engagement. For example, performing activities requiring a degree of precision (e.g., drawing, typing, driving a virtual car) may indicate high levels of engagement. High levels of activity (e.g., multiple button presses, continuous movement, rapid responses) may be indicative of engagement. On the other hand, prolonged periods of HIE/HIA inactivity (particularly when an essential part of an activity) and/or delayed reactions may be indicative of a disengaged state (e.g., bored, distracted).

Many of the same interaction modes (e.g., words, interjections, gestures) may be used by an observer to indicate (to a HIE) an individual's emotional state. Indeed, an observer might show a degree of satisfaction in determining that an individual is in an "engaged" state. However, classification schemes must distinguish features within observer interactions from those used to directly detect the emotional state of the individual. For example, an observer may show signs of being fully engaged in conveying observations to a HIE; however, such observations may indicate that the observed individual may, for example, be in a "bored" or "overwhelmed" state (i.e., unlike the observer).

Distinctions between the interactions of an observer versus those of an individual being observes include: 1) An observer typically uses second person (e.g., "You go girl!") and/or third person (e.g., "He is excited!") phrasing during interactions that refer to the observed individual. 2) HIE/HIA interactions by an observer may be filtered to consider only those that occur when viewing direction (including when viewing may be performed remotely via one or more cameras) and/or listening to the monitored individual are detected. 3) An observer may convey an individual's emotional state by mimicking responses (e.g., hand gestures) of the observed individual. 4) An observer may respond to HIE interrogations (e.g., virtual or real button presses). 5) Some observers (e.g., parents observing a child) may have an emotional attachment. In such cases, emotional reactions of the observer may be used as a contribution to help classify the emotional state of the observed individual. For example, a parent may exhibit frustration when an observed child is in a daydreaming state and happiness when the child is engaged.

Monitoring Degree of Knowledge Acquisition

As introduced in the Summary above, a key aspect of both teaching and learning is an ability to recognize when, and to what degree, knowledge acquisition has occurred. The ability to recognize when a degree or level of knowledge understanding has taken place (e.g., from superficial to profound) is a valuable attribute of a skilled instructor (e.g., professional teacher, colleague, friend). As a result, such instructors may be able to "pace" the presentation of new, synergistic and/or complex materials to a learner at a rate that simultaneously maintains a high level of interest (and other emotions) while not overwhelming the learner. Optimally, identifying when learning has occurred may be performed in real time, as each new knowledge element is presented.

Complicating approaches to both teaching and learning, full knowledge acquisition may not be a singular event. Knowledge acquisition may be staged, involving an initial understanding that may subsequently be reinforced and/or enhanced one or more times (e.g., by re-presenting materials and/or mental repetition). Along similar lines, a wide spectrum of understanding frequently occurs, from superficial learning that includes simple memorization to deep understanding that may be used to produce new inferences and aid in complex decision-making.

In exemplary embodiments, a wide range of modalities (e.g., audio, video, touch screen) of interaction components may be monitored to determine the presence (versus absence) of knowledge understanding by a learner. Even within each mode, an interaction may contain multiple indications of understanding. For example, one or more cameras may detect both a nod of the head and a smile as indications of understanding while a microphone may simultaneously detect an expression such as "I understand". Common indications (and examples) of knowledge understanding include:

- words (e.g., "roger", "copy", "affirmative")
- phrases (e.g., "I understand", "that makes sense", "fantastic")
- interjections (e.g., "OK", "yes", "yeah")
- utterances (e.g., "uh-huh", "hum")
- gestures (e.g., waving, swiping)
- nods (e.g., particularly in the vertical direction to indicate understanding)
- smiles
- hand movements (e.g., hand waving, outlining a shape such as a checkmark, keyboard strike)
- configurations of hand digits (e.g., thumbs up, pointing)
- written symbols (e.g., indicating a correct answer from a selection of possible answers, checkmark, star pattern)
- head movements (e.g., tilting in a particular direction, particularly vertical movements)
- facial muscle movements (e.g., forming crease patterns, particularly around the eyes)
- movements of forehead muscles (e.g., relaxing of any frown)
- eye movements (e.g., looking skyward, directing gaze to a follow-on topic)
- changes in pupil size (e.g., relaxing of stress-related pupil dilation)
- eyelid blinks (prominent in some individuals)
- HIE/HIA button pushes (e.g., rapid selections using physical or virtual buttons)
- HIE/HIA screen touches (e.g., generating a drawing, selecting a correct answer)
- shaking a HIE/HIA (e.g., with meanings that may be pre-assigned to depend on a number of shakes and/or shake direction)
- movement of one or more objects sensed by the HIE/HIA (e.g., movements of a pen or pointer)
- reactions related to the knowledge understanding (e.g., delight, dismay)
- questions related to the knowledge understanding (e.g., particularly questions regarding implications of the new knowledge)
- indications related to the knowledge understanding (e.g., solving a related problem)
- inferences related to the knowledge understanding
- one or more changes in voice tone (where specifics generally depend on language)
- one or more changes in voice volume (loud, assertive), and
- time between expressing new knowledge and one or more responses.

The latter measure (i.e., time between knowledge expression and one or more responses) may, for example, be used synergistically (i.e., within multi-factorial processing) as one element to help gauge confidence in several of the other reactions where a shorter time is generally associated with a firmer grasp of new knowledge, or that the knowledge may have been previously encountered by the learner.

Along similar lines, a wide range of modalities of interaction components may be monitored to determine an absence or lack of knowledge understanding (that may be referred to herein as "confusion", but including other forms or degrees of lacking knowledge understanding) by a learner. Within each mode, learner actions may contain multiple indications of confusion that, as described further below, may contribute to scores or measures of confidence that the learner does not understand the new material as well as measures of the degree to which the material is not understood. Common indications (and examples) of lack of knowledge understanding and/or confusion include:

- words (e.g., "repeat", "negative")
- phrases (e.g., "I don't understand", "that doesn't makes sense")
- interjections (e.g., "what?", "no")
- utterances (e.g., huh?)
- gestures (e.g., waving, shrugging shoulders)
- head shakes (e.g., particularly in the horizontal direction to indicate not understanding)
- downcast expressions
- shrugging shoulders
- hand movements (e.g., hand waving, outlining an "X")
- configurations of hand digits (e.g., thumb down, pointing away)
- written symbols (e.g., indicating an incorrect answer from a selection of possible answers, "X", striking out existing text or images)
- head movements (e.g., particularly horizontal movements, tilting in a particular direction)
- facial muscle movements (e.g., crease patterns, particularly around the eyes, squinting)
- movements of forehead muscles (e.g., particularly those that include raising upper eyelids)
- frown (e.g., including contractions of muscles around the forehead, eyes and mouth)
- eye movements (e.g., looking skyward, intense focus)
- changes in pupil size (e.g., stress-related pupil dilation)
- eyelid blinks (e.g., frequent blinking, especially by some individuals)
- HIE/HIA button pushes (e.g., delayed, involving one or more corrections)
- HIE/HIA screen touches (e.g., generating a drawing to clarify, selecting an incorrect answer)
- shaking a HIE/HIA (e.g., with meanings that may be pre-assigned to depend on a number of shakes and/or shake direction)

movement of one or more objects sensed by the HIE/HIA (e.g., movement of a pen or pointer)

reactions related to the knowledge understanding (e.g., frustration, anger)

questions related to the knowledge understanding (e.g., asking that new knowledge be restated)

indications related to the knowledge (e.g., unable to solve a problem related to the new knowledge)

incorrect inferences related to understanding the new knowledge one or more changes in voice tone (where specifics generally depend on language)

one or more changes in voice volume (quiet, questioning), and time between expressing new knowledge and one or more responses.

The latter measure (i.e., time between knowledge expression and a response) may be used to help gauge confidence in concurrent interactions where a longer time may be associated with a lesser grasp of new knowledge. However in this case, a pause or delay may also imply that the learner is taking time to "think about" consequences, perhaps discovering new inferences, based on the new information. Thus, a pause or delay may be considered a low-confident measure of not grasping information, unless coupled with other measures, as described above.

In further exemplary embodiments, alternatively or in addition to machine-based, direct monitoring of the learner, indications of knowledge understanding and/or confusion may be determined based on responses by one or more observers of a learner. An observer may (simultaneously, often without substantial thought) monitor for any of the range of responses indicating knowledge understanding or lack of understanding listed above. An observer may additionally have a better grasp (compared with machine-based analyses) of the prior background of an individual learner including factors such as emotional maturity, typical timing of responses while grasping concepts with varying degrees of complexity, evolving interests in topic areas, learning habits and familiarity with expressions by the learner including those expressed verbally, facially, with hand gestures, culturally, linguistically and so on.

Similar to the strategies just described concerning monitoring emotional state, separation is required when identifying and developing classification schemes using observer interactions. For example, a sense of confusion expressed by a learner is likely related to a lack of understanding about some newly presented knowledge, whereas confusion expressed by an observer of the learner may be related to lacking understanding whether a learner has understood a newly presented element of knowledge. In other words, confusion by an observer may be independent of whether the learner understands the newly presented knowledge.

In further embodiments, distinguishing machine-based analyses of the interactions by an observer versus a learner, observer interactions may be isolated to those specifically involving the learner. For example, the identification of statements (e.g., "You got it!), interjections, pointing, and other indications of knowledge understanding (or lack of understanding) may be isolated to those apparently directed at a learner. Observer interactions may take into account, for example, whether the observer is looking at the learner and/or within hearing distance from the learner (including via remote access). Observer interactions that appear to be directed at other individuals or objects in the environment of the observer may be rejected for inclusion in assessing learner performance and/or the accumulation of databases of observer indications of levels of learner knowledge acquisition.

Summarizing, the machine-based determination of learner understanding based on interactions with an observer of the learner may involve any or all of the exemplary forms of interaction listed above indicating understanding and/or lacking understanding. However, accumulation and maintenance of observer databases may consider both intent of the observer and/or whether observer interactions are related to the learner. Databases used to train or develop observer classification schemes to measure knowledge acquisition may maintain such distinctions. Machine-based analyses of observer interactions may take into account the intent (and, if desired, a measure of reliability of that intent) by the observer in addition to utilizing interaction information to assess a degree of knowledge acquisition by the learner.

In further additional exemplary embodiments, responses by a learner and/or one or more observers of a learner may be accumulated by: 1) considering knowledge understanding as a continuum between deep understanding at one end of a spectrum to a complete lack of understanding or confusion at the other end of the same spectrum, or 2) treating levels of understanding or confusion as any number of separately identifiable degrees of knowledge acquisition. Scales that are essentially continuous or that have a number of stages may include identifiable characteristics, including, for example (roughly from higher to lesser degrees of understanding):

substantial understanding sufficient to make inferences, an initial understanding of a complex topic that is likely to require at least some repetition or synergistic teaching for more complete understanding, superficial understanding, a suspected memorized response (i.e., a correct answer but lacking full understanding), a partial understanding where some aspect(s) may be correct and other aspect(s) incorrect, uncertainty regarding understanding admission of not understanding, and one or more responses indicating an incorrect understanding (e.g., leading to incorrect inferences).

Within either approach (i.e., continuous spectrum or any number of discrete levels of understanding), the number of identified interaction indicators and (optionally) pre-assigned measures of strength and reliability in a particular indication may help to determine both a degree of knowledge understanding and a confidence level in that classification. The presence and/or absence of different indicators (including conflicting indicators), the timing of those indicators, synergistic relations among indicators, pre-assigned confidence levels for some or all indicators, and indications by either or both the learner and/or an observer may be included in ratings of such confidence levels.

Illustrating distinctions between scoring a degree of knowledge acquisition and a confidence in that scoring, the phrase "I understand" stated by a learner is a high-confidence indicator of a potentially high level of understanding by the learner. On the other hand, a smile by a learner may indicate understanding, but might alternatively be a reaction to an unrelated event in the environment of the learner. Thus, a smile in and of itself, may be a low confidence indicator of knowledge understanding; however, when coupled with one or more indicators (e.g., raising of arms, as illustrated in FIG. 6B) the synergistic (i.e., multi-factorial) combination of indicators may result in a high confidence level. Identifying synergistic combinations of indicators of knowledge understanding is an example of the use of multivariate approaches within classification schemes, described further below.

New knowledge that produces more rapid and/or complete understanding may be given more weight in databases of knowledge (i.e., teachings) that produce greater understanding. Such weights may, for example, be used within computations of confidence levels and/or effectiveness during classification schemes (e.g., neural net, SVM, hyperplane) to determine enhanced teaching strategies. In cases where only partial understanding or confusion by a learner is identified, a knowledge database may also be accumulated containing unsuccessful teaching strategies that might, for example, be avoided during future teaching sessions and/or teaching strategies directed other individuals.

Figure 8:
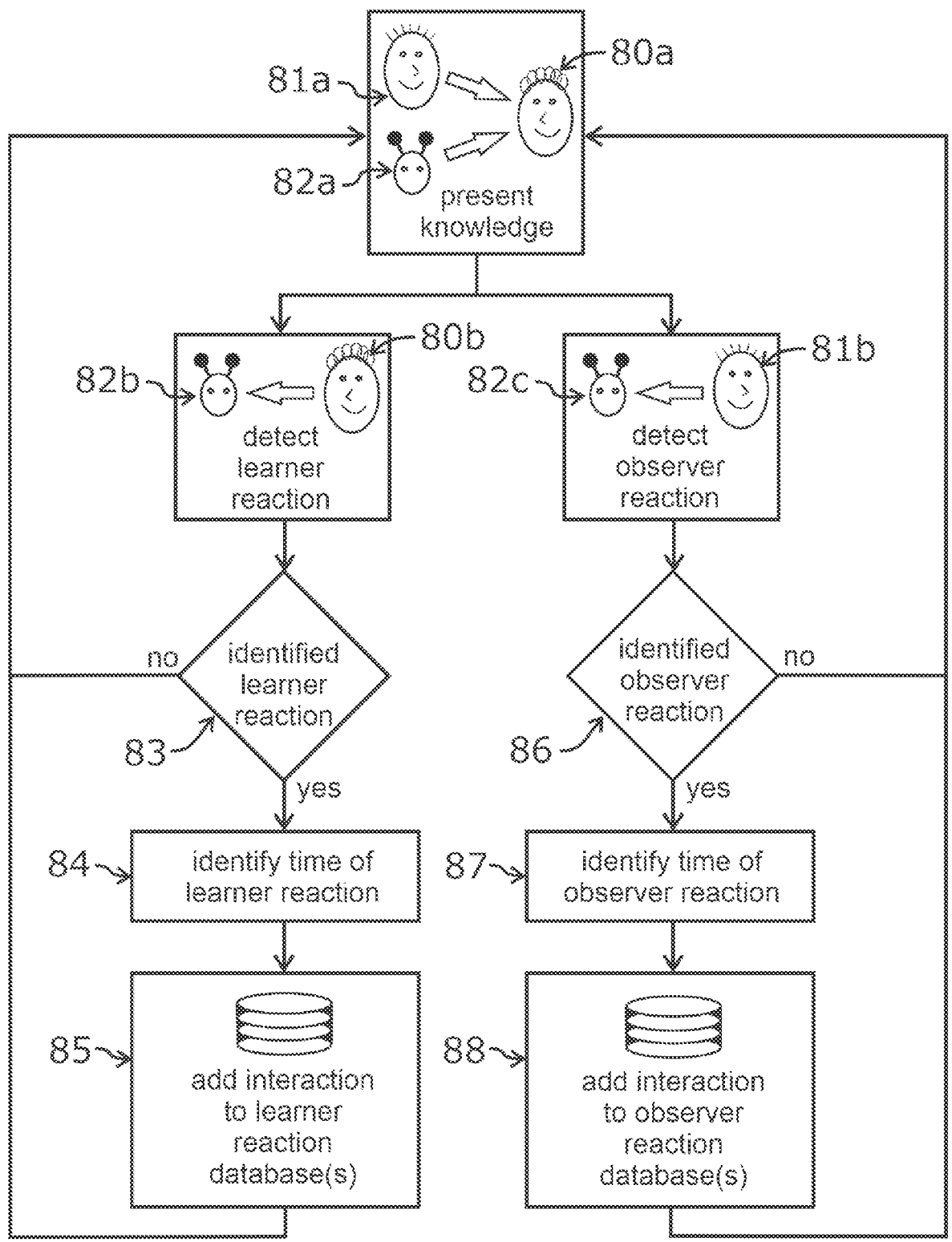
FIG. 8 is a flowchart that summarizes steps of so-called "bootstrap" strategies to grow databases of interactions based on indications or reactions by a learner and/or indications or reactions expressed by an observer of the learner.

FIG. 8 is a flowchart illustrating steps that may be used to iteratively develop interaction databases including: 1) reactions to knowledge presentation by a learner 85, and/or 2) reactions to knowledge presentation by one or more observers of a learner 88. Reactions by a learner 80a, 80b may be sensed by the learner's HIE 82a and/or include input from devices such as a keyboard, mouse, pushbutton and so on (not shown). Reactions by the one or more observers 81a, 81b, that may be sensed by an observer's HIE 82c and/or the learner's HIE 82a, may not only include those based on visually "observing" a learner 80a but also, for example, be (partially or fully) based on auditory acknowledgements, awareness of one or more selections by the learner using a keyboard or other data entry device, and/or one or more responses to questioning the learner 81a.

In additional exemplary embodiments, knowledge may be presented to an individual 80a by either or both of one or more humans 81a and/or HIEs 82a. During and following new knowledge presentation, interaction data from the learner 80b may be acquired by the learner's HIE 82b. Those interaction data are processed (locally, or using one or more remote processors, not shown) to identify one or more interaction components that contain learner reactions 83. A timestamp may be generated 84 and the identified interaction component may be added to the appropriate reaction database (e.g., indications of knowledge understanding, partial understanding, confusion, and/or continuum) 85.

Interaction data may also be collected to determine one or more reactions of one or more observers (if present) 81b of a learner 80a. The one or more observers 81b may, or may not, have been involved in the presentation of knowledge 81a to the learner 80a. During and following knowledge presentation, observer interactions may be acquired by one or more observer HIEs 82c or by the HIE associated with the learner (i.e., where a single HIE may interact with more than one human). Interaction data may be processed (locally, or using one or more remote processors) to identify one or more interaction components that contain an identified observer reaction 86. A timestamp may then be generated 87 and the labelled interaction may be added to appropriate observer databases 88.

Labelling Interactions Used to Train Classification Schemes

As detailed particularly within descriptions associated with FIG. 3, the accumulation of training databases of interactions that are "labelled" with either a continuous spectrum or discrete levels of emotional engagement and/or knowledge understanding is a foundational aspect of developing classification schemes. Labelling may be performed in real time, as interactions are being performed. Alternatively, or in addition (e.g., particularly when labelling may require correction), labeling may be performed at some later time following review by machine and/or one or more humans, for example, when a degree of knowledge understanding may be more apparent as a result of formal written/online testing and/or further questioning of an individual.

In the case of knowledge acquisition, identification of a level of understanding may be volunteered by the learner. For example, a learner may verbally indicate "I understand" or "I don't understand" during an interaction. Interactions may also be evoked in response to questioning by a HIE and/or human. Such prompted reactions represent an exemplary method to develop labelled databases of cognitive reaction elements in an overt fashion.

Within a more "covert" fashion (i.e., generating less apparent disruption during interactions with an individual), using the feedback loop organization described above, labelling of interactions may also be intentionally induced by a HIE (or a human in conjunction with a HIE) by challenging a learner with cognitive or emotional content that results in anticipated (i.e., know to the machine) interaction elements. As examples, a request may be given to solve a mathematical equation that is beyond the current level of development of the learner, text may be presented in a foreign language, or a question may be asked in which an answer is clearly outside the experience of the learner. Interaction elements that result from such challenges may be labelled (i.e., without any requirement for other forms of labelling input) as indicators of lacking understanding.

Similarly, a HIE (or a human in conjunction with a HIE) may re-introduce material that has been previously identified as being understood by the learner. Such presentations may be, at least in part, for the purpose of inducing one or more learner responses that indicate a degree of knowledge understanding. (e.g., well-understood, bored, partially understood). Learner interactions and/or indicators by an observer of the learner may then be labeled according to such known (i.e., by a machine) degrees of understanding.

More generally within exemplary embodiments, topics with known levels of understanding may be presented to a learner in which at least one purpose of the presentation is to induce interactions that may subsequently be labelled according to the known-to-the-machine degree of understanding. By controlling the cognitive environment, such machine-based methods may be used to train one or more machine-based classification schemes for a particular individual (e.g., in real time) or, more globally, for classifying responses of any individual.

A similar approach may be enacted to evoke specific emotional responses where interaction elements or indicators within follow-on interactions may be labelled according to predetermined or expected emotional responses. This may be performed in an overt manner where, for example, the learner may simply be asked "Are you bored?" or "Are you overwhelmed?". Emotional content presented prior to such questioning as well as the one or more responses (e.g., "yes", "no") may then be used to classify identified reaction elements as well as prior content that generated the response.

Another overt manner to evoke specific (i.e., known to a machine) emotional reaction elements involves requesting the learner to "think about", consider, contemplate and/or communicate about a topic that produces a known (i.e., self-identified) emotional reactions. For example, an individual might be asked to think about, or talk about, a favorite pet. If the individual describes a favorite pet (e.g., cat, dog), then such descriptions would normally include multiple indicators of elevated engagement and excitement. Interactions may further be classified as content that might reliably produce the known response (i.e., interest, happiness). Even if no response to a topic area is explicitly communicated, emotional interaction elements resulting from simply thinking about a favorite pet may be recorded and labelled as indicating interest or engagement.

Any number of topic areas may be raised, at least in part, for the purpose of evoking such emotional reactions including, for example, asking about a closest friend, favorite song, preferred food, treasured toy, best video game, and so on. A similar process for additional classifications may be executed when the learner is asked, for example, to think about something that is boring or that induces a sense of being overwhelmed or stressed (e.g., loss of a friend).

Such topics with known responses may also be introduced periodically to determine if they evoke emotional responses classified in substantially the same category or categories as previous interactions covering the same topic. If, as a result of raising such topics, emotional responses are classified within unexpected categories, this may be a sign that the learner is not in an attentive state (e.g., the leaner is overwhelmed, sick, distracted or tired).

Topics may be introduced (by a human or HIE) that have a predetermined or near-universal classification. Introducing upcoming holidays, notification of an award, or favorable weather forecasts most frequently result in elevated engagement reactions. On the other hand, notifying an individual of multiple nearby hazards is likely to produce a sense of being overwhelmed and/or elevated stress levels. Applied repeatedly to grow and strengthen the diversity of indications of emotional engagement databases, these overall programming strategies may be referred to as "application-driven human labelling" (ADHL).

Figure 9:
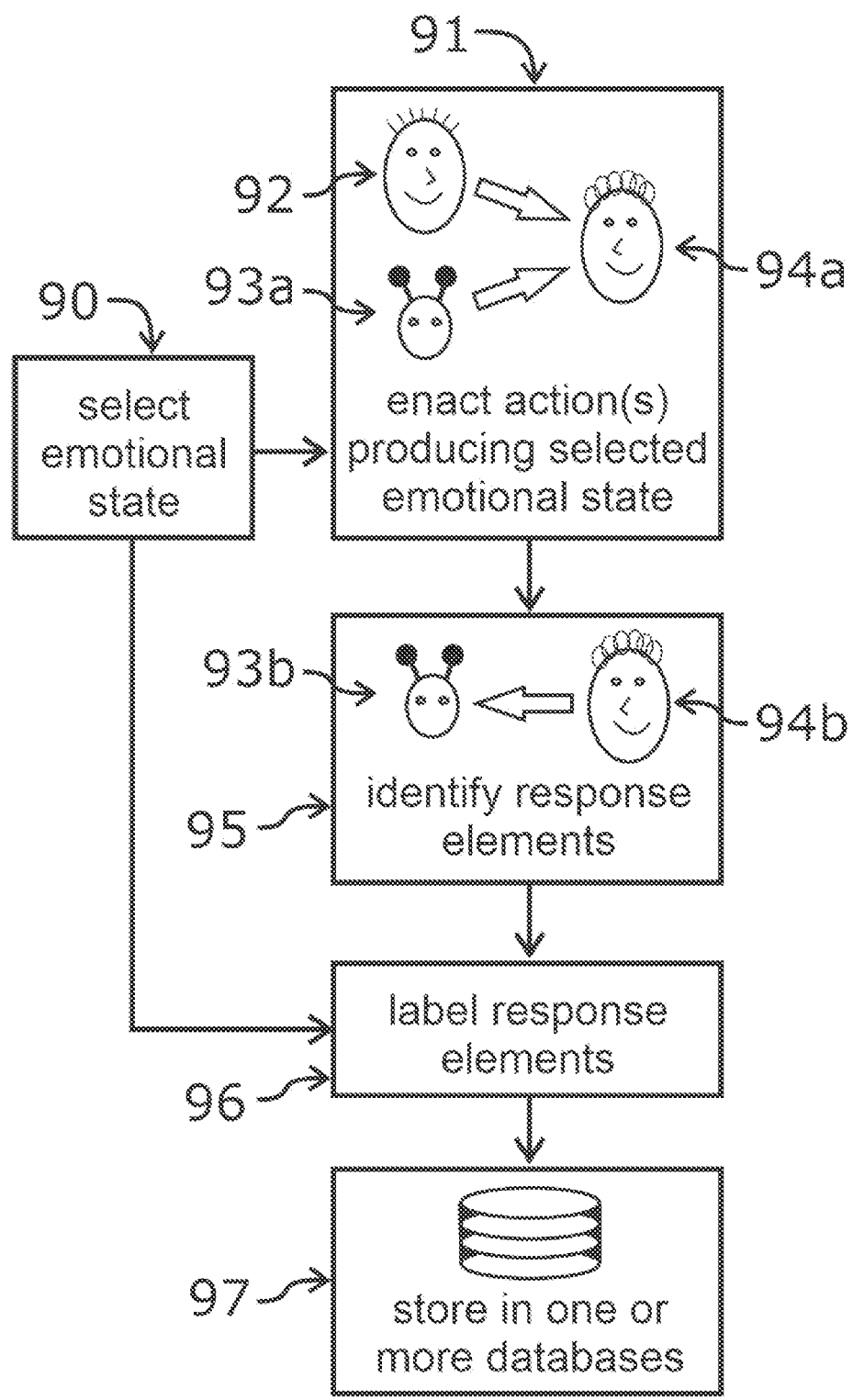
FIG. 9 illustrates methods to generate "self-labelled" interaction elements in which selected (i.e., self-identified) physical actions and/or mental activities are performed to produce a selected emotional state.

FIG. 9 outlines such overt and covert methods to produce databases of labeled interaction elements 97. A labeling interaction selected to produce a known (to one or more machines) emotional response 90 is enacted at 91. The selected degree of emotional engagement may originate from a human, any local or remote computing device (particularly those instantiated with an AI), and/or a predetermined (e.g., by cognitive scientists) set of one or more selections that may, for example, be used to ensure a wide spectrum of emotional responses.

Interactions may be assigned an emotional label at 90 based on 1) responses produced by most humans (e.g., stress response to images of a tragic scene), 2) previous reactions by the individual 94a, or 3) implying or directly stating the target emotional state (e.g., "What is your favorite sport?", "Think about your favorite vacation."). Actions directed toward the individual 94a may be performed via machine-based interactions, one or more human supporters 92, or both. Resultant responses 94b may be gathered by machine-based entities 93b and labelled according to the selected emotional state at 96 and added to one or more databases at 97. Separate databases may, for example, be assigned to individuals within different cultures, age groups, combinations of human supporters, and/or HIE interaction capabilities and so on.

In most respects, the strategy outlined in FIG. 9 may also be applied to acquire reactions to known cognitive presentations. In this case, a cognitive problem that is assumed to be either well within, or well beyond, the capabilities of the learner may be presented. Induced reaction elements may then be labelled according to the pre-assigned difficulty of the presented problem. Similar to the database segmentation just described for emotional interaction databases, resultant databases of classified learning interaction elements may be accumulated within databases applicable to wide (e.g., global) populations, or separate databases may be maintained for different age groups, learning environments (e.g., formal classroom versus at-home play), learning topic areas (e.g., science, art, music), HIE interaction capabilities, and so on.

Figure 10:
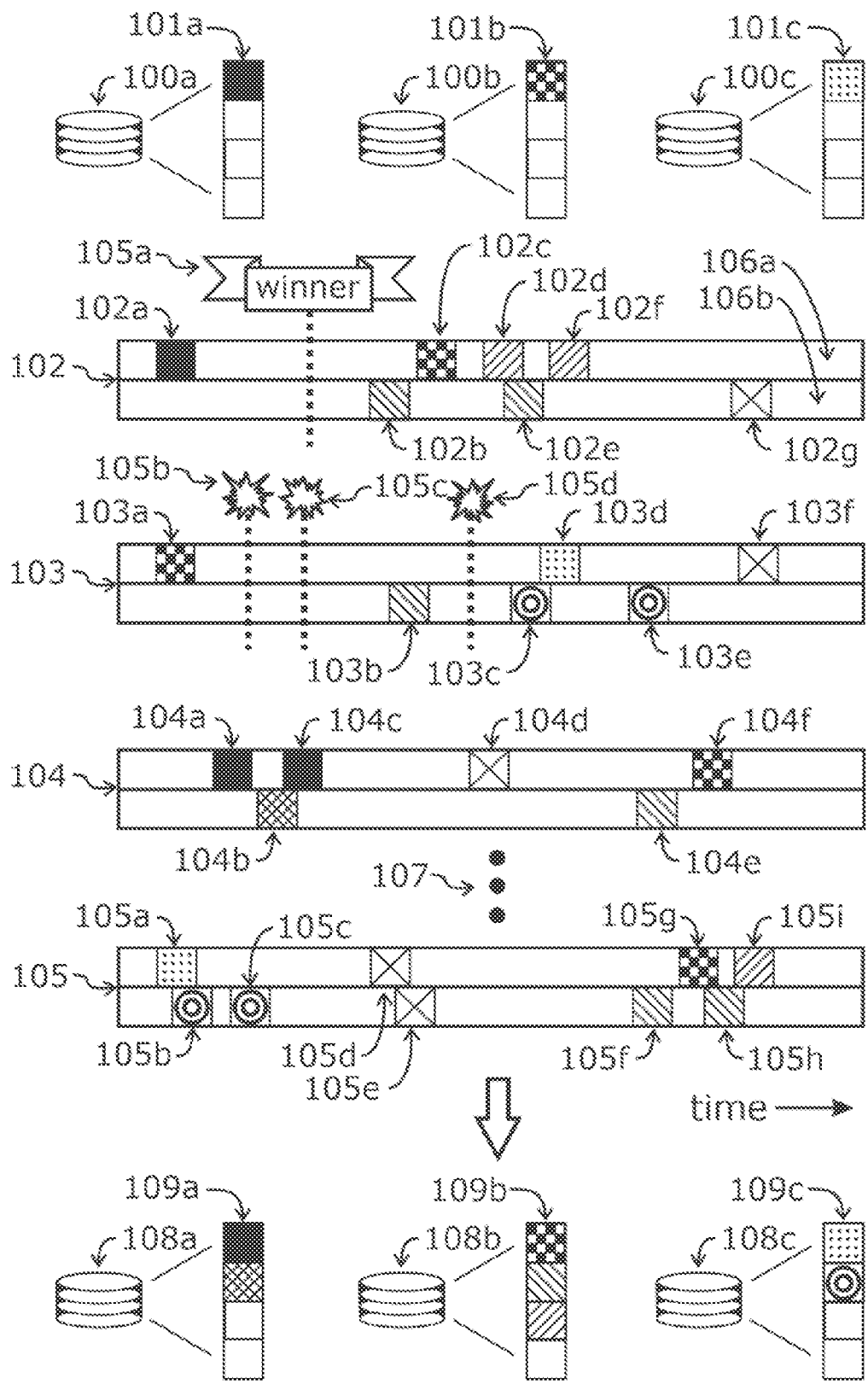
FIG. 10 illustrates so-called "bootstrapping" approaches where newly identified human interactions that are in the temporal vicinity of a known indicator of an emotional state are accumulated in databases subsequently used to determine if the interactions are frequent and/or distinguishing indicators of the emotional state.

FIG. 10 illustrates several strategies to populate one or more databases with user (or observer) labelled interactions that indicate an individual's emotional state. In this example, three databases 100a, 100b, 100c are being accumulated, for example, representing the three levels of emotional engagement illustrated in FIGS. 1 and 11. The leftmost database 100a may represent an emotionally "bored" or disengaged state. Indications within the middle database 100b represent an "engaged" emotional state, and indicators accumulated within the rightmost database 100c may represent an overwhelmed and/or stressed emotional state. At least one indicator populates each of the databases where an indicator represented by solid fill 101a is present within the bored emotional state database 100a, an indicator represented by a checkered pattern 101b is within the engaged database 100b, and a dot-fill indicator 101c populates the overwhelmed database 100c.

The middle portion of FIG. 10 includes four timelines 102, 103, 104, 105 in which various fill patterns represent the occurrence of different HIE-sensed interactions. Within each timeline, two representative "modes" or types of interaction are shown (e.g., modes 106a and 106b within timeline 102). These representative modes may, for example, be sensed by video (e.g., 106a) and audio (e.g., 106b) components of a HIE (see FIG. 7). Additional modes (not shown) may simultaneously be sensed during such interaction sessions (e.g., push button press, mouse click, heart-rate monitor).

One of the elements employed within FIG. 10 to accumulate indications of labelled emotional states involves the observation that multiple indications of a particular emotional state are often generated by an individual (or an observer of an individual) in close temporal proximity. Thus, if one interaction indicator of an emotional state is identified, other interactions within the same time frame (i.e., before and after the identified interaction) may be indicative of a similar emotional state. Temporally adjacent indicators may be recorded in response to an event or activity (as illustrated in the upper two timelines 102, 103) or generated spontaneously, identified as a result of continuous monitoring of an individual (as illustrated in the lower two timelines 104, 105).

In the uppermost timeline 102 in FIG. 10, monitoring revealed an interaction 102a identified as indicating boredom (i.e., indicated by a solid-fill pattern, previously identified and stored 101a in the "bored" database 100a). Within this exemplary scenario, the individual was then alerted to the presence of an award (denoted by a "winner" banner 105a), which quickly heightened interest levels, as detected by an interaction pattern represented as a checkerboard 102c, previously identified as indicating an "engaged" state (i.e. element 101b within database 100b). Other interactions, both before 102b and after 102d, 102e, 102f the identified "engaged" interaction 102c, consequently may be added to a database of potential indicators of engagement. Alternatively or in addition, if an interaction action (e.g., winning an award 105a) has a predictable outcome (e.g., excitement and engagement), then all interactions immediately following the action may be labelled and archived according to the predicted outcome (e.g., "engaged" as a result of being declared a winner).

Within this exemplary scenario, two potential indicators 102d, 102f denoted by an up-slope line fill pattern are associated with a mode (e.g., video) associated with timeline 106a, and two potential indicators 102b, 102e denoted by a down-slope line fill pattern are associated with a second mode (e.g., audio) within timeline 106b. Such labelled interactions (and/or templates representing essential elements of interactions) may be appended to databases of labelled emotional state interactions. For example, interactions represented by up-slope 102d, 102f and down-slope 102b, 102e line fills may be added to interactions represented by the checkerboard pattern 109b in an updated (illustrated in the lower portion of FIG. 10) "engaged" template database 108a. In timeline 102, an additional interaction represented by an X-fill pattern 102g, was identified but was well past the emotional trigger event 105a and/or not determined to reliably indicate an "engaged" or other emotional state.

The initial emotional state within timeline 103 was one of engagement, as indicated by an early interaction with a checkerboard fill pattern 103a. The individual was then startled (e.g., by loud noises) three times 105b, 105c, 105d. Between the second 105c and third 105d startle, the individual remained engaged, as indicated by the down-slope line fill pattern; however, following the third startle 105d, an overwhelmed or stressed indication, represented by a dot-filled pattern 103d was observed. This was temporally correlated with two reactions with two interaction reactions represented by a bullseye fill pattern 103c, 103e. In this scenario, interactions represented by the bullseye fill pattern were consistently associated with previously identified indicators of being overwhelmed (see 105a, 105b, 105c), leading to an inclusion of interaction indicators represented by the bullseye pattern being added to those represented by the dot-fill pattern 109c within an updated database 108c of interactions labelled as an overwhelmed emotional state. A later additional interaction, represented by an X-fill pattern 103f, was not reliably correlated with any emotional state.

An individual may be monitored indefinitely (symbolically represented by the vertical ellipsis 107 in FIG. 10), with or without actions that might trigger particular emotional responses, to help accumulate any number of indicators of labelled emotional states. In timeline 104, two indications, represented by a solid-fill pattern 104a, 104c, of a "bored" emotional state were coincident with another indication 104b represented by a cross-hatched pattern. If the interactions represented by the cross-hatched pattern were determined to consistently indicate such a bored state, then interactions (or a template representing interactions) may be added to the solid fill pattern indicator 109a within the "bored" database 108a.

As just described, interactions may occur that are not coincident with other known indicators of an identified emotional state (e.g., 104d in timeline 104, and 105d and 105e within timeline 105, represented by X-fill patterns). Such interactions may be discarded or await further analyses following further development of interaction databases (e.g., with more and/or more reliable indicators).

Even absent HIE-initiated actions, indicators of known emotional states may be used to find and/or enhance confidence in identifying additional indicators of such emotional states. For example, in FIG. 10, the engaged indicator represented by a checkerboard pattern 104f, 105g appears consistently with indicators represented by up-sloping and down-sloping line-fill patterns (104e in timeline 104, and 105f, 105h and 105i in timeline 104), supporting the notion that templates for these interactions may be included in database(s) representing "engaged" emotional states. Along similar lines, interactions represented by the bullseye 105b, 105c are coincident with the interaction identified with the dot-fill pattern representing an "overwhelmed" state, supporting the action of placing the bullseye interaction pattern into the "overwhelmed" database 108c.

Such databases may be refined indefinitely. Separate databases may be developed for individuals (e.g., initially using more generalized databases as a starting point and/or incorporating "memory" related to the individual) or for different groups of individuals including those of different ages, cultures, backgrounds, languages, interaction settings and so on.

Modulating Levels of Emotional Engagement

Figure 11:
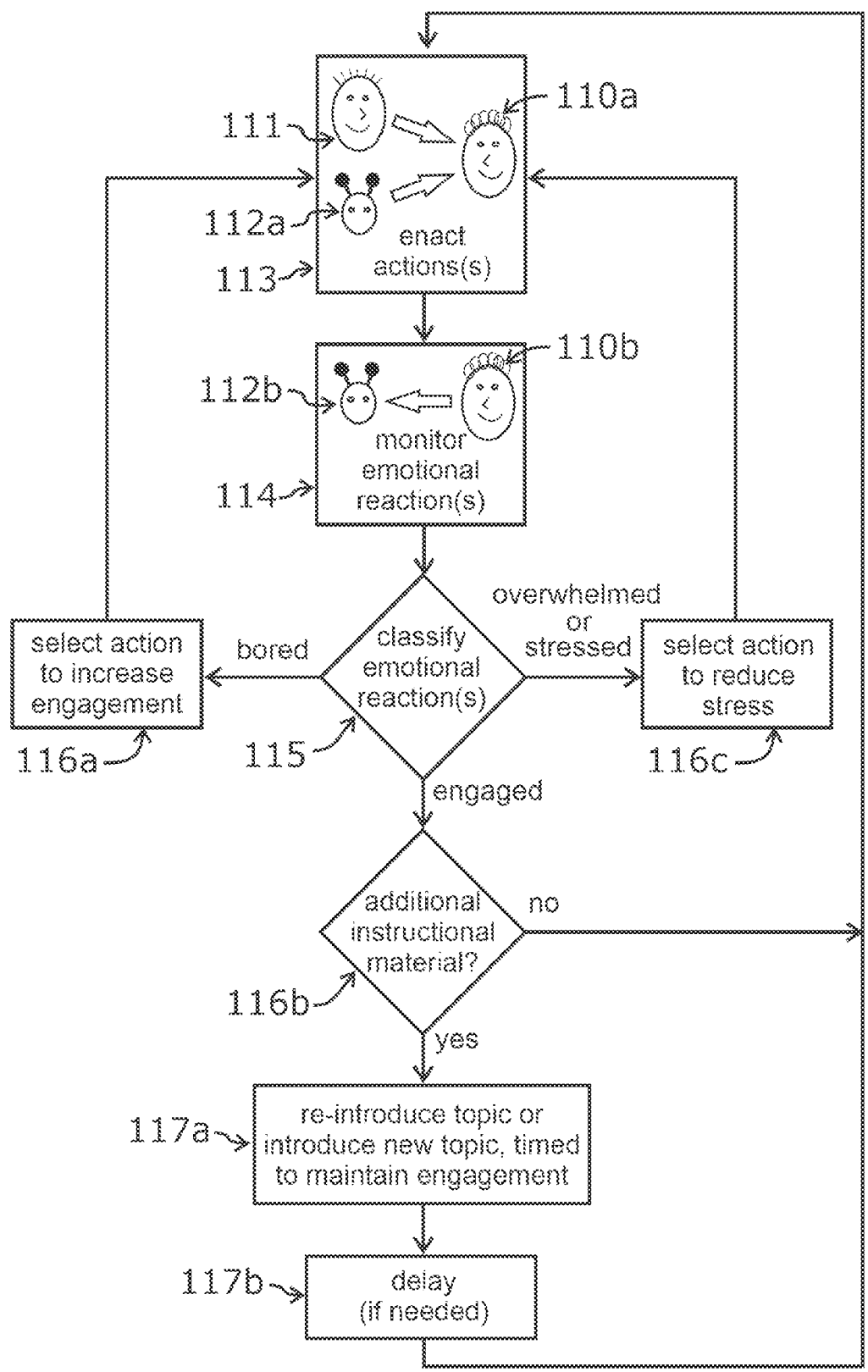
FIG. 11 is a flowchart illustrating feedback-controlled steps to modulate and/or maintain the emotional state of an individual within an "engaged" emotional level, optimal for learning (and well-being).

FIG. 11 is a flowchart outlining aspects of machine-based monitoring of the emotional state of an individual 110a and, based on interactions, enacting (by machine and/or via one or more humans) actions or activities designed to maintain the individual's emotional state in an engaged state 115. Furthermore, when emotional state is determined to be "engaged", then new materials and/or other interactive activities may be introduced 116b where the timing of presentations 117a may be selected 117b to help maintain the engaged state.

In the scenario depicted within FIG. 11, an individual 110a interacts at 113 with one or both of one or more machine-based characters 112a and one or more humans 111. Spontaneous and interaction-based emotional reactions by the individual 110b are subject to machine based 112b monitoring at 114. Emotional reactions are subsequently classified at 115 into one of (at least) three categories: 1) bored, 2) engaged or 3) overwhelmed.

If the individual 110a, 110b is assessed to be bored or disinterested, actions are selected at 116a, optionally including "nudging" human participants 111, to elevate excitement and/or interest levels of the individual 110a. These may, for example, include any of a wide range of activities (see below) designed to elevate levels of engagement, gesturing to regain attention, and/or increasing rates and/or complexity of the introduction of new topics and/or activities. On the other hand, if the individual 110a, 110b is assessed to be overwhelmed or stressed, actions may be selected to reduce stress levels at 116c. These may, for example, include taking a break from studies, incorporating a joke, and/or slowing the rate and/or complexity of topics or other activities being undertaken.

In further exemplary embodiments, if the individual 110a, 110b is assessed to be emotionally engaged and interested, then determinations may be made to assess if the rates of machine-based and human interactions with the individual are within ranges that maintain interest levels (e.g., based on interest expressed regarding topic areas and/or rates of presenting new materials during previous interactions) at 116b. If required (i.e., to maintain an optimum pace), new actions may be delayed at 117b and/or human participants 111 may be "nudged" to slow down (or speed up) by a machine-based recommendation prior to enacting new instructional topic areas and/or other activities back at 113.

Regardless of specific activities, a strong influence may be imposed by the timing of such actions, including 1) rate of introducing materials (also taking into account the complexity of new materials), and 2) the timing of re-presenting the materials and/or synergistic materials related to an introduced topic. A "bored" degree of emotional engagement generally signals (unless there is simply overall disinterest) a need to increase a rate of introducing new materials. In such situations, increased rates may be applied progressively until an "engaged" emotional state is attained. Conversely, sensing an overwhelmed degree of emotional engagement generally signals a need to decrease rates of introducing materials. Rates may be progressively decreased until indications of feeling overwhelmed are no longer detected.

Archives (i.e., memory) of rates that maintain an "engaged" emotional state by a particular individual may be used within future monitoring and activity modulation to target optimal rates of topic presentation (i.e., individual cognitive capacities). Rates may also be accumulated and analysed at a level of large populations or population subsets, where initial rates of knowledge introductions likely to achieve an engaged emotional state may, for example, depend on factors such as age and/or educational background. During deployment, initial rates of presenting and/or repeating materials may be adjusted based on such factors, if known.

Repetition may be a key aspect of learning that helps transition a knowledge element or skill from the conscious to the subconscious. Within all of the different styles of learning (e.g., described previously within the Background section), repetition may function synergistically to enhance understanding and retention. However, not only is the timing of repetition (e.g., between initial concept introduction and reinforcement steps) a critical component of optimal learning, but needless repetition can rapidly become counter-productive.

The risk of needless and/or improperly timed repetition and resultant boredom is exacerbated by the increasing prevalence of both distance education and distant communication. In virtual classrooms, teachers and other instructors may have little coordination or understanding of a unique mix and/or sequence of topics being pursued by a particular (child or adult) student. Along similar lines, as the world becomes increasingly dependent on telecommunications to both instructionally and socially interact with learners and loved ones, it may be increasingly difficult to assess (e.g., at a distance) emotional states and/or whether true learning is taking place. Distant communication may easily bypass subtle indications of either knowledge understanding or confusion by learners, supporters and/or instructors.

"Repetition begets boredom" concisely summarizes numerous sayings and discussion regarding potential negative impact of repetition. Countless studies have looked at the effects of boredom on motivation, learning strategies, cognitive resources, self-regulation, and academic development. Common metrics used to assess these effects include classroom attention and school dropout rates. Such questionnaires repeatedly indicate that only a small minority of students express that they have not experienced boredom during their high school education. When the acquisition of topics is tracked in real-time, there is an opportunity to re-introduce each topic with optimally spaced timing to reinforce each topic designed to optimize the reinforcement of long term memories.

Early studies of spaced repetition to enhance long term memory in the late nineteenth century were reported in a seminal 1885 monograph by Hermann Ebbinghaus [Ebbinghaus H (1885); trans Ruger H A, Bussenius C E (1913) [Memory: A Contribution to Experimental Psychology] (Columbia University Teachers College, New York).] There are a number of (traditionally flashcard-based) systems that suggest a schedule for reinforcing the memorizing of new knowledge on a schedule. There are also a number of variations of such learning schedules as well as bases for their application. As an example, within several schedules based on projected "forgetting curves", learning is reinforced as the probability of remembering drops to ranges between 80% and 90%. This results in reinforcing reminders after roughly one day, one week, one month and two months.

In exemplary embodiments, using machine-based monitoring and subsequent tracking, the timing of re-introducing topics (e.g., at 117a in FIG. 11) may be selected to conform to such "spaced repetition" or other timing strategies. Targets for timing of engagements may also be tuned based on personal capabilities, preferences (e.g., including by a parental or instructor) and/or circumstances (e.g., individual mood). For example, temporal targets may be based on a child's age, whether an individual is within a structured learning environment or part of a larger group, deadlines for achieving overall tasks, time of day (e.g., lowered engagement levels prior to bedtime) and so on.

Figure 12:
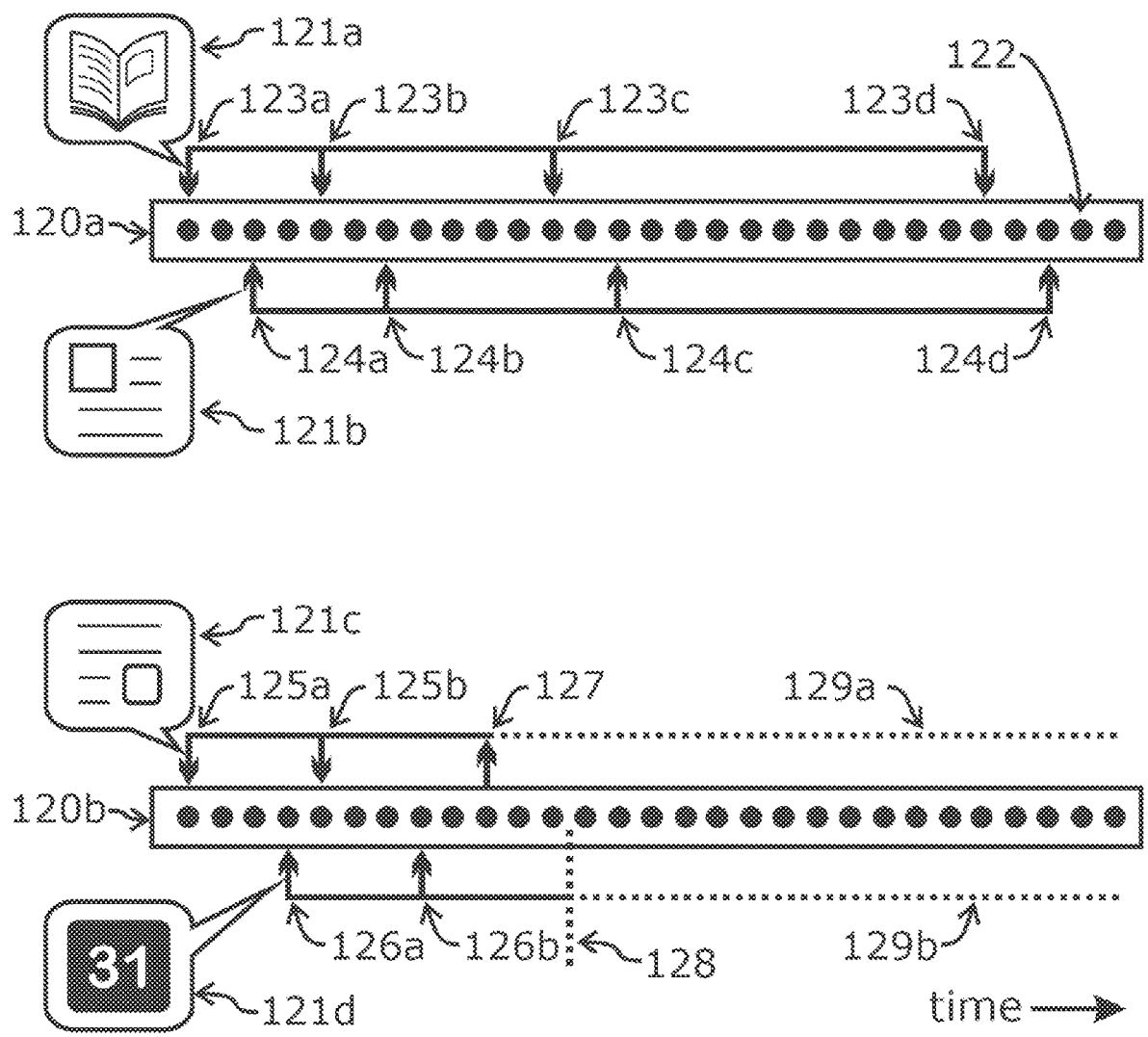
FIG. 12 shows timelines in which multiple knowledge presentations and/or activities are tracked simultaneously in order to influence the timing of re-presenting materials at times that help maximize knowledge retention within long term memory.

FIG. 12 illustrates exemplary timelines 120a, 120b of machine-based tracking of spaced repetition following the presenting of new knowledge 121a, 121b, 121c, 121d. Within the upper timeline 120a, two different topics 121a, 121b were introduced to a learner (by a HIE and/or one or more humans, not shown) at two different times 123a, 124a. The first topic 121a was re-presented following its initial introduction 123a at three optimally spaced times 123b, 123c, 123d (represented by arrows directed toward the timeline). The second topic 121b was introduced slightly later 124a than the first topic. Thus, three optimally spaced repetitions 124b, 124c, 124d of the second topic 121b each followed the spaced repetitions of the first topic 121a by roughly the same time interval.

Machine-based tracking and timing of topic re-introduction may involve any number of topics and be performed among any number of other ongoing activities by the individual (represented as solid-fill circles 122 within the timelines 120a, 120b). Knowledge initially presented by a human may involve "nudging" or suggesting to the human when to re-present materials at optimum times. Otherwise another human may be nudged and/or appropriately timed HIE interactions may be generated.

The lower timeline 120b in FIG. 12 illustrates exemplary situations in which the spaced repetition of new knowledge 121c may be interrupted and/or or deemed no longer necessary. Following an initial presentation 125a and a single repetition 125b of the knowledge 121c represented on the upper side of the lower timeline 120b, the learner recounted the new knowledge (correctly), represented by an arrow pointing away from the timeline 127. As a result, further repetition of the newly introduced knowledge may be deemed unnecessary, represented by a dashed line absent any arrows indicating times of repetition 129a.

Represented below the lower timeline 120b, new knowledge associated with a time deadline (represented by a calendar event 121d) was introduced 126a along with a single reminder 126b. As an example, new knowledge might include descriptions regarding the operation of equipment required to perform the hobby of a friend with an upcoming gifting anniversary. Once the time of the anniversary 128 has passed, no further reminders or re-presenting of the knowledge 121d may be necessary, as indicated by a dashed line 129b (absent arrows directed toward the timeline) throughout the rest of the timeline 120b.

Numerous additional circumstances may result in delay or terminating the tracking and repetition of knowledge presentations. For example, an individual may simply signal a lack of interest in an introduced topic. If new knowledge involves instructional information associated with an activity (e.g., instructions how to repair a device), then repetition is generally no longer required once there is an indication that the activity has been performed (including by someone else). The lack of availability of an object (e.g., tool) or service (e.g., telecommunications) required to perform a repeated presentation may delay targeted timing. Presented information may be superseded via the acquisition of updated materials (e.g., the practicing of a second language may be terminated as a result of a trip cancellation, or the practicing of a musical segment may become repetitious if the segment is included within an updated musical piece).

Accumulating and Pruning Labelled Interaction Databases

When developing the various databases, bootstrap programming steps may be applied to grow databases of interactions to identify degrees of emotional engagement and/or emotional state, interests and/or activities that affect emotional state, degrees of knowledge acquisition and successful (and conversely, unsuccessful) teaching strategies. Such databases may be generalized by including interactions involving, for example, a wide range of users (e.g., different ages, learning styles and interests), within a wide range of environments (e.g., classroom, home office, individual tutoring, play), interaction combinations (e.g., group learning settings, parent-child, grandparent-child, siblings, newly acquired acquaintances) and/or covering a wide range of learning topics (e.g., science, language, arts).

As databases grow, the most common interactions may be identified and maintained, while less frequent interactions may be dropped or "pruned". Such bootstrapping approaches may be iterated indefinitely to improve accuracy, particularly to address a more diverse range of users, and progressively enhance both teaching and learning methodologies. Recent progress in the field of machine learning suggests that improvements may scale with the size of such databases that are, in turn, simply limited by the availability of computing resources.

An additional strategy that may be employed while accumulating and subsequently pruning the various databases involves considering uniqueness and/or "statistical power" of a particular response. As discussed above, a given response may be included within the repertoire of responses within both emotional and cognitive environments. For example, a frown may be a response expressing both emotional frustration and lacking understanding. Interaction frequency and/or presence within multiple databases may not only reduce statistical power to classify or distinguish between responses represented by various databases, but the usefulness of observing the response within a particular database may be reduced or skewed due to the response's ubiquity. To counteract this, more weight may be given to pruning (i.e., eliminating) responses that appear in multiple databases unless a distinguishing feature is found within such responses (e.g., a deeper furrowing of eyebrows within frowns indicating frustration compared with responses indicating a lack of understanding). In other words, pruning labelled interactions within databases may include factors such as statistical power, multivariate considerations (described below) and ubiquity in addition to simple frequency of occurrence of interactions.

Alternatively or in addition, if known to the one or more processors performing classifications, knowledge regarding a particular background of an individual (cultural groupings, linguistic dialect, habits, age range, etc.) may aid in the accuracy of classifying interactions. As examples, the "thumbs up" gesture or rising versus lowering of voice tone approaching the end of a sentence may have opposing meanings if taken in isolation, without considering cultural and/or linguistic norms. Thus, the inclusion of a "memory" (e.g., classifications of cultural, age, interests, linguistic groupings) based on past interactions with an individual may be included as an input in the various classification schemes, and taken into consideration in the accumulation of corresponding databases.

Wide-spread advances at both the algorithmic and hardware-acceleration levels are currently being deployed using neural network-based approaches. Convolution neural networks (CNNs) are most commonly applied to classify image data. Deep neural networks are currently at the forefront in classifying audio data. Other classification approaches include logistic regression, hyperplane analyses that may take into account non-linear relations between different indications of knowledge acquisition and support vector machines that may be used to interface with neural networks (including Kernel machines to take into account nonlinear relations and Bayesian approaches to take into account prior probabilities).

In exemplary embodiments, combinations of such approaches may also be used, particularly when simultaneously considering multiple modes of interaction, synergistic relations between those modes (e.g., stating "no" and observing a frown) and probabilistic approaches that may include pre-assigned assumptions, particularly related to classification confidence (e.g., stating "I understand" as a high-confidence indicator of knowledge understanding compared to detecting a smile that might originate from a wide range of interactive conditions). As an example, neural network-based approaches may be used to classify audio and/or video streams to identify interaction components that may signify a degree of knowledge acquisition. Neural network outputs may then be used as multivariate inputs to support vector machines (SVMs), hyperplane, and/or other classifiers.

In further exemplary embodiments, as a result of identifying indicators of knowledge acquisition or confusion, additional or removed indications of knowledge acquisition may shift previously measured times of knowledge acquisition and consequent determination of a specific knowledge presentation initially deemed to lead to knowledge understanding. In this case, a previously determined knowledge presentation no longer associated with an indication of learner understanding may be removed (i.e., "pruned") from a successful knowledge presentation database and/or an updated knowledge presentation (i.e., teaching) occurring prior to a newly determined time of knowledge acquisition added. Steps that might lead to insertions and/or removals of teaching elements are further illustrated in FIG. 18.

The iterative development of databases of indications of learning may result in a repeated process to re-analyze new knowledge and teachings databases to keep abreast of the updated or newly determined indicators of knowledge acquisition within their respective database(s). Such reanalyses may be performed periodically, after the accumulation of a preselected number of corrections of indications of learning, when substantial computational resources are available (e.g., to retrain networks), or during times selected, for example, by a technical developer.

The ability to prune and add to databases during reanalysis may depend, in part, on the availability of interaction data. If complete teaching and interaction data are available (i.e., new knowledge presented and all subsequent interaction components), then complete interactions may simply be reprocessed in light of new classifications resulting from the updated interactions databases. If the original interaction data are no longer available, then it may only be possible, for example, to simply eliminate interactions associated with pruned classifications from interactions databases.

Figure 13:
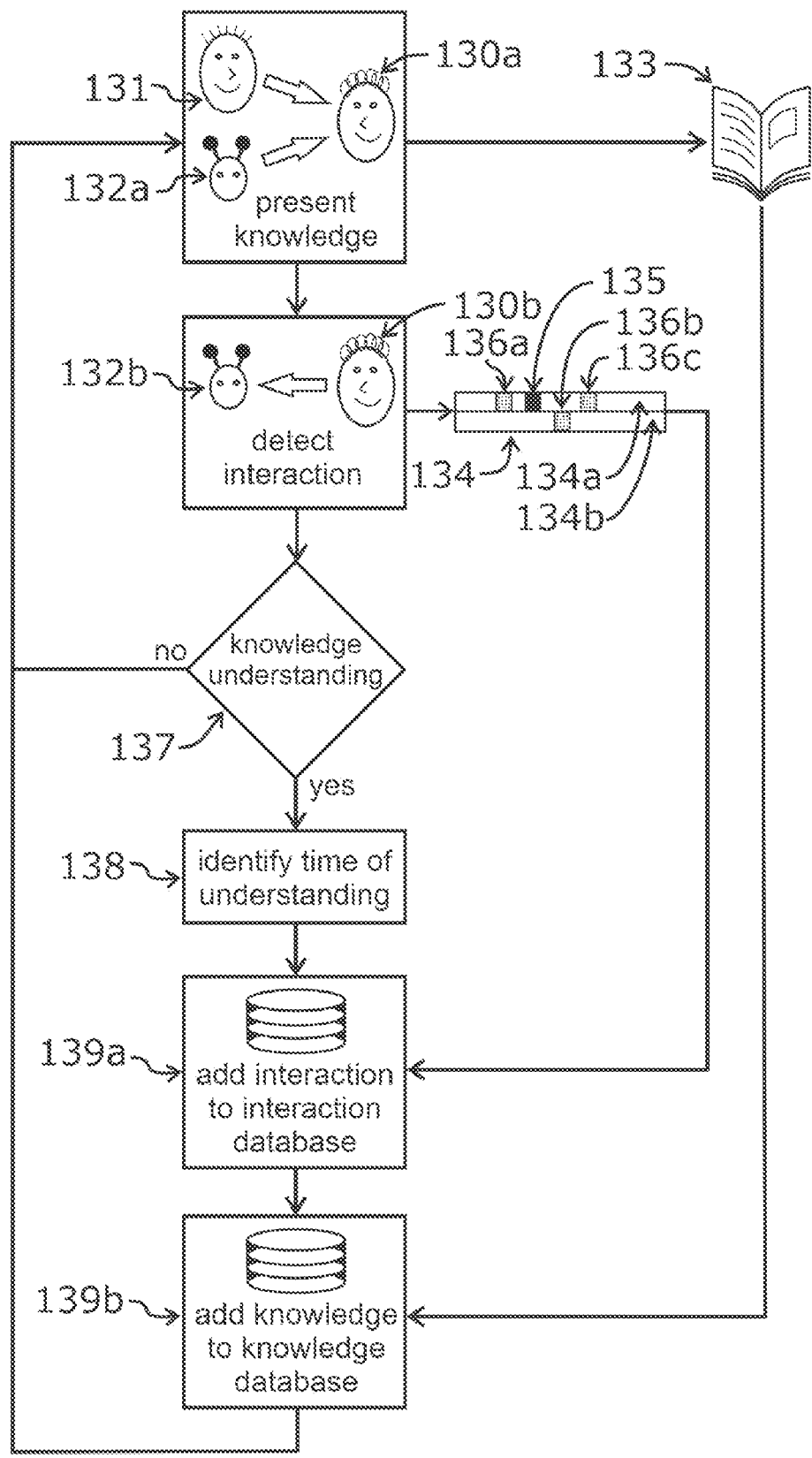
FIG. 13 is a flowchart illustrating steps of so-called "bootstrap" strategies to grow databases of learner interactions signalling a degree of knowledge acquisition (e.g., substantial understanding, confusion), and additional databases of instructional interactions (i.e., "teachings") that are successful (or unsuccessful) at producing understanding.

FIG. 13 is a flowchart demonstrating some key steps of strategies to grow databases of interactions that include indications of knowledge understanding. Although the flowchart in FIG. 13 illustrates the accumulation of learner 130a responses, similar overall strategies may be used to assess responses by an observer 131 of a learner 130a to accumulate observer 131 responses indicating knowledge understanding by the learner.

In FIG. 13, new knowledge may be presented to a learner 130a by one or more human instructors 131, pre-established "lesson plans" developed using traditional coding strategies, a HIE 132a, or combinations of one or more human and one or more machine-based sources. Learner reactions 130b to the knowledge presentation may be detected by one or more sensors within the HIE 132b. Responses of one or more observers of the learner 130a (including the one or more instructors 131) may also be detected by the HIE (or other HIEs, not shown) and analyzed for observer indicators of degrees of knowledge acquisition.

In FIG. 13, interactions detected by the one or more HIEs 132b are represented by a multi-modal timeline 134. For example, the upper row 134a in the timeline 134 may represent video data (e.g., images of the learner's face, arms and/or hands) gathered by one or more HIE cameras, while at the same time, the lower row 134b represents audio data (e.g., phrases, words, utterances) gathered using a HIE microphone. Similar timelines may be simultaneously available based on interaction data from other HIE sensors (e.g., screen touch, object movement, button push) illustrated, for example, within descriptions of FIG. 7 above. Within an overall learner response to knowledge presentation, various responses or reaction components may be identified (represented as textured or filled segments 136a, 135, 136b, 136c along the timeline 134).

Based on interactions characteristics or "templates" computed from previous learner interactions that indicate knowledge understanding, a reaction (represented by a solid-fill segment 135) was classified at 137 as indicating knowledge understanding by the learner. As a result, the overall learner interaction 134 and a timestamp 138 of the interaction component identified as indicating knowledge understanding 135 were stored within a database of learner interactions at 139a which, in turn, may be used to determine additional characteristics and/or templates of knowledge acquisition. Indeed, upon further analyses of the database(s) of learner interactions, one or more of the interaction components (represented by dot-filled segments 136a, 136b, 136c) contained within the overall interaction data 134 may be determined to be one or more additional reliable indicators of knowledge acquisition, iteratively improving the database of indicators 139a.

Along parallel lines to the above sequence, if an indicator 135 of knowledge confusion were instead identified within the overall interaction 134, then the overall interaction 134 along with a timestamp of the indicator of confusion 138 and additional interaction components that might indicate confusion 136a, 136b, 136c may be stored in a database of interactions that indicate a degree or level of confusion 139a. Alternatively or in addition, the interaction (including the interaction component 135 and its time of occurrence 138) may be stored in an overall database containing a spectrum of interactions with the identified interaction 134 flagged as leading to a degree of knowledge acquisition ranging from substantial learner understanding to lacking understanding.

Upon identifying understanding 135, the knowledge that generated the understanding 133 (optionally including any teaching techniques and/or associated materials used to present the knowledge) may be stored in a database of knowledge that leads to successful knowledge acquisition at 139b. Along parallel lines, if an interaction 134 showed signs of lacking understanding, then one or more additional databases may accumulate unsuccessful teaching presentations. As described elsewhere (e.g., see FIGS. 17 and 18), databases may be re-evaluated at any time, where interactions may subsequently be added or removed from teachings databases based on additions and re-evaluations of classifying reliable indicators of knowledge acquisition.

More generally, while "learning about learning," such databases may additionally provide primary sources of materials to develop enhanced educational strategies (i.e., "teaching about teaching"), and investigate rates of academic and personal development at levels of classrooms, schools, states, socio-economic categories, age groups, cultural populations and so on.

Figure 14:
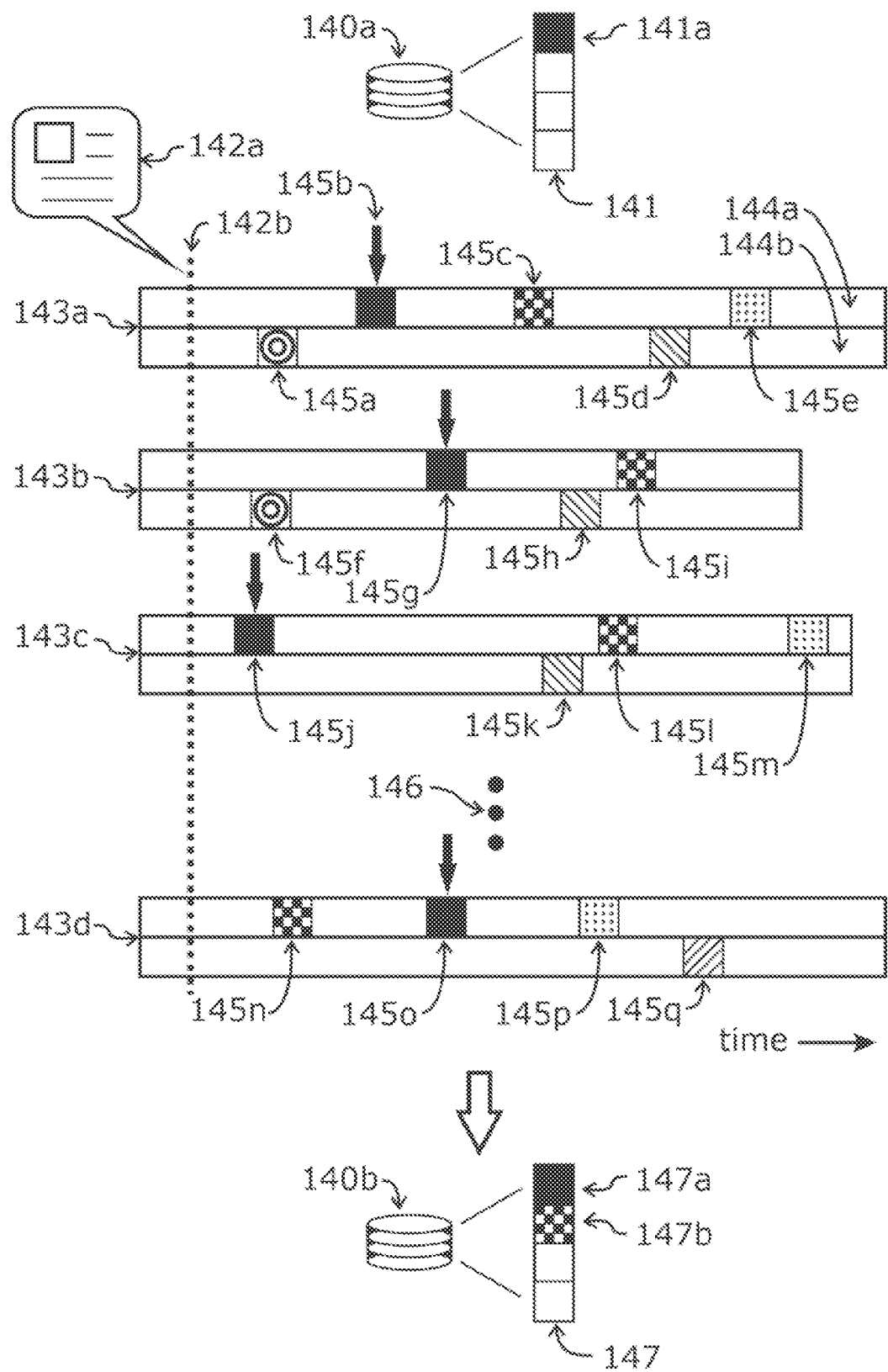
FIG. 14 shows timelines of teaching interactions that produced knowledge understanding, determined by at least one identified indicator of knowledge acquisition by a learner, to find additional indications of knowledge acquisition.

FIG. 14 shows timelines of learner interactions containing at least one indication of knowledge understanding, to find or bootstrap additional indicators of knowledge acquisition. In this example, an initial database 140a of indications 141 of knowledge understanding contains characteristics (e.g., neural net classification, template matching) of an indication of successful knowledge acquisition by a learner represented as a solid-fill segment 141a. In the timelines 143a, 143b, 143c, 143d depicted in FIG. 14 (similar to the timeline shown in FIG. 13) the upper row in the timelines (e.g., 144a in timeline 143a) represent one mode of interaction, such as video recorded by a HIE camera, while lower row timelines (e.g., 144b in timeline 143a) represent another interaction mode from one or more HIE components, such as audio recorded by a HIE microphone, button pushes using a mouse, keyboard typing, touch screen entries, eye tracking directed at selected locations, and so on.

In FIG. 14, each timeline 143a, 143b, 143c, 143d has been aligned for display (i.e., horizontally, along the time axis) such that new knowledge 142a was presented at times indicated by the vertical dashed line 142b. These presentations of knowledge 142a may involve one or more modes of presentation (e.g., audio, text, video), enacted by one or more humans and/or one or more machine-based devices. Displayed timelines 143a, 143b, 143c, 143d include those in which at least one known indicator of knowledge acquisition by a learner has been identified (i.e., 141a in the learner indicator database 141), indicated by the solid-fill patterns 145b, 145g, 145j, 145o and pointed out by solid-filled, downward-pointing arrows.

Each timeline contains additional interaction components that have the potential to be determined as additional reliable indicators of knowledge acquisition by a learner including interactions 145a, 145c, 145d and 145e within timeline 143a; 145f, 145h and 145i within timeline 143b; 145k, 145l and 145m within timeline 143c; 145n, 145p and 145q within timeline 143d. Interactions may be used to identify interaction components and/or form one or more interaction templates within classification schemes to identify key and/or essential characteristics of a degree of knowledge acquisition (e.g., substantial understanding, partial understanding, lacking understanding). In FIGS. 14, 15, 16, 17 and 18, similar interaction characteristics are represented as similar fill patterns (e.g., dots, circles, stripes, checkerboard) within interaction components 145a, 145b, 145c, 145d, 145e, 145f, 145g, 145h, 145i, 145j, 145k, 145l, 145m, 145n 145o, 145p, 145q.

As indicated by vertical ellipsis 146, the few interactions 147 shown in FIG. 14 represent a subset of a much greater number of interactions that may be accumulated within interaction databases 140b. By periodically analysing accumulated interaction database characteristics that occur frequently during knowledge acquisition by a learner, characteristics may be identified and isolated to identify further interactions that signify a degree of knowledge acquisition. For example, in FIG. 14, the interaction segment represented by a checkerboard pattern 145c, 145i, 145l, 145n is present in all displayed interactions 143a, 143b, 143c, 143d. Thus, characteristics of the checkerboard interaction segment 148b are added to the characteristics represented by the previously identified solid fill pattern 148a within an updated database 140b of interactions 148 used to determine a degree of knowledge acquisition.

In addition to databases of indicators of substantial knowledge understanding, the same overall sequence and bootstrapping strategy shown in FIG. 14 may be used to develop databases of: 1) indications by an observer of knowledge understanding by a learner, 2) indications of lacking understanding by a learner following knowledge presentation, 3) indication by an observer of some level of understanding or confusion by a learner following knowledge presentation, and/or 4) treating knowledge acquisition as a spectrum from understanding to confusion within each data collection modalities. Classification schemes may be trained to output a numeric value and/or any number of discrete levels to indicate a degree of knowledge acquisition. Beginning with a small number of indicators using one or more sensors, additional (i.e., temporally adjacent) indicators may be identified and catalogued using such bootstrapping approaches.

As previously indicated, a similar database development strategy may be applied to the accumulation of indications of degree of emotional engagement. In this case, emotional engagement indications may be bootstrapped in response to specific topics or activities (similar to the presentation of knowledge 142a in FIG. 14) and/or while monitoring an individual for spontaneous (e.g., clustered) indications of various degrees of emotional engagement.

Figure 15:
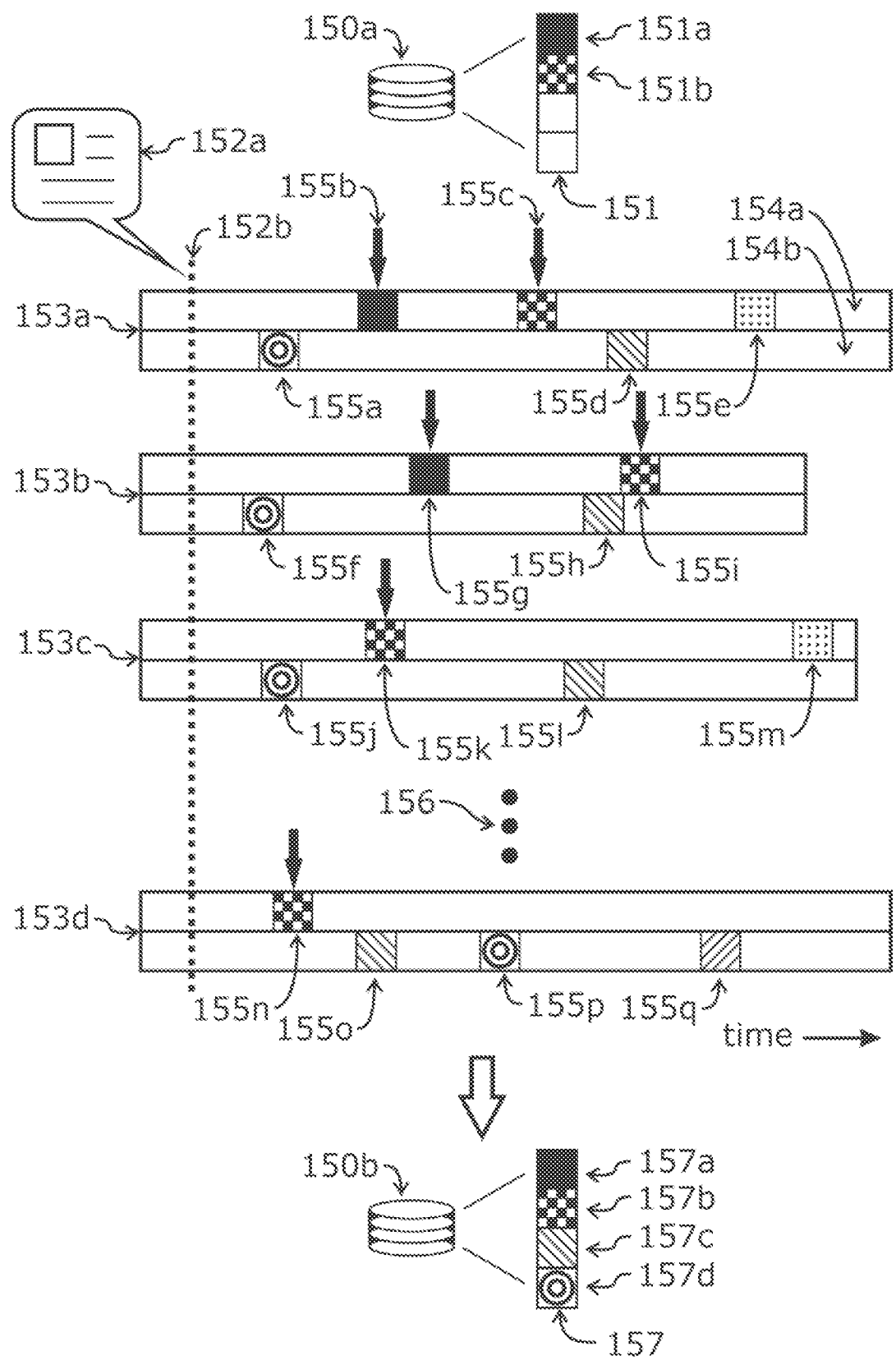
FIG. 15 illustrates timelines of teaching interactions that produce substantial knowledge acquisition, determined by multiple identified indications of knowledge acquisition, to find additional indications of knowledge acquisition to grow or "bootstrap" a labelled interactions database.

FIG. 15 furthers the database development and classification strategies illustrated in FIG. 14 by identifying additional interaction components in the same temporal region of any number of interaction components previously identified as indicating a degree of knowledge acquisition 151a, 151b. As in FIG. 14, new interactions 153a, 153b, 153c, 53d resulting from presentations of new knowledge 152a at times indicated by the vertical dashed line 152b (i.e., where timelines have been positioned horizontally to align with this reference) may be interrogated to add to a database 150a of interactions 151 previously identified as indicating knowledge understanding 151a, 151b to produce an updated database 150b of interactions 157 that not only contains previously identified indicators 158a, 158b but also newly identified indicators of knowledge understanding 158c, 158d.

More specifically, a database 150a that includes multiple indicators of knowledge understanding 151a, 151b may be used to identify additional indicators of knowledge acquisition, as illustrated in the upper two interactions 153a, 153b following knowledge presentation 152b (i.e., interaction components 155b and 155c in interaction 153a, and interaction components 155g and 155i in interaction 153b) where classifications indicating a degree of knowledge acquisition are indicated by solid-filled, downward pointing arrows. Multiple occurrences of indicators of knowledge acquisition within individual interactions may optionally be used to weight or score nearby (i.e., temporally coincident) interaction components (i.e., 155a, 155d and 155e within interaction 153a, and 155f and 155h within interaction 153b) to indicate a higher degree of confidence that knowledge understanding has occurred.

In the lower two timelines of interactions 153c, 153d in FIG. 15 (selected from a large number interactions, as indicated by a vertical ellipsis 157), interaction components identified as indicating knowledge understanding, represented by solid-filled downward arrows, are based on the recently identified indicator (illustrated within FIG. 14) represented by a checkerboard pattern (i.e., 155k within interaction 153c, and 155n within interaction 153d). The presence of these newer interaction components 155k, 155n may occur sufficiently frequently following knowledge presentations interactions to become a reliable indicator of a degree of knowledge acquisition (i.e., 155f and 155h within interaction 153c, and 155o, 155p and 155q within interaction 153d).

As a result of frequency of occurrence, interaction components represented by downward sloping lines (e.g., 155d, 155h, 155l, 155o) and bullseye circles (e.g., 155a, 155f, 155j, 155p) are added to the updated database 150b of interactions 157 (i.e., 157c and 157d are added). Upon reanalyzing interactions shown in FIG. 15, the addition of the interaction component indicating knowledge acquisition represented by the bullseye circles 157d results in determining an earlier time of knowledge acquisition in three of the displayed interactions (i.e., 155a within interaction 153a, 155f within interaction 153b, and 155j within interaction 153c). As outlined in more detail within descriptions associated with FIGS. 16, 17 and 18, earlier (i.e., more accurate) assessments of when knowledge acquisition occurred may produce a number of consequences while accumulating accurately labelled databases.

Figure 16:
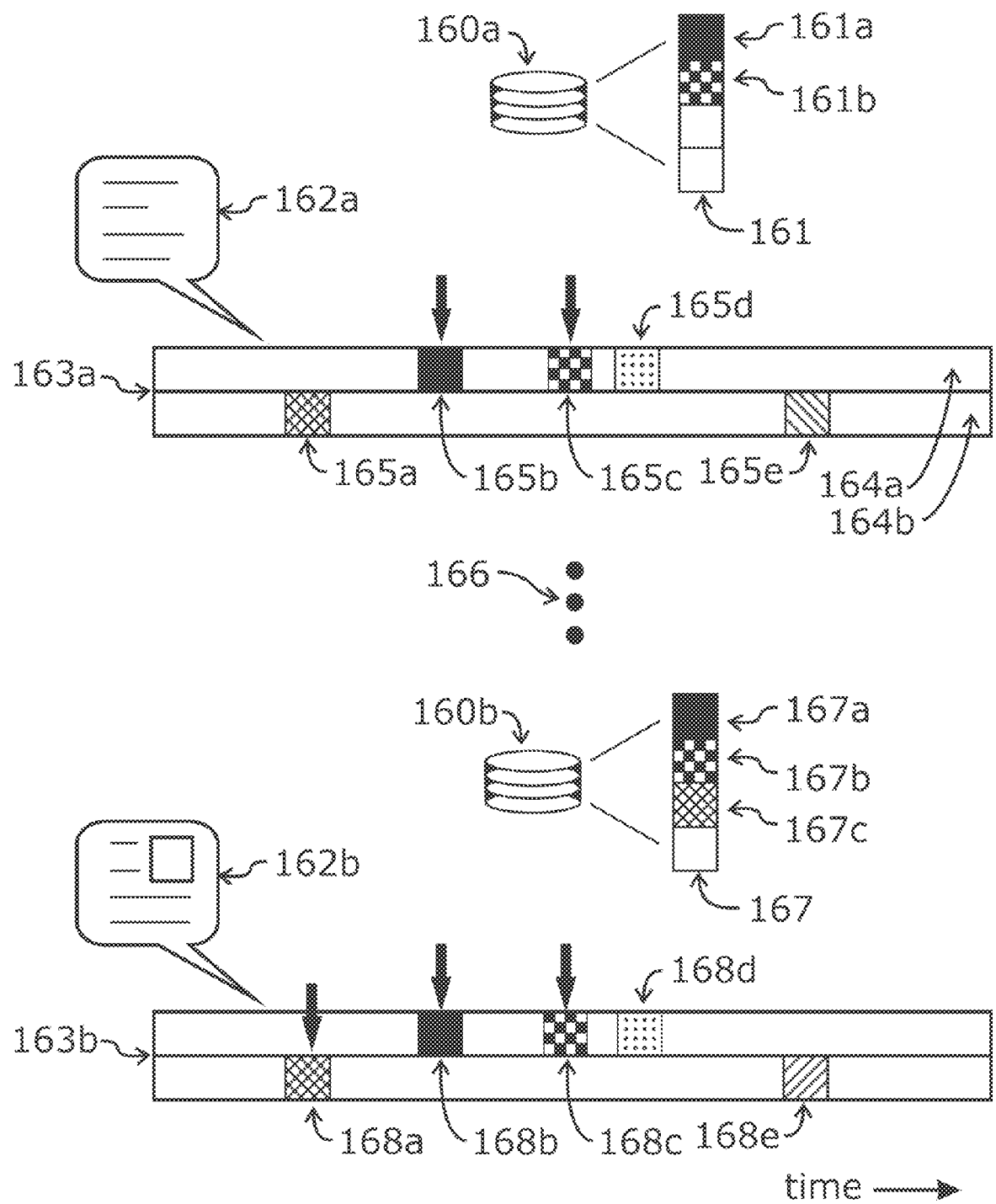
FIG. 16 shows results of reanalyzing a database of knowledge acquisition indicators where the addition of a new indicator of knowledge acquisition to the database results in finding at least one new and earlier indicator of knowledge acquisition.

FIG. 16 furthers such iterative reanalyses designed to improve the reliability and rapidity of identifying indicators of a degree of knowledge acquisition (where similar strategies may also be applied to degrees of emotional engagement databases). In this scenario, an initial database 160a of indicators of knowledge acquisition 161 contains two indicators represented by solid fill 161a and checkerboard 161b patterns. During a teaching session, new knowledge 162a is presented during a timeline 163a of resultant interactions shown in the upper portion of FIG. 16. As previously described, this timeline 163a may be multimodal in nature where, for example, video responses are represented in the upper row 164a of the timeline and audio responses are shown within the lower row 164b. Within this timeline 163a, two interaction components 165b, 165c are identified (pointed out by solid-filled downward arrows) as indicating knowledge acquisition by a learner. Additional interaction components 165a, 165d, 165e are not initially recognized as indicating knowledge acquisition.

Sometime later (indicated by a vertical ellipsis 166), the database 160b of interactions 167 was updated to not only contain the initial indicators of knowledge acquisition represented by solid fill 167a and checkerboard 167b patterns, but also an added indicator represented by a cross-hatched pattern 167c. The timeline 163b in the lower portion of FIG. 16 shows results of reanalysing the interaction illustrated in the upper portion 163a of the figure in light of the updated database 160b of interactions 167. Following the presentation of knowledge 162b, indications of knowledge acquisition 168b, 168c based on indicators 167a, 167b initially in the database of indicators are re-determined. However, due to the addition of a new indicator of knowledge acquisition 167c in the updated database 160b, an additional indicator of knowledge acquisition is found 168*a*. Remaining interaction components 168*d*, 168*e* continue to not be recognized as indicating knowledge understanding. The newly recognized indication of knowledge understanding 168*a* points to knowledge being understood by the learner at a time earlier than determined during the original analysis.

Figure 17:
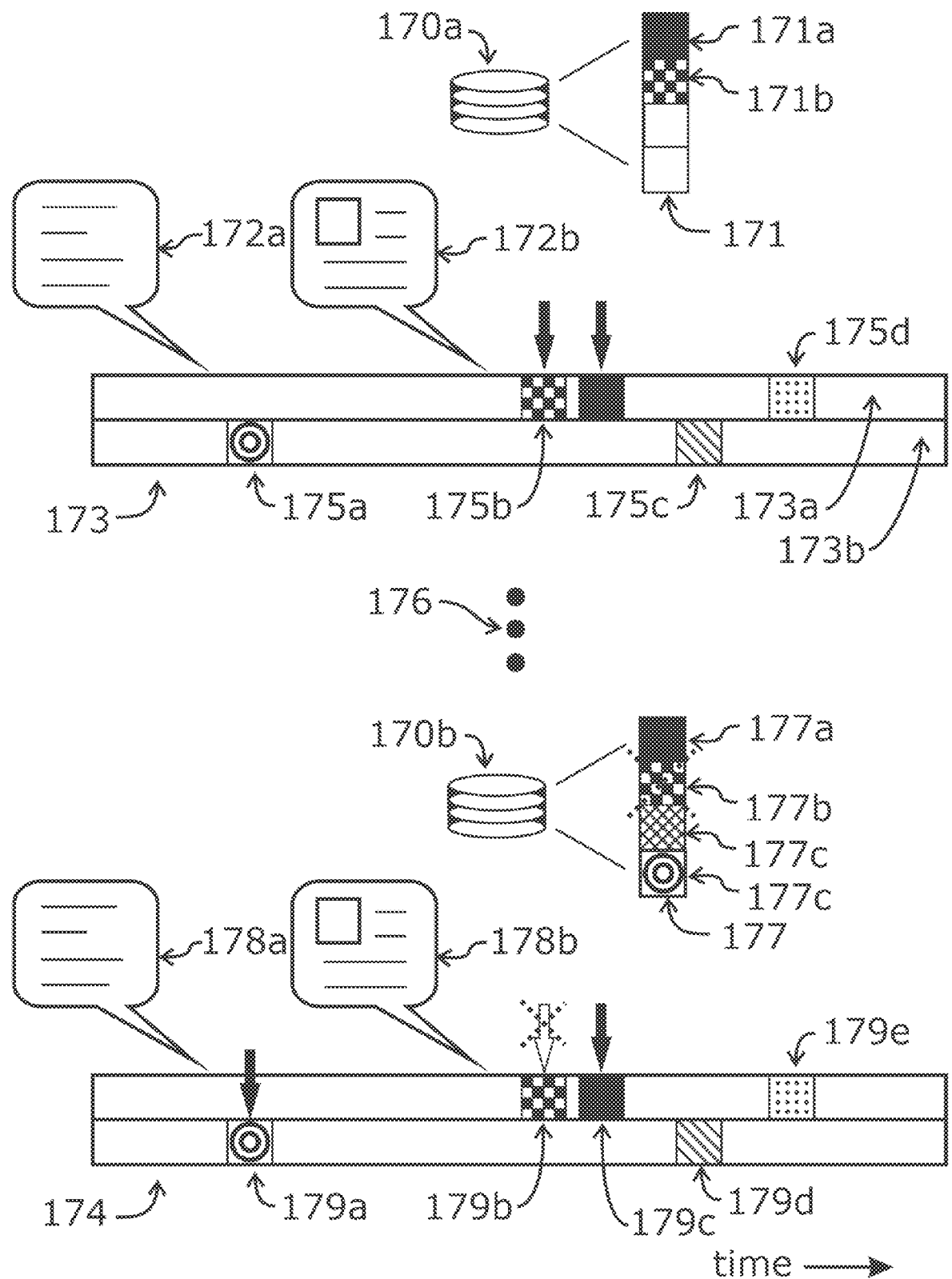
FIG. 17 illustrates results of reanalyzing a database of knowledge acquisition elements where determining at least one new indicator of knowledge acquisition results in the removal of a less frequent interaction element and the finding of an earlier indication of knowledge acquisition that, additionally, changed a determination of which knowledge presentation (i.e., teaching) resulted in learner understanding.

FIG. 17 illustrates further consequences that may result from different scenarios in which knowledge acquisition interaction databases are updated. In this scenario, a database 170*a* of interactions 171 includes at least two indicators of knowledge understanding indicated by solid fill 171*a* and checkerboard 171*b* patterns. The upper portion of FIG. 17 shows a timeline 173 of interactions 175*a*, 175*b*, 175*c*, 175*d*, 175*e* following an initial presentation of new knowledge 172*a*. The timeline 173 may be multimodal where, for example, the upper row of the timeline 173*a* shows interactions determined from video data and the lower row of the timeline 173*b* illustrates interactions determined from audio data.

In this exemplary scenario, a single interaction was detected 175*a* (bullseye circle pattern) following the first knowledge presentation 172*a*; however, this interaction was not initially classified with any interactions 171 in the interaction database 170*a* correlated with understanding. Thus, a second presentation of the knowledge 172*b* was made (e.g., by a human and/or HIE). This second presentation 172*b* was responded to by two interactions that were initially determined to indicate understanding (i.e., represented by a checkerboard pattern 175*b*, and solid fill pattern 175*c*). Two additional interaction components 175*d*, 175*e* that occurred later during the timeline 173 were not correlated with any indications 171 in the knowledge understanding database(s) 170*a*.

At some later time (indicated by a vertical ellipsis 176), the database 170*b* of indicators 177 of knowledge understanding was updated such that: 1) interactions represented by a solid fill pattern 177*a* remained in the database, 2) the interaction template represented by the checkerboard pattern 177*b* was removed from the database, for example, as a result of finding other indicators that occur more frequently as the database was accumulated, and 3) two indicators 177*c*, 177*d* were added to the database, for example, as a result of their elevated frequency of detection during interactions that produce understanding.

As a result of updating the indicator database 170*b*, a reanalysis of the interaction timeline 174 illustrated in the lower portion of FIG. 17 results in a positive indication of knowledge understanding 179*a* immediately following the initial presentation of knowledge 178*a*. In addition, the removal of interaction patterns represented by a checkerboard pattern 177*b* from the interaction database 170*b* results in removal of an interaction 179*b* previously determined to indicate knowledge understanding (signified by a crossed-out, downward, white-filled arrow).

In this scenario, in which knowledge understanding was not initially detected upon the first presentation of new knowledge 178*a*, the second (e.g., perhaps repetitious) presentation of knowledge 178*b* (even if presented in a different fashion) may have actually resulted in the interaction represented by a checkerboard pattern being one of boredom and/or even frustration by the learner as a result of content repetition. The indication of knowledge understanding represented by the solid fill pattern 179*c* continues to indicate knowledge understanding to either the first 178*a* or second 178*b* presentation of new knowledge (uncertain which presentation, but perhaps discernable based on elapsed time between presentations). The two final interaction components 179*d*, 179*e* during the interaction timeline 74 remain not associated with any indication of knowledge understanding based on the database of indications 170*b*.

Figure 18:
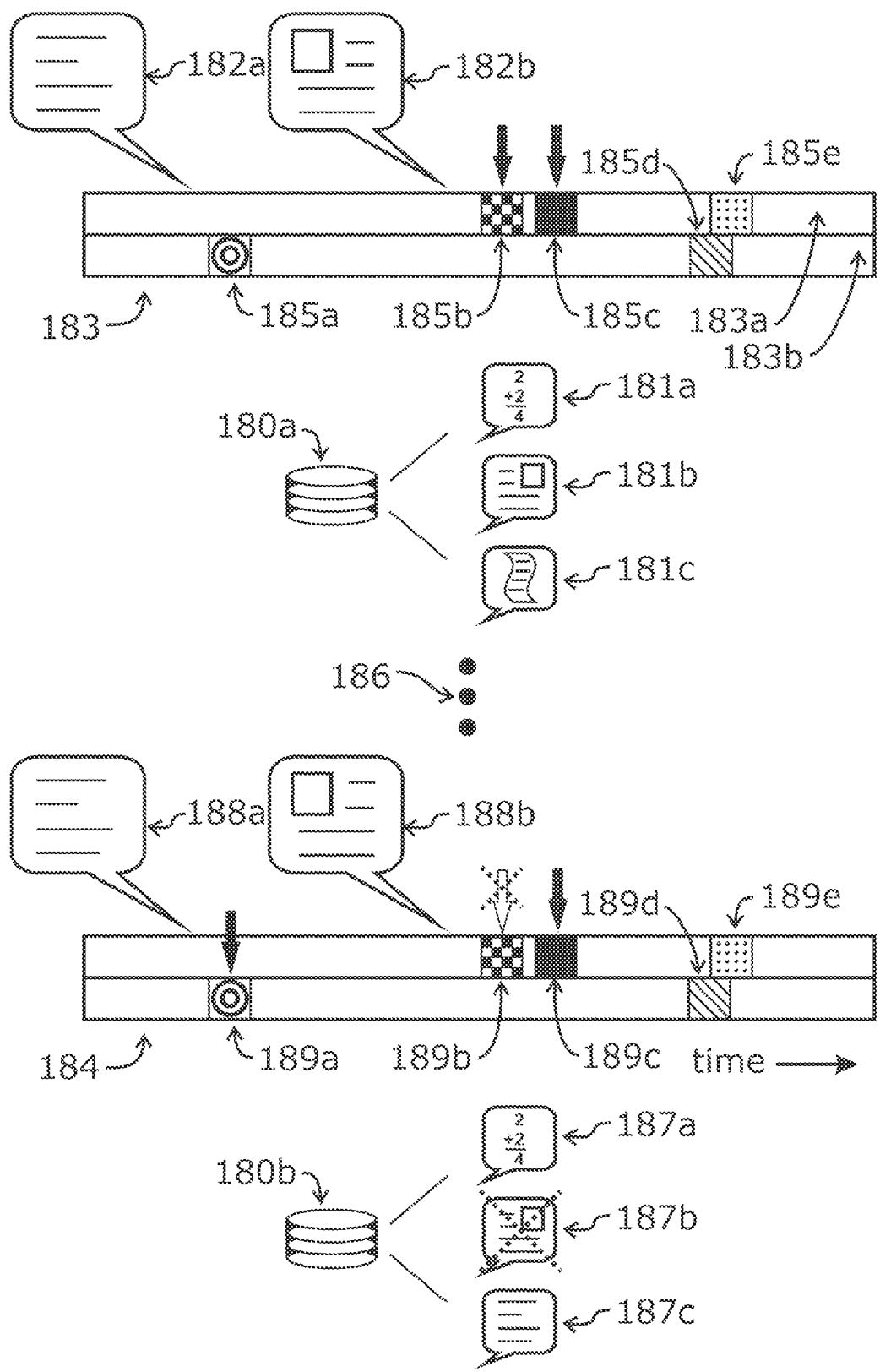
FIG. 18 shows results of re-analyzing a teachings database where the identification of a new and earlier indicator of knowledge acquisition along with a new and earlier teaching resulted in the removal of a teaching previously determined to be successful and addition of a new teaching to the database of successful teachings.

Following on with exemplary embodiments shown in FIG. 17, FIG. 18 illustrates potential consequences of updating indications of knowledge acquisition database(s) on the accumulation and use of databases containing successful teachings, used to enhance instructional content and techniques. The upper portion of FIG. 18 shows a timeline 183 (similar to FIG. 17), that may be multi-modal 183*a*, 183*b*, in which a first presentation of new knowledge 182*a* produced a response 185*a* that (mistakenly) was not recognized as indicating knowledge understanding. As a result, a second presentation was made (e.g., using a different teaching style) at 182*b* that resulted in two classifications that were initially determined to indicate knowledge understanding (indicated by checkerboard 185*b* and solid fill patterns 185*c*). Two additional interactions 185*d*, 185*e* were not found to be consistent with knowledge understanding. As a result of these initial analyses, the first presentation of new knowledge 182*a* was not included in a database of successful teachings 180*a*. Instead, the second presentation of knowledge 182*b* that was initially flagged as generating knowledge understanding 185*b*, 185*c* within the timeline 183, was added to the database of teachings 81*b* that includes other teachings 181*a*, 181*c* previously determined to produce successful knowledge understanding.

Sometime later (represented by a vertical ellipsis 186), illustrated in the lower portion of FIG. 18, after the indications of understanding database had been updated (as described in FIG. 17), a reanalysis of the same interaction 184 significantly altered the accumulation of successful teachings. Specifically, based on the updated identification of knowledge understanding represented by the bullseye circle patterns 189*a*, the first presentation of knowledge 188*a* is flagged as generating understanding. Thus, the content and methods of presentation associated with the first knowledge presentation 188*a* are added at 187*c* to the successful teachings database 180*b*. Additionally, the time that the learner understood the new knowledge may be updated from following a second knowledge presentation 188*b* to after the first presentation of new knowledge 188*a* (perhaps indicating a deep understanding).

On the other hand, after reanalysis, an interaction previously identified as indicating understanding represented by a checkerboard pattern 189*b* was no longer considered to be a reliable indicator of understanding (designated by a crossed-out, white-filled arrow). A subsequent indication of understanding, represented by a solid fill pattern 189*c*, remains identified; however, it is not clear which of the knowledge presentations 188*a*, 188*b* this is in response to, given that the first presentation 188*a* already generated understanding 189*a*. The second presentation of knowledge 188*b* was removed (indicated by a cross-out 187*b*) from the successful teaching database 180*b*. Other teachings 187*a* remained in the database 180*b* and other interactions 189*d*, 189*e* were identified but not recognized as generating understanding during this particular timeline 184.

Modulating Emotional Engagement

Skilled educators, coaches, employers, parents and others often consciously or subconsciously manipulate physical and emotional environments in order to maintain engagement and promote learning within classrooms, playing fields, work environments, homes and other settings. Numerous strategies may be employed by such influencers to maintain emotional engagement. For example, taking advantage of the fact that most human brains are highly empathetic (starting around the age of five to six years), successful teachings may relate to experiences encountered by others, as well as those of the learner. Story-telling is an effective strategy to evoke such emotions and related learning. Interactive story-telling, by including active participation by a listener, is a particularly powerful technique. The introduction of challenge (especially while teaching), including the possibility of failure, promotes highly rewarding feelings of accomplishment when such challenges are conquered.

Skilled presenters may include visual and/or auditory "surprises" (e.g., an unexpected image of a sunset or a louder than normal sound) and other emotional cues (e.g., music) to keep audiences engaged. A variant of this strategy, cognitive disequilibrium or imbalance, involves presenting materials that do not fit into normal experiences and understanding of the world (e.g., an image of a cow producing the sounds of a duck). Presenters may directly engage with an audience, or even simply include the possibility of audience participation, in order to maintain emotional connections. Including praise, happiness and other forms of emotional support during learning is an extraordinarily powerful technique, not only to reinforce a concept at hand, but also to bolster overall interest and/or excitement in an activity or field of study.

In further embodiments, machine-based methods to interact and maintain engagement with an individual, either directly via an HIA or by "nudging" or suggesting methods for humans to interact may use similar strategies. Direct interactions by a HIE and/or nudging may take into account timing considerations (e.g., not overwhelming) as described above. Machine-enabled interactions may also involve one or more humans interacting with one or more virtual characters to enact such strategies and/or entertain.

As a further consideration when interacting with children in particular, the fact that "play" is nearly impossible to fully suppress in the young suggests that it plays a prominent role in behavioral and neurological development in many animal species. Play is observed in mammals, birds, other vertebrates, and even invertebrates. Play may continue into adulthood where hobbies and interests often reflect childhood environments and interests. Play is generally defined based on three criteria: 1) resembling serious behavior (e.g., hunting, escaping) but may be exaggerated or otherwise altered, 2) including no immediate survival purpose, perhaps found to be pleasurable, and 3) performed voluntarily while not under stress. Play is sometimes viewed as practice-based learning for "real life" situations. In many cultures, play is viewed as a major contributor toward the formation of social connectedness. In other cultures, where there may be a greater emphasis on social independence, there is generally a greater reliance on play with objects (e.g., dolls, building blocks, other toys).

Within exemplary embodiments, real-time, machine-based monitoring of emotional states during play may enable strategies and provide a number of advantages over play absent monitoring and/or enacting enhanced emotional and cognitive environments. Strategies and advantages include:

1. A child may be allowed to play alone or within a given environment (e.g., with siblings and friends) uninterrupted, until there is an indication (via machine-based detection) of predetermined levels of one or more emotional states including, for example, stress, frustration or boredom.
2. A monitor or supporter (e.g., parent, teacher, guardian), may avoid repeated querying and/or interruption of play activities in order to determine emotional status.
3. Machine-based monitoring may allow other tasks to be performed simultaneously (e.g., during play by one or more children) by the one or more supporters. Such "time-sharing" is further described in U.S. Pat. No. 10,915,814, filed Jun. 15, 2020, where there may be no indication of any lack of full attention by a supporter or that such time-sharing is taking place.
4. Machine-based monitoring coupled with pre-determined actions may curate and/or guide future play activities in ways to maintain elevated levels of interest. This may include deploying so-called "conditional actions" further described in U.S. Pat. No. 10,915,814, filed Oct. 23, 2020). Such guidance may be restrictive (e.g., not allowing access to activities that may be age-inappropriate) or inclusive (e.g., machine-base suggestions of the involvement of others in particular play activities).
5. Ideal times for notification and subsequent involvement of additional supporters and/or other playmates may be based on machine-based monitoring of play activities and/or emotional states (e.g., nearing completion of a defined activity).
6. Play activities may be classified and cataloged, allowing machine-based "nudging" toward future activities that are of interest, and/or an awareness of topic areas that have not yet been explored and/or that are possibly being avoided.
7. Any needs or "wants" for physical objects may be cataloged and conveyed to supporters, others involved in play activities, and/or those otherwise involved in the well-being of an individual (e.g., particularly as suggestions during times when gifts might be exchanged).
8. Times spent and levels of interest in particular play activities (e.g., online gaming, use of a particular toy) or with particular playmates may be cataloged, monitored and (if needed) controlled.
9. If play involves a level of challenge that may be modulated (e.g., playing a game, building a virtual object), levels of difficulty may be altered to allow predetermined ranges of success and/or failure in meeting those challenges.

In further exemplary embodiments, during an activity shared between an individual and one or more supporters, the one or more supporters may be aided during the activity by being exclusively provided machine-sourced information, prompts and/or HIE actions to help promote emotional and/or cognitive engagement. A learner or other individuals may be fully unaware or only partially aware that such machine prompts are being provided. To such one or more individuals, it may appear that the human supporter may possess expanded knowledge or, as a fun way of viewing, a "superpower".

Examples of shared activities where such enhanced interactions may be employed include reading a book, telling a story, building or repairing an object, virtually viewing facilities (e.g., museum, historical site) or regions of the world that may contain art, architecture, unique plants, rare animals and so on. During such shared activities, the supporter may be provided (e.g., by a HIE) augmentative materials in the form of images, audio clips, historical perspectives, cultural associations, relations to surroundings, trivia, scientific foundations, mathematical perspectives and so on. Such exclusive prompting of one or more supporters of an individual may also involve the tracking of the timing of activities such as being informed of a deadline for performing a task, an anticipated time of an event (e.g., sunset, television show) and so on. Enacting such enhanced or augmented interactions may quickly elevate engagement. Over a longer term, augmented interactions may help develop an anticipation of elevated levels of interest and/or respect.

In addition to controlling the pace and complexity of presenting new materials, an HIE may additionally control the timing of interaction breaks where the introduction of such breaks may take into account materials being presented and/or other interaction elements (e.g., end of presenting a topic, detecting confusion or frustration). Within additional exemplary embodiments, both the initiation and duration of such breaks may be controlled (e.g., directly by the HIE and/or via nudging of one or more humans). Duration may be influenced by sensed types of activities being performed (e.g., beverage preparation, eating, discussion, exercise).

As described more fully in the Background section, the same neurotransmitters and hormones involved in modulating key emotional states are produced and modulated during the performance of physical activities including exercise. Performing physical activities that are of sufficient intensity and/or duration to significantly affect levels of these neurotransmitters and hormones produce measurable effects on blood flow and excitable cell (i.e., nerve, muscle) physiology. During sedentary activities (e.g., meetings, screen viewing) both cognitive and emotional states may benefit from taking brief "increased cognition breaks" (ICBs). ICBs may, for example, involve a one-minute break every thirty (30) minutes and/or involve in situ physical activities (e.g., push-ups, sit-ups, jumping jacks, squats).

ICBs may be yet another method to enhance overall engagement, cognitive performance and/or creative productivity. As one component of helping to augment overall emotional and cognitive environments, HIEs may encourage, initiate and/or track ICBs. In addition to elapsed time since a previous ICB, initiation of ICBs may take into account emotional states of one or more individuals, natural breaks (e.g., changing topics, switching presenters) within cognitive activities, anticipated duration of sedentary activities, time of day, and so on. Physical activity targets that may be monitored by a HIE include a duration of activities, physical characteristics of those activities (e.g., number of steps, push-ups, sit-ups, jumping jacks, squats) and/or physiological targets (e.g., elevated heart or respiration rates). Scheduled breaks may take into account preferences of an individual or group, and/or their physiological abilities to safely perform activities (e.g., due to age or physical limitations).

The foregoing disclosure of the exemplary embodiments has been presented for purposes of illustration and description. It is not intended to be exhaustive or to limit the invention to the precise forms disclosed. Many variations and modifications of the embodiments described herein will be apparent to one of ordinary skill in the art in light of the above disclosure. It will be appreciated that the various components and features described with the particular embodiments may be added, deleted, and/or substituted with the other embodiments, depending upon the intended use of the embodiments.

Further, in describing representative embodiments, the specification may have presented the method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims.

While the invention is susceptible to various modifications, and alternative forms, specific examples thereof have been shown in the drawings and are herein described in detail. It should be understood that the invention is not to be limited to the particular forms or methods disclosed, but to the contrary, the invention is to cover all modifications, equivalents and alternatives falling within the scope of the appended claims.

We claim:

1. A method for an observer of an individual to effect a target degree of emotional engagement by the individual, comprising:

providing, in proximity to a human observer, an observer electronic device that includes an observer processor and one or more observer output devices operatively coupled to the observer processor;

providing, in proximity to the individual, an individual electronic device that includes an individual processor, one or more individual output devices operatively coupled to the individual processor, and one or more sensors operatively coupled to the individual processor;

presenting knowledge to the individual that may be unknown to the individual, by one or both of the individual electronic device and the observer;

acquiring, from an interaction between the individual electronic device and the individual, interaction data from the one or more sensors related to the knowledge being presented;

classifying within the interaction data, by one or more of the individual processor and one or more remote processors, one or more indications of an individual degree of emotional engagement by the individual in response to the knowledge being presented, wherein the individual degree of emotional engagement is one or more of the individual being disengaged, disinterested, distracted, bored, frustrated, and overwhelmed;

selecting, by one or more of the individual processor, the observer processor and the one or more remote processors, an activity that is intended to direct the individual degree of emotional engagement toward a target degree of emotional engagement, wherein the target degree of emotional engagement is one or more of the individual being engaged, interested, motivated, attentive, excited, and inspired; and expressing to the observer, by the one or more observer output devices, the activity to prompt the observer to initiate an action with the individual to direct the individual degree of emotional engagement toward the target degree of emotional engagement.

2. The method of claim 1, wherein an artificial intelligence is instantiated within one or both of the individual processor and the observer processor.

3. The method of claim 2, wherein the artificial intelligence includes an artificial intelligence personality familiar to one or both of the individual and the observer.

4. The method of claim 1, wherein classifying the one or more indications of the individual degree of emotional engagement comprises identifying within the interaction data one or more of one or more words, phrases, interjections, utterances, gestures, smiles, hand movements, configurations of hand digits, written symbols, head movements, facial muscle movements, movements of forehead muscles, eye movements, changes in pupil size, eyelid blinks, electronic device button pushes, electronic device screen touches, shakes of the individual electronic device, movements of one or more objects sensed by the electronic device, eye gaze directions, changes in voice tone, changes in voice volume, changes in rates of speaking, changes in reaction times, lack of reaction to comments, lack of reaction to questions, and reactions unrelated to questions.

5. The method of claim 1, wherein one or more additional interactions labelled with the individual degree of emotional engagement within the interaction data are added, by one or more of the individual processor and the one or more remote processors, to a labelled emotional interactions database.

6. The method of claim 5, wherein one or more degree of emotional engagement human interaction classifier templates are generated by identifying one or more of labelled emotional interactions and combinations of labelled emotional interactions that occur frequently within the labelled emotional interactions database.

7. The method of claim 5, wherein the labelled emotional interactions database is used to train one or more neural networks configured to classify degree of emotional engagement human interactions.

8. The method of claim 1, further comprising transmitting one or more of the knowledge, a time the knowledge was expressed, and the individual degree of emotional engagement from one or more of the individual processor, the observer processor and the one or more remote processors to one or more monitoring processors configured to communicate with one or more monitoring humans other than the observer and the individual.

9. The method of claim 1, wherein the observer interacts with the individual via a video telecommunications link.

10. The method of claim 1, wherein the one or more observer output devices express to the observer a time to perform one of the activity and a repetition of the activity.

11. The method of claim 1, wherein the one or more observer output devices comprise an observer display, and wherein the activity is expressed on the observer display by a character presented on the observer display.

12. The method of claim 11, wherein the character is presented only on the observer display and not on the one or more individual output devices.

13. The method of claim 1, wherein the activity is expressed as one or more of text, video, and audio on the one or more observer output devices.

14. The method of claim 13, wherein the one or more of text, video, and audio are expressed only on the observer output devices and not on the one or more individual output devices.

15. A system for an observer of an individual to effect a target degree of emotional engagement by the individual, comprising:
an observer electronic device configured to be located in proximity to a human observer comprising an observer processor, and one or more observer output devices operatively coupled to the observer processor;
an individual electronic device configured to be located in proximity to the individual comprising an individual processor, one or more individual output devices operatively coupled to the individual processor, and one or more sensors operatively coupled to the individual processor;
the system configured such that:
one or both of the individual electronic device and the observer, using the one or more individual output devices, present knowledge to the individual that may be unknown to the individual;
the one or more sensors acquire interaction data related to the knowledge being presented;
one or more of the individual processor, the observer processor and one or more remote processors classify, within the interaction data, one or more indications of an individual degree of emotional engagement by the individual in response to the knowledge being presented, wherein the individual degree of emotional engagement is one or more of the individual being disengaged, disinterested, distracted, bored, frustrated, and overwhelmed;
one or more of the individual processor, the observer processor and the one or more remote processors select an activity intended to direct the individual degree of emotional engagement toward a target degree of emotional engagement, wherein the target degree of emotional engagement is one or more of the individual being engaged, interested, motivated, attentive, excited, and inspired; and
the one or more observer output devices express the activity to the observer to prompt the observer to initiate an action with the individual to direct the individual degree of emotional engagement toward the target degree of emotional engagement.

16. A method for an observer of an individual to effect a target degree of emotional engagement by the individual, comprising:
providing, in proximity to a human observer, an observer electronic device that includes an observer processor, one or more observer output devices operatively coupled to the observer processor, and one or more sensors operatively coupled to the observer processor;
providing, in proximity to the individual, an individual electronic device that includes an individual processor, and one or more individual output devices operatively coupled to the individual processor;
presenting knowledge to the individual that may be unknown to the individual, by one or both of the one or more individual output devices and the observer, knowledge;
acquiring, from an interaction between the observer and the observer electronic device, observer interaction data from the one or more sensors of the observer device;
classifying within the observer interaction data, by one or more of the observer processor and one or more remote processors, one or more indications of an individual degree of emotional engagement by the individual, wherein the individual degree of emotional engagement is one or more of the individual being disengaged, disinterested, distracted, bored, frustrated, and overwhelmed;
selecting, by one or more of the observer processor and the one or more remote processors, an activity intended to direct the individual degree of emotional engagement toward a target degree of emotional engagement, wherein the target degree of emotional engagement is one or more of the individual being engaged, interested, motivated, attentive, excited, and inspired; and
expressing to the observer, by the one or more observer output devices, the activity to prompt the observer to initiate an action with the individual to direct the individual degree of emotional engagement toward the target degree of emotional engagement.

17. The method of claim 16, wherein an artificial intelligence is instantiated within one or both of the individual processor and the observer processor.

18. The method of claim 17, wherein the artificial intelligence includes an artificial intelligence personality familiar to one or both of the individual and the observer.

19. The method of claim 16, wherein the classifying the one or more indications of the individual degree of emotional engagement comprises identifying within the observer interaction data one or more of one or more words, phrases, interjections, utterances, gestures, smiles, hand movements, configurations of hand digits, written symbols, head movements, facial muscle movements, movements of forehead muscles, eye movements, changes in pupil size, eyelid blinks, electronic device button pushes, screen touches of the observer electronic device, shakes of the observer electronic device, movements of one or more objects sensed by the observer electronic device, eye gaze directions, changes in voice tone, changes in voice volume, and changes in rates of speaking.

20. The method of claim 16, further comprising transmitting one or more of the knowledge, a time the knowledge was expressed, and the individual degree of emotional engagement from one or more of the individual processor, the observer processor and the one or more remote processors to one or more monitoring processors configured to communicate with one or more monitoring humans other than the observer and the individual.

21. The method of claim 16, wherein the observer interacts with the individual via a video telecommunications link.

22. The method of claim 16, wherein the one or more observer output devices express to the observer a time to perform one of the activity and a repetition of the activity.

23. The method of claim 16, wherein the one or more observer output devices comprise an observer display, and wherein the activity is expressed on the observer display by a character presented on the observer display.

24. The method of claim 23, wherein the character is presented only on the observer display and not on the one or more individual output devices.

25. The method of claim 16, wherein the activity is expressed as one or more of text, video, and audio on the one or more observer output devices.

26. The method of claim 25, wherein the one or more of text, video, and audio are expressed only on the observer output devices and not on the one or more individual output devices.

* * * * *